(12) United States Patent
Brayman et al.

(10) Patent No.: US 12,322,205 B1
(45) Date of Patent: Jun. 3, 2025

(54) METHODS AND SYSTEMS THAT DETERMINE HEARTBEAT RATE FROM VIDEO RECORDINGS

(71) Applicant: Affective Software, Inc., Seattle, WA (US)

(72) Inventors: Vladimir Brayman, Mercer Island, WA (US); Connor Eaton, Seattle, WA (US); Yuriy Gulak, Highland Park, NJ (US)

(73) Assignee: AFFECTIVE SOFTWARE, INC., Seattle, WA (US)

( * ) Notice: Subject to any disclaimer, the term of this patent is extended or adjusted under 35 U.S.C. 154(b) by 560 days.

(21) Appl. No.: 17/699,697

(22) Filed: Mar. 21, 2022

Related U.S. Application Data

(60) Provisional application No. 63/170,258, filed on Apr. 2, 2021.

(51) Int. Cl.
*G06V 40/10* (2022.01)
*G06T 7/64* (2017.01)
(Continued)

(52) U.S. Cl.
CPC ............... *G06V 40/15* (2022.01); *G06T 7/64* (2017.01); *G06T 7/70* (2017.01); *G06T 7/90* (2017.01); *G06V 10/225* (2022.01); *G06V 10/25* (2022.01); *G06V 10/443* (2022.01); *G06V 10/56* (2022.01); *G06V 10/62* (2022.01); *G06V 20/46* (2022.01); *G06V 40/166* (2022.01); *H04N 5/77* (2013.01); *G06T 2207/10016* (2013.01);
(Continued)

(58) Field of Classification Search
CPC ...... G06V 40/15; G06V 10/25; G06V 10/443; G06V 10/56; G06V 20/46; G06V 40/166; G06V 10/62; G06V 10/225; G06T 7/64; G06T 7/90; G06T 7/70; H04N 5/77
See application file for complete search history.

(56) References Cited

U.S. PATENT DOCUMENTS

| | | | |
|---|---|---|---|
| 2005/0209525 A1* | 9/2005 | Bojovic | A61B 5/339 600/512 |
| 2010/0185064 A1* | 7/2010 | Bandic | A61B 5/444 600/306 |

(Continued)

*Primary Examiner* — David Bilodeau
(74) *Attorney, Agent, or Firm* — Olympic Patent Works PLLC

(57) ABSTRACT

The current document is directed to computationally efficient, robust, and accurate methods and systems that determine the heartbeat rate of human subjects, patients, and/or participants monitored by a video-recording-capable device or system by analyzing video recordings of human subjects, patients, and/or participants, either in real time or following video recording. The currently disclosed methods and systems employ face-recognition methods to identify adaptive regions of interest corresponding to facial-skin areas. Spatial averages of the intensities of light components with different frequencies reflected from the identified adaptive regions of interest are extracted from the video recording as intensity signals. The intensity signals are then analyzed to extract detrended, band-pass-filtered oscillating light-intensity signals that are processed by spectral and peak-finding methods that each produces a determined heartbeat rate for each of multiple time intervals.

7 Claims, 57 Drawing Sheets

(51) Int. Cl.
*G06T 7/70* (2017.01)
*G06T 7/90* (2017.01)
*G06V 10/22* (2022.01)
*G06V 10/25* (2022.01)
*G06V 10/44* (2022.01)
*G06V 10/56* (2022.01)
*G06V 10/62* (2022.01)
*G06V 20/40* (2022.01)
*G06V 40/16* (2022.01)
*H04N 5/77* (2006.01)

(52) U.S. Cl.
CPC ............... *G06T 2207/10024* (2013.01); *G06T 2207/30088* (2013.01); *G06T 2207/30201* (2013.01)

(56) References Cited

U.S. PATENT DOCUMENTS

| | | | | |
|---|---|---|---|---|
| 2011/0267489 | A1* | 11/2011 | Sagawa | H04N 1/00684 348/222.1 |
| 2015/0378433 | A1* | 12/2015 | Savastinuk | G06F 3/015 345/156 |
| 2016/0343130 | A1* | 11/2016 | Wang | G06V 40/161 |
| 2016/0343135 | A1* | 11/2016 | De Haan | G06V 10/763 |

* cited by examiner

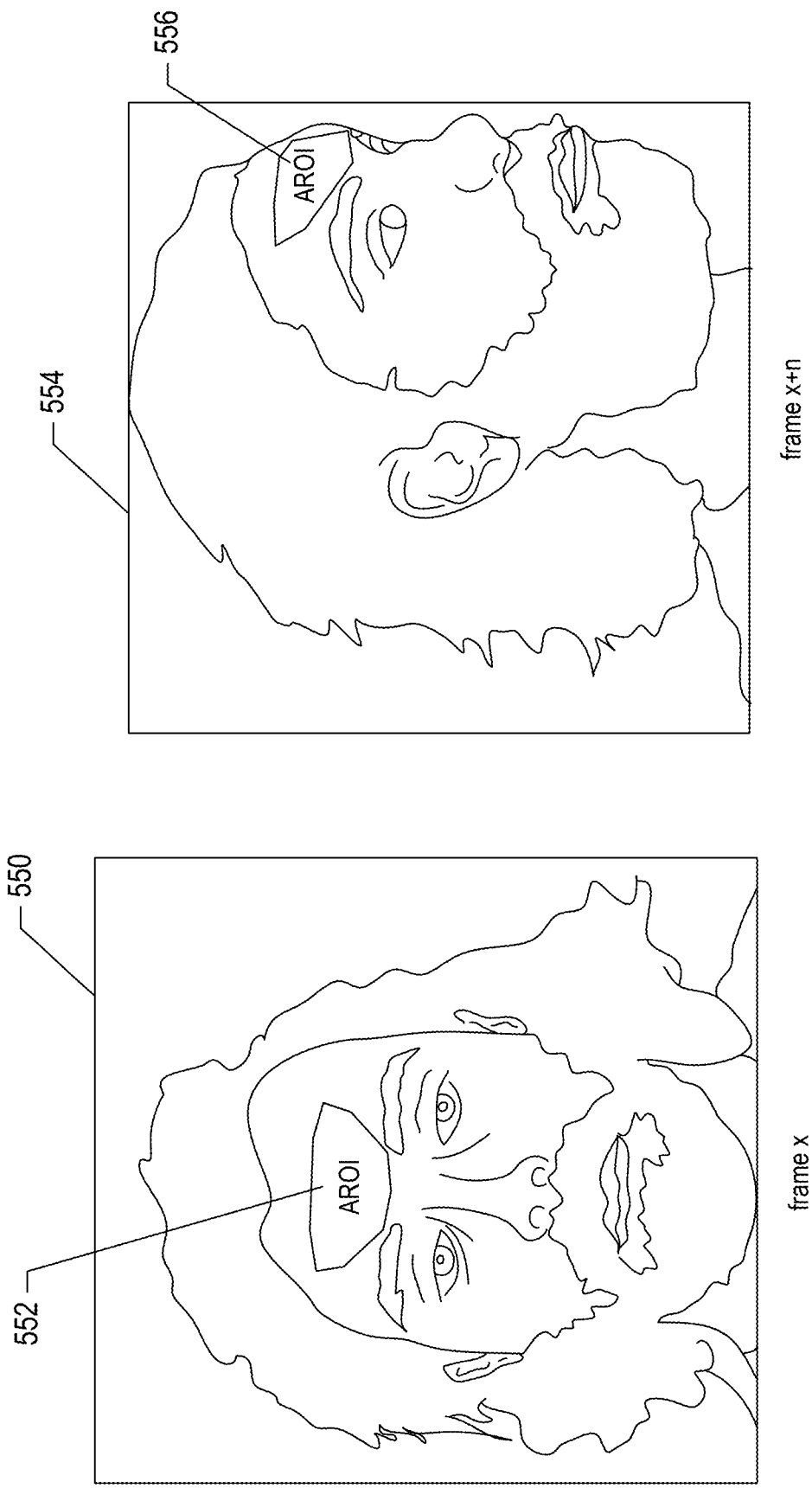

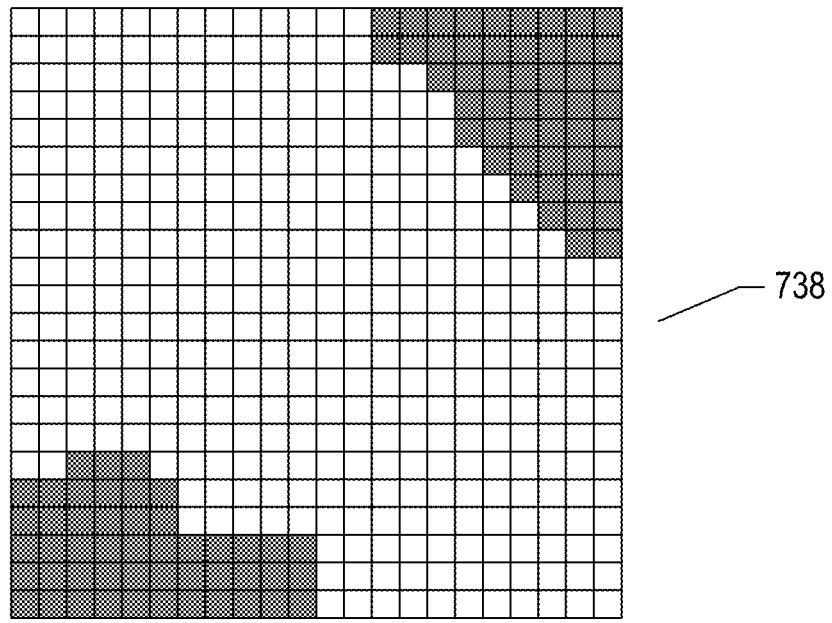
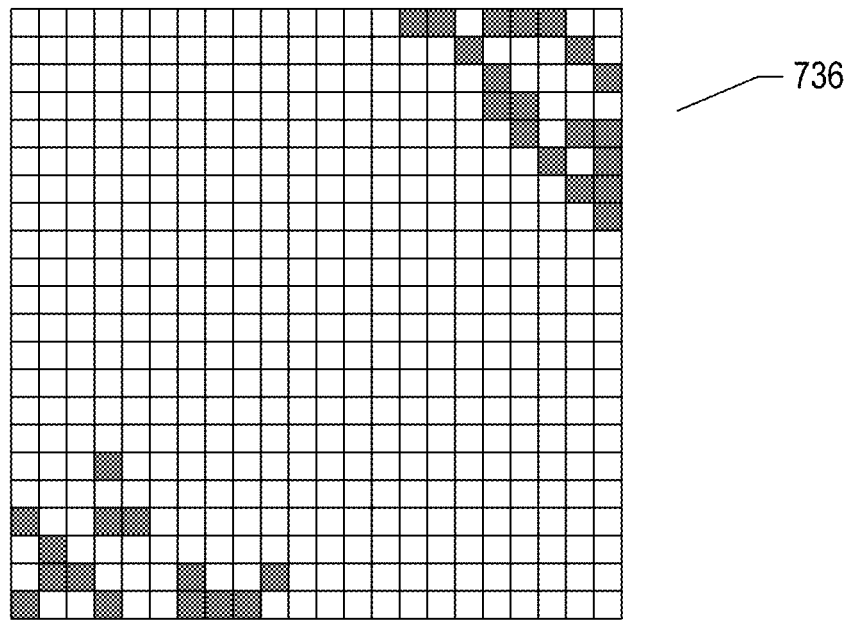
FIG. 7C global variables/constants

FrameStore FS — 802
Boolean online — 803
int blkStart — 804
Boolean finished — 805
3D_AROI candidateAROIs[ ] — 806
int currentAROIs[ ] — 807
int AROI_Tab[ ][ ] — 808
int blkSize — 809
int currentTs[ ] — 810
mask currentMasks[ ] — 814
mask storedMasks[ ] — 816
int storedTs[ ] — 812
int sampleInc

FIG. 8A

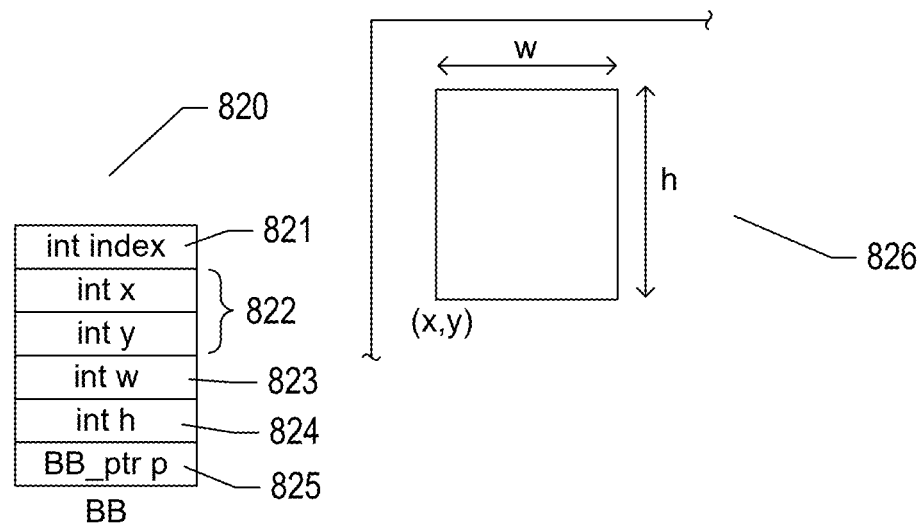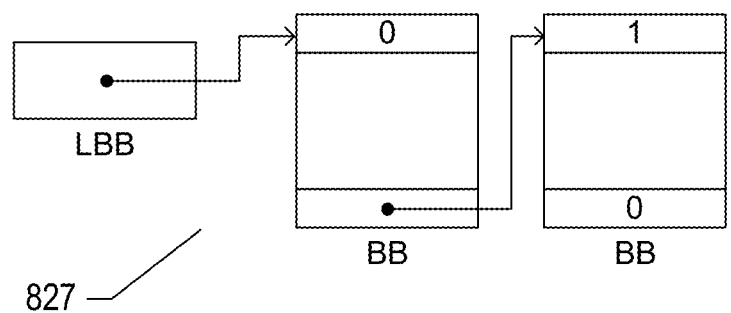
LBB.getBB(int index) → BBptr — 828
FIG. 8B

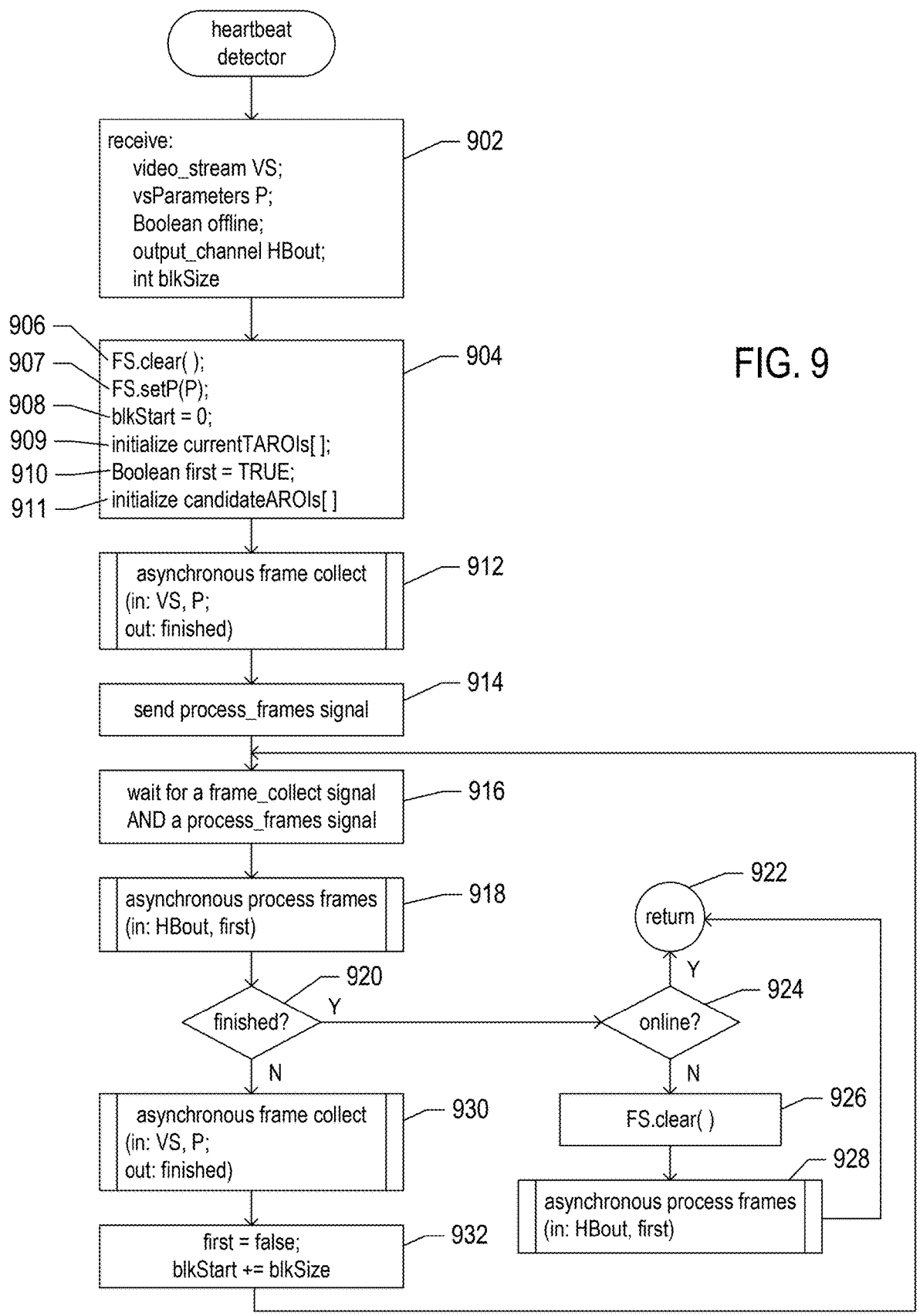

$$\frac{d}{dx} f(x) = \lim_{h \to 0} \frac{f(x) - f(x-h)}{h} \quad \text{— 2002}$$

$$\frac{d}{dx} f(x) \cong \frac{\Delta_h f(x-h)}{h} = \frac{f(x) - f(x-h)}{h} \quad (1) \text{— 2004}$$

$$= \frac{f(x+h) - f(x)}{h} \quad (2) \text{— 2005}$$

$$= \frac{f(x+\frac{h}{2}) - f(x-\frac{h}{2})}{h} \quad (3) \text{— 2006}$$

$$\frac{d^2}{dx^2} f(x) \cong \frac{\frac{f(x+2h) - f(x+h)}{h} - \frac{f(x+h) - f(x)}{h}}{h} \quad (2) \text{— 2008}$$

with $h=1$, $\frac{d^2}{dx^2}(f(x)) \cong f(x+2) - 2f(x+1) + f(x)$ (2) — 2010

$$\frac{d^3}{dx^3}(f(x)) \cong f(x+3) - 2f(x+2) + f(x+1) - (f(x+2) - 2f(x+1) + f(x)) \quad (2)$$
$$\cong -f(x) + 3f(x+1) - 3f(x+2) + f(x+3))$$
$$\cong -1(f(x)) + 3(f(x+1)) - 3(f(x+2)) + 1(f(x+3))$$
— 2012

2014 —

$$\begin{bmatrix} f(0) \\ f(1) \\ f(2) \\ f(3) \\ f(4) \\ f(5) \\ \vdots \\ f(n) \end{bmatrix}$$

$$= \overbrace{f(0) \ f(1) \ f(2) \ f(3) \ f(4) \ f(5) \cdots f(n)}^{2018}$$

↑ — 2020

$[-1, 3, -3, 1]$ —— 2016

FIG. 20A $$D^{(n=3)} \cdot Z = Z'''$$

FIG. 20B

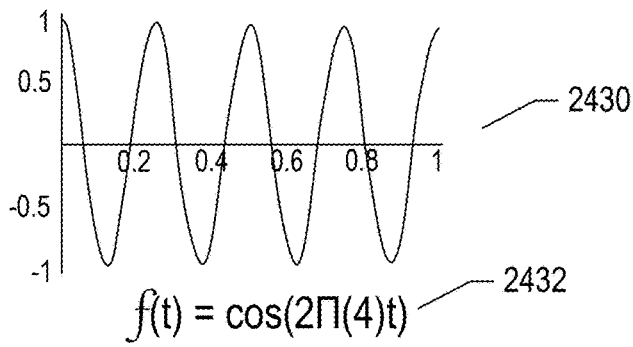

$f(t) = \cos(2\Pi(4)t)$ — 2432

$$F(u) = \int_{-\infty}^{\infty} f(t)e^{-i2\Pi ut}dt \quad \text{— 2434}$$

$$= \int_{-\infty}^{\infty} \cos(2\Pi(4)t)e^{-i2\Pi ut}dt \quad \text{— 2436}$$

$$= \int_{-\infty}^{\infty} \cos(2\Pi(4)t)\cos(-2\Pi ut)dt + i\int_{-\infty}^{\infty} \cos(2\Pi(4)t)\sin(-2\Pi ut)dt \quad \text{— 2438}$$

$$= \int_{-\infty}^{\infty} \cos(2\Pi(4)t)\cos(2\Pi ut)dt - i\int_{-\infty}^{\infty} \cos(2\Pi(4)t)\sin(2\Pi ut)dt \quad \text{— 2440}$$

2444 — $= \frac{1}{2}\delta(u-4) + \frac{1}{2}\delta(u+4)$    — 2442

— 2446

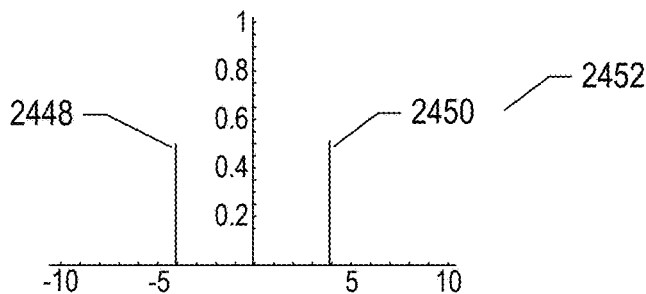

$F(u) = \frac{1}{2}\delta(u-4) + \frac{1}{2}\delta(u+4)$

FIG. 24B $a = (a_1, a_2, a_3, \ldots a_n, b_1, b_2, b_3, \ldots b_n)$ ⎯ 2460 when n = a number of evenly spaced frequencies $v_1, v_2, \ldots, v_n$, in the range [0.6Hz to 3.5Hz]

$$\Phi = \begin{bmatrix} \cos(2\pi v_1, t_1) & \cos(2\pi v_2, t_1) & \cdots & \cos(2\pi v_n, t_1) & \sin(2\pi v_1, t_1) & \sin(2\pi v_2, t_1) & \cdots & \sin(2\pi v_n, t_1) \\ \cos(2\pi v_1, t_2) & \cos(2\pi v_2, t_2) & \cdots & \cos(2\pi v_n, t_2) & \sin(2\pi v_1, t_2) & \sin(2\pi v_2, t_2) & \cdots & \sin(2\pi v_n, t_2) \\ \vdots & \vdots & \cdots & \vdots & \vdots & \vdots & \cdots & \vdots \\ \cos(2\pi v_1, t_m) & \cos(2\pi v_2, t_m) & \cdots & \cos(2\pi v_n, t_m) & \sin(2\pi v_1, t_m) & \sin(2\pi v_2, t_m) & \cdots & \sin(2\pi v_n, t_m) \end{bmatrix}$$ ⎯ 2462 where $t_1, t_2, \ldots t_m$ are timestamps for frames 1, 2, ..., m ⎯ 2464

$a = \underset{a}{\operatorname{argmin}} \min \frac{1}{2} \| \Phi a - s \|_2^2 + \gamma \| a \|_1$ ⎯ 2466, 2472
⎯ 2468

$s = (s_1, s_2, \ldots s_3)^T$, the signal obtained from AROIs in video frames $\| \Phi a - s \|_2^2$ is minimized when $\Phi a = s$ ⎯ 2470

$\gamma \| a \|_1$ is minimized as the number of non-zero coefficients in $a \rightarrow 0$

FIG. 24C

METHODS AND SYSTEMS THAT DETERMINE HEARTBEAT RATE FROM VIDEO RECORDINGS

CROSS-REFERENCE TO RELATED APPLICATION

This application claims the benefit of Provisional Application No. 63/170,258, filed Apr. 2, 2021.

TECHNICAL FIELD

The current document is directed to methods and systems that monitor human subjects and, in particular, to methods and systems that determine the heartbeat rate of one or more human subjects, patients, and/or participants by analyzing a video recording.

BACKGROUND

Many efforts and a great deal of research has been devoted to the automated process referred to as "remote photoplethysmography." This process seeks to determine the values of various physiological parameters, such as heartbeat rate, from information acquired by various types of monitoring technologies, including video monitors. Remote-photoplethysmography based on analysis of video recordings generally relies on subtle changes in skin coloration that oscillate at frequencies close to the heartbeat-rate frequency. The accuracies and reliabilities of currently available remote photoplethysmography technologies based on analysis of video recordings are significantly constrained, with accurate and reproducible results obtained only when, for example, subjects monitored by video cameras are relatively immobile and located within relatively static environments illuminated by well-characterized light sources that produce relatively constant light intensities. Currently available remote photoplethysmography technologies do not produce accurate and reproducible results from recorded videos of naturally interacting human subjects in natural settings. There are many different types of currently available and emerging applications that employ automated monitoring of human physiological parameters, including applications that evaluate relational dynamics in clinical mental/relational health settings and applications that monitor hospital patients in various settings in which the patients move within their environments under varying and unpredictable illumination. Currently, wearable pulse oximeters are used by many of these applications for heartbeat-rate monitoring. However, use of pulse oximeters often limits the applicability and scalability of applications that monitor heartbeat rates of monitored human subjects. Developers and users of these applications and of many additional systems and devices that monitor human participants in interactive sessions and other natural settings have recognized a need for alternative heartbeat-rate monitoring methods and systems that are inexpensive, non-invasive, and reliable and that are not associated with the constraints involved with the use of pulse oximeters and other such specific-physiology-characteristic-monitoring devices.

SUMMARY

The current document is directed to computationally efficient, robust, and accurate methods and systems that determine the heartbeat rate of human subjects, patients, and/or participants monitored by a video-recording-capable device or system by analyzing video recordings of human subjects, patients, and/or participants, either in real time or following video recording. The currently disclosed methods and systems employ face-recognition methods to identify adaptive regions of interest corresponding to facial-skin areas. Spatial averages of the intensities of light components with different frequencies reflected from the identified adaptive regions of interest are extracted from the video recording as intensity signals. The intensity signals are then analyzed to extract detrended, band-pass-filtered oscillating light-intensity signals that are processed by spectral and peak-finding methods that each produces a determined heartbeat rate for each of multiple time intervals.

BRIEF DESCRIPTION OF THE DRAWINGS

FIGS. 5A-H illustrate face detection and adaptive-region-of-interest identification.

FIGS. 7A-C illustrate an erosion operator that is applied to a digital image or digital-image mask.

FIGS. 5A-D illustrate various global variables, constants, and data structures used in control-flow diagrams shown in FIGS. 9-16 which, together with FIG. 29, illustrate an implementation of recorded-video processing that produces heartbeat rates for imaged human subjects, patients, and/or participants.

FIG. 9 provides a control-flow diagram for a routine "heartbeat detector" that represents one implementation of the currently disclosed methods and systems that determine heartbeat rates for subjects, patients, and/or participants imaged in a video recording.

FIGS. 20A-B illustrate computation of the third derivative of a discrete signal.

FIGS. 24A-C illustrate a first spectral method, used in the currently disclosed methods and systems, for processing the filtered, detrended, green-color-intensity signal to derive a heartbeat rate for each of multiple windows of frames or, equivalently, of signal datapoints.

DETAILED DESCRIPTION

The current document is directed to methods and systems that determine the heartbeat rate of one or more human subjects, patients, and/or participants by analyzing a video recording. A first subsection, below, introduces an example application of the currently disclosed methods and systems along with an overview of video recording, with reference to FIGS. 1-4. In a second subsection, methods and subsystems that generate sequences of recorded adaptive regions of interest from the one or more human subjects, patients, and/or participants, along with a first phase of video processing carried out by the currently disclosed methods and systems, are disclosed with reference to FIGS. 5A-16. In a third subsection, signal generation from the recorded adaptive regions of interest and analysis of the generated signals to produce heartbeat rates are disclosed with reference to FIGS. 17A-30.

An Example Application

Figure 1:
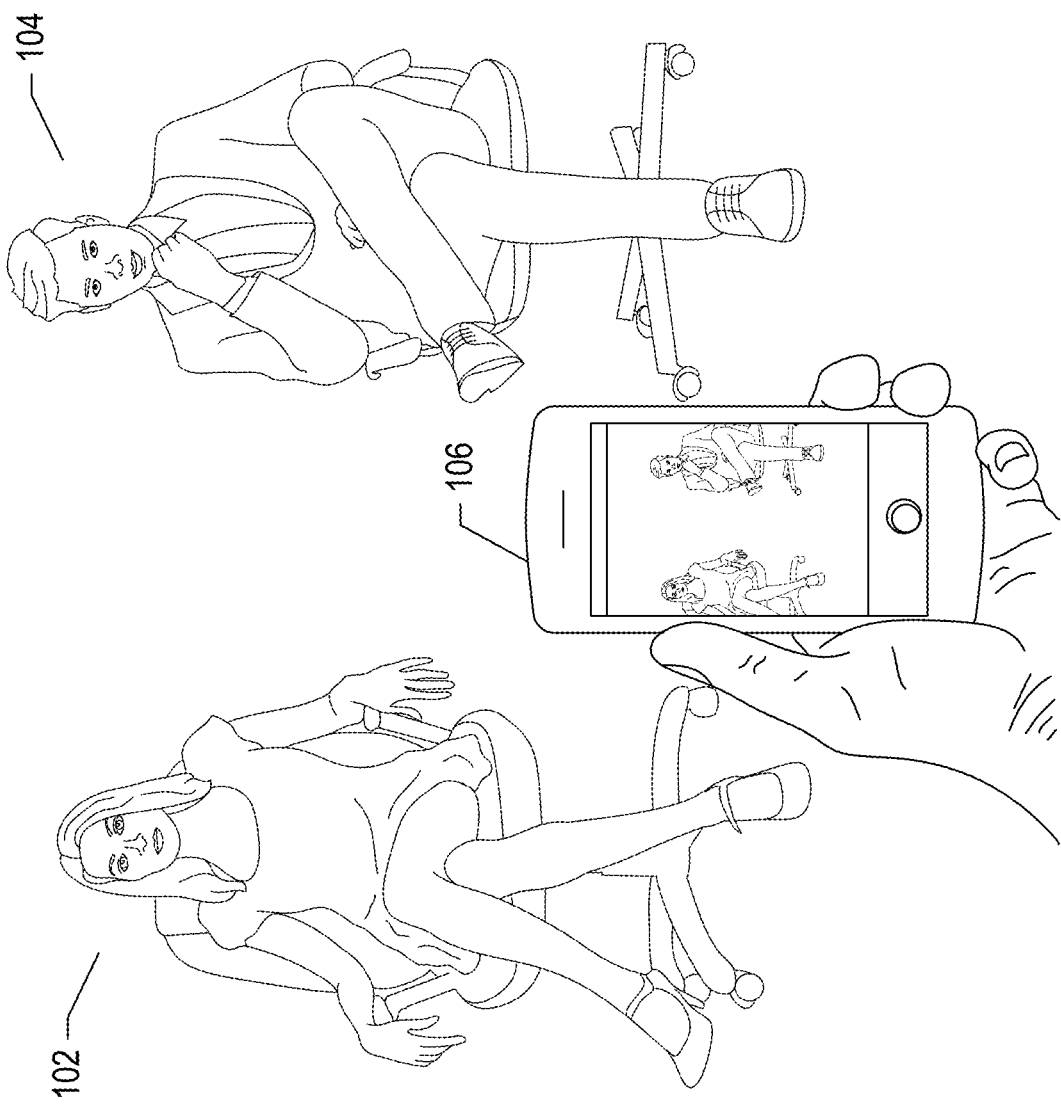
FIG. 1 illustrates video recording of an interactive session that includes two human participants.

FIG. 1 illustrates video recording of an interactive session that includes two human participants. In this example, a conversation between a first human participant 102 and a second human participant 104 is recorded on a smart phone 106. While the smart phone 106 is shown, in FIG. 1, to be held by a third person, the smart phone can alternatively be held by one of the two participants or affixed to a mechanical stand. The conversation is recorded as a first step of a semi-automated relationship-analysis process, in this example, but similar video recordings of humans can be made for a variety of alternative purposes, including monitoring physiological parameters of hospital patients, monitoring physiological parameters of a patient interacting with a physician via a video-conferencing application, monitoring physiological parameters of participants in various types of negotiations, and other such purposes. In the current example, determination of the heartbeat rates of the two participants at regular time intervals over the course of the conversation provides physiological-parameter information that is used, in addition to textual rendering of the conversation and encodings of expressions, gestures, and other encoded interpretations, to analyze dynamic relationship parameters associated with the relationship between the two participants.

As mentioned above, currently available remote photoplethysmography technologies are unsuitable for attempting to determine the heartbeat rate for human subjects imaged while interacting naturally, including moving their heads, gesturing, shifting their positions with respect to lighting sources, and while illuminated by poorly characterized light sources with varying intensities. Furthermore, currently available remote photoplethysmography technologies often require specialized video-recording equipment. Thus, in order to determine the heartbeat rates for the participants in the example setting shown in FIG. 1, new methods are needed that provide for more robust and accurate heartbeat-rate determination from videos of naturally interacting and behaving human subjects informally recorded using smart phones and other non-specialized video-recording equipment.

Figure 2:
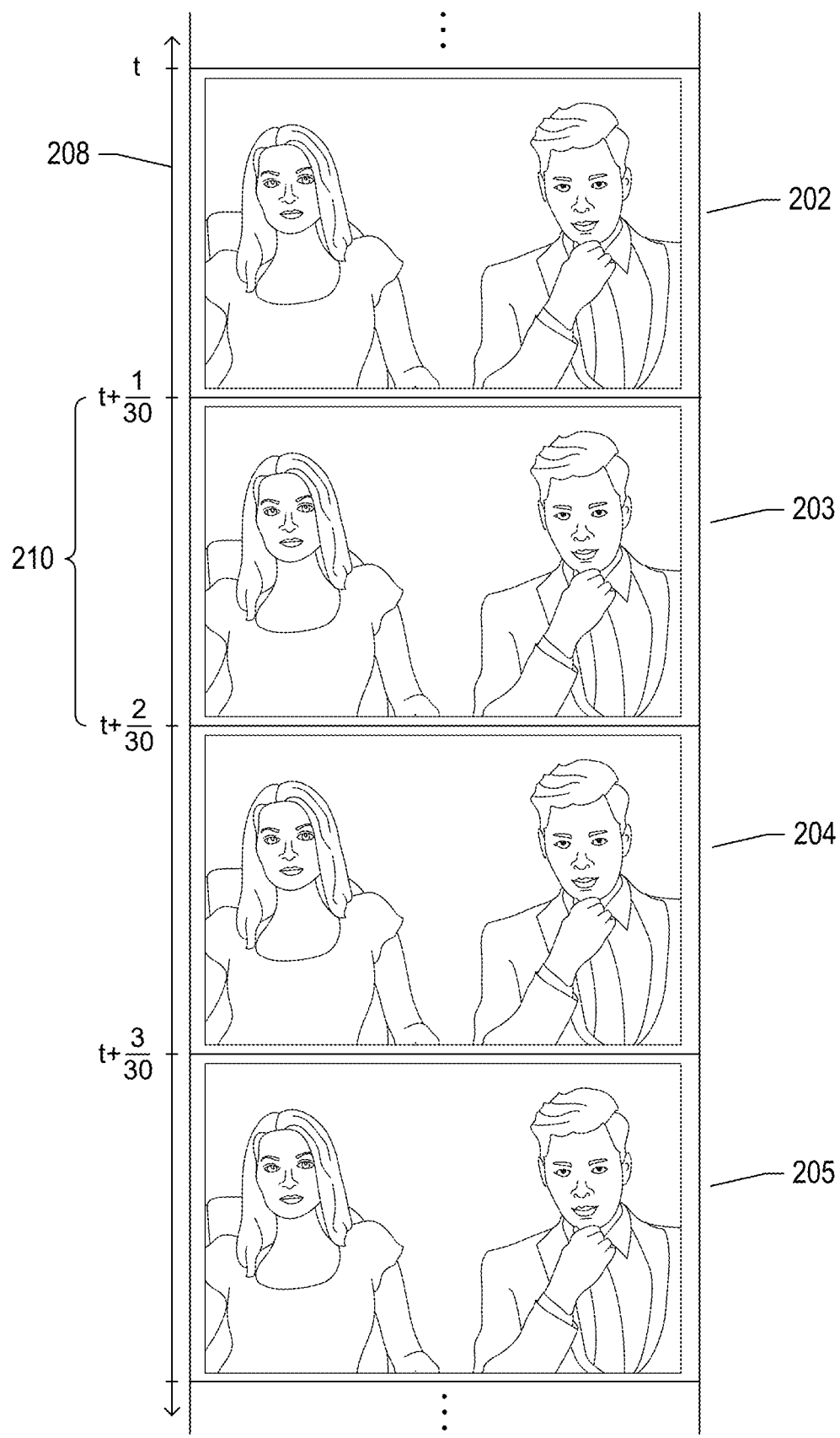
FIGS. 2-3 illustrates the nature of recorded video.
Figure 3:
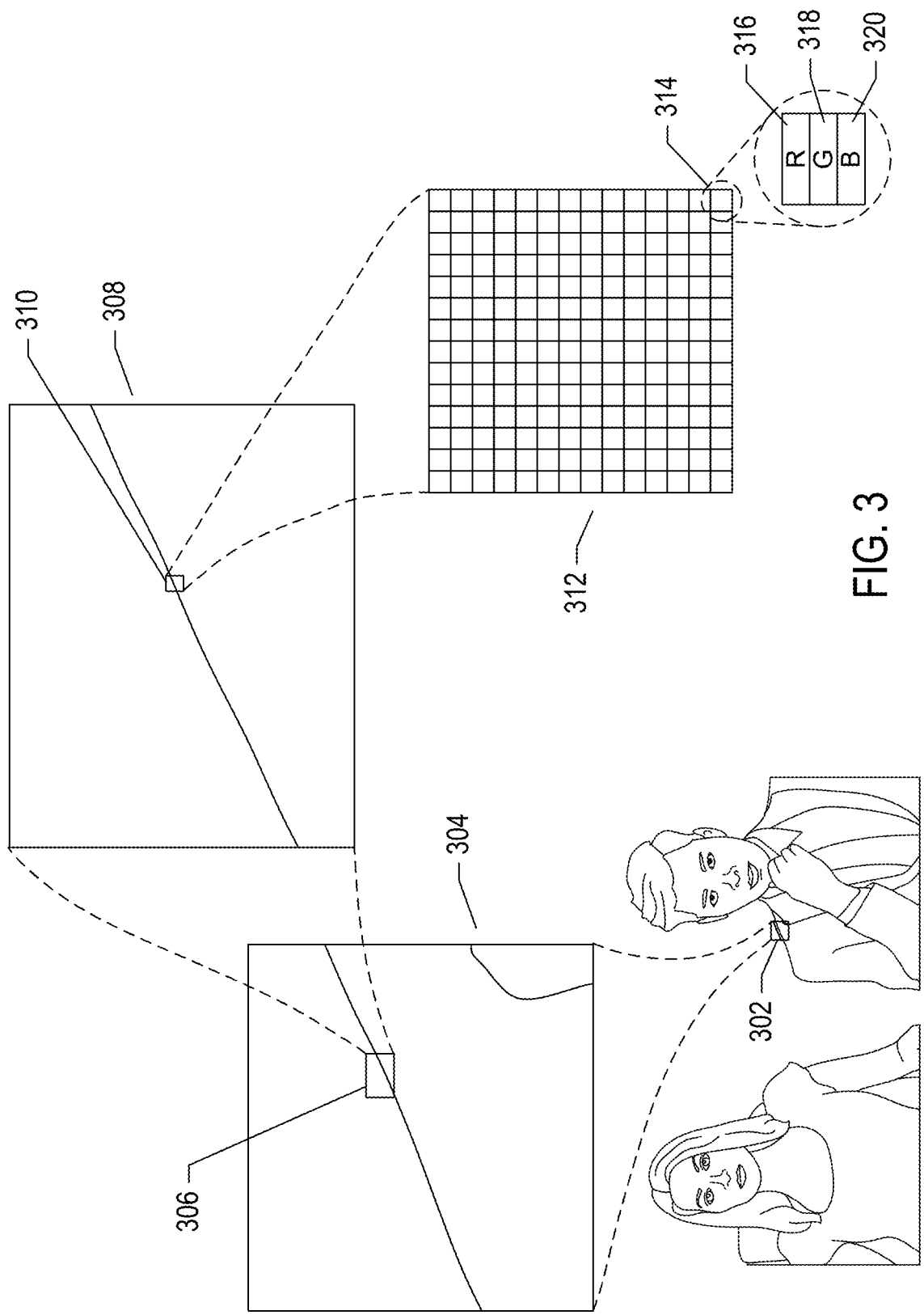

FIGS. 2-3 illustrate the nature of recorded video. A recorded video can be considered to be a series of still images 202-205 ordered along a timeline 208. The still images, referred to as "frames," are evenly spaced along the timeline by a time interval related to the frame rate of the video-recording apparatus, such as 30 frames per second. For a video recorded at 30 frames per second, the time interval between two successive frames is $\frac{1}{30}$ of a second 210. As shown in FIG. 3, each video frame is recorded as a series of pixels that are logically organized into a matrix of pixels that together compose a digital image. For example, consider the small square portion 302 of one of the video frames discussed above with reference to FIG. 2. When this small square portion 302 is magnified 304, a small square portion 306 of the magnified portion, again magnified 308, and a small square portion 310 of the doubly magnified portion considered, its digital representation 312 is logically viewed as a matrix of pixels. Each pixel, such as pixel 314, is a 24-bit representation of three different color-channels intensities: (1) an intensity for the R, or red, channel 316; (2) an intensity for the G, or green, channel 318; and (3) an intensity for the B, or blue, channel 320. The intensity of each of the color channels is represented by an 8-bit value, in many digital-image representations. The more pixels recorded by a video-recording apparatus per frame, the higher the resolution of the video recording.

Figure 4:
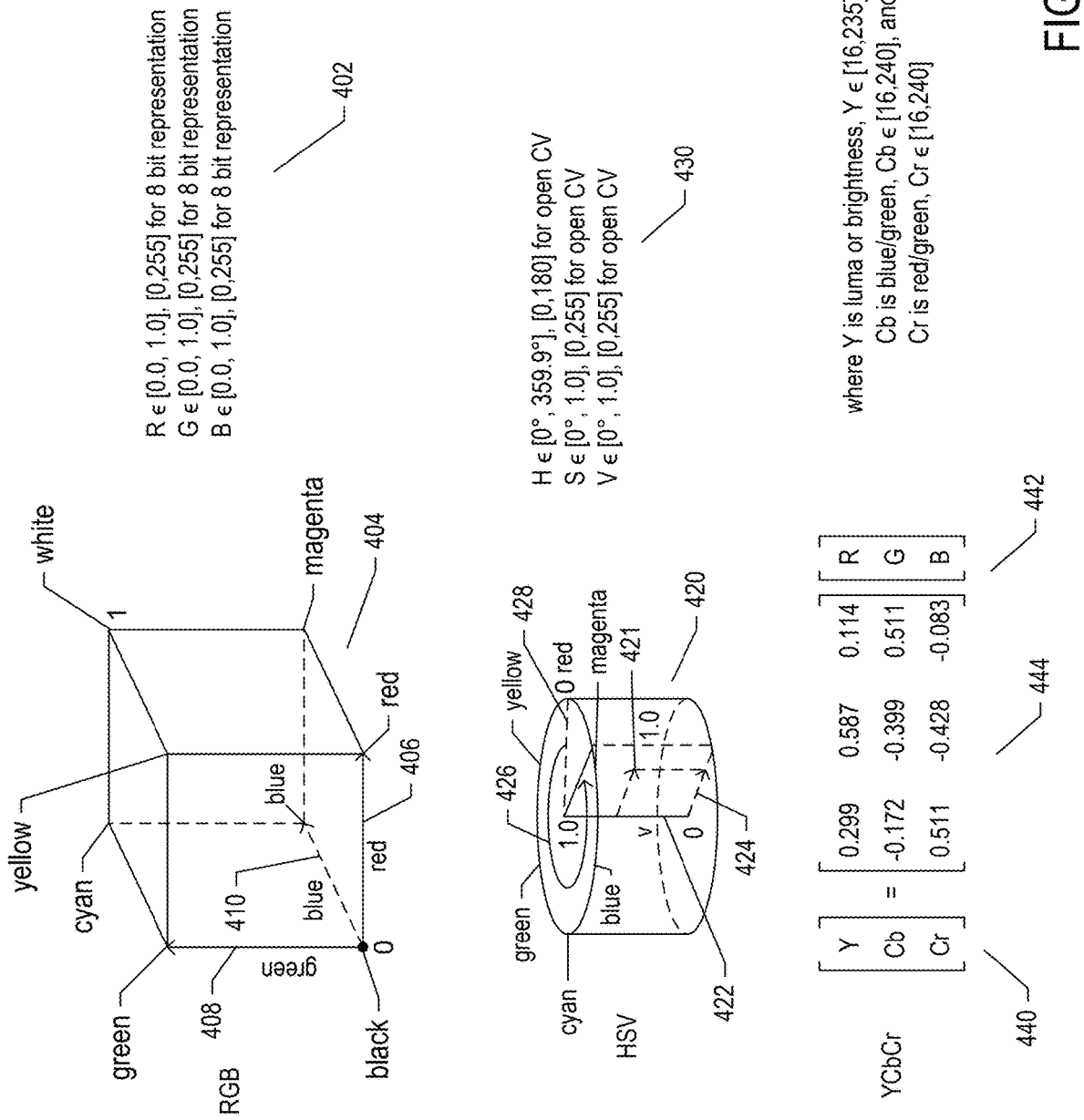
FIG. 4 illustrates various different color models used for encoding pixel values for digital images.

FIG. 4 illustrates various different color models used for encoding pixel values for digital images. The RGB model, discussed above with reference to FIG. 3, encodes different colors as combinations of red-channel, green-channel, and blue-channel intensities, as indicated by expressions 402. All of the colors that can be displayed using this model can be viewed as points within a color cube 404, which is a unit cube lying in a 3-dimensional Euclidean space defined by red 406, green 408, and blue 410 axes, with color-channel intensities selected from the set $\{0, 1/255, 2/255, \ldots, 255\}$. This is perhaps the most easily visualized color model. An alternative color model, referred to as the "HSV color model," can be visualized as a cylindrical volume 420 defined by a cylindrical coordinate system, each point 421 within which is defined by: (1) V, or value, 422, a distance along a vertical axis lying along the axis of rotation of the cylindrical volume 420; S, or saturation, 424, a radial distance from the vertical axis; and H, or hue, and angle 426 with respect to a reference radial axis 428 corresponding to the color red. Expressions 430 illustrates the ranges for the H, S, and V values in the HSV color model. A third color model, referred to as the "YCbCr color model," does not have an easily visualized geometrical representation. A 3-dimensional vector representation of a color in the YCbCr model 440 is obtained from a corresponding 3-dimensional vector representation of the same color in the RGB color model 442 by matrix multiplication of the RGB vector by matrix 444. Expressions 446 show the ranges for the Y, or luma, Cb, or blue/green ratio, and Cr, or red/green ratio, YCbCr-color-model components. There are both forward and backward matrix-multiplication-based transformations that allow for generation of a 3-dimensional vector representation of a color in any particular color model from a corresponding 3-dimensional vector representation of the color in a different color model.

Figure 5A:
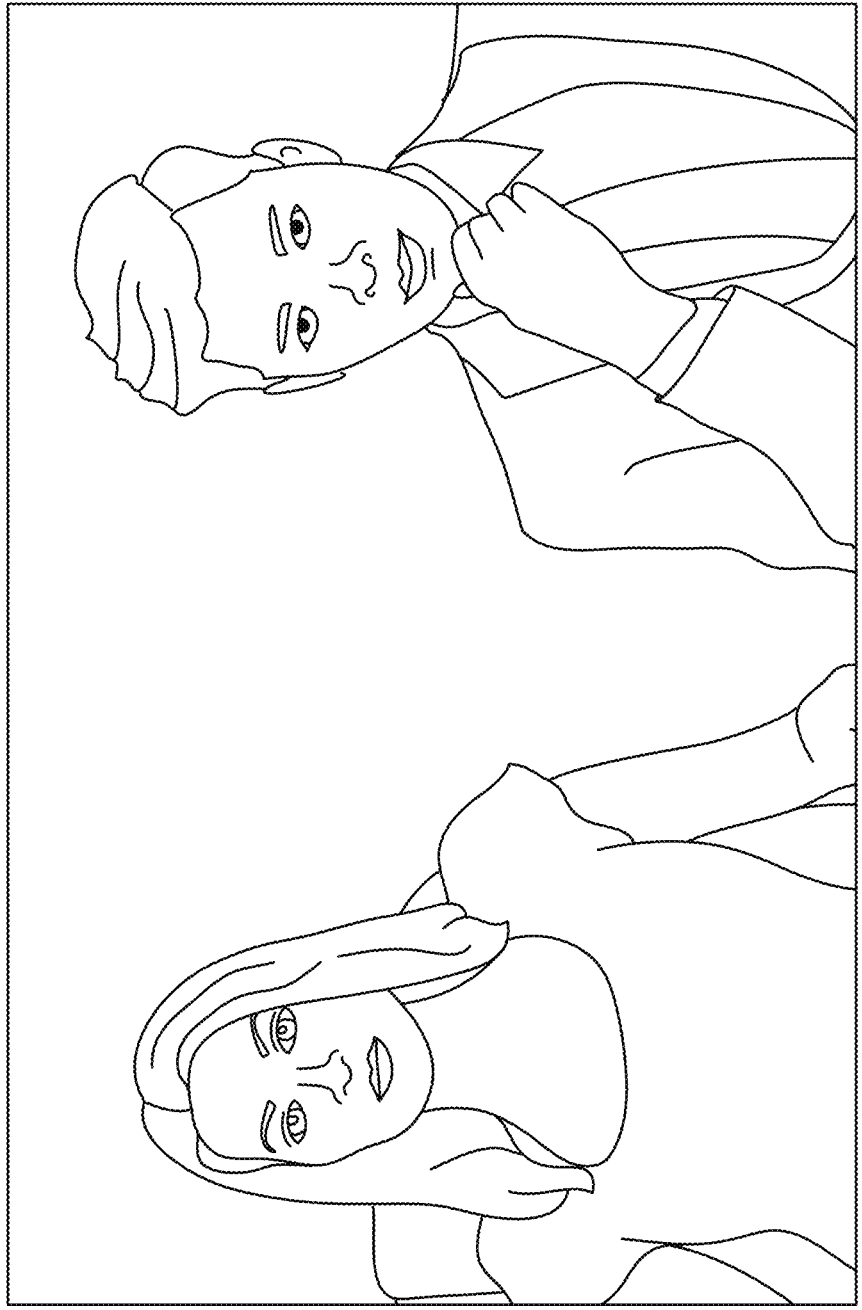
Figure 5B:
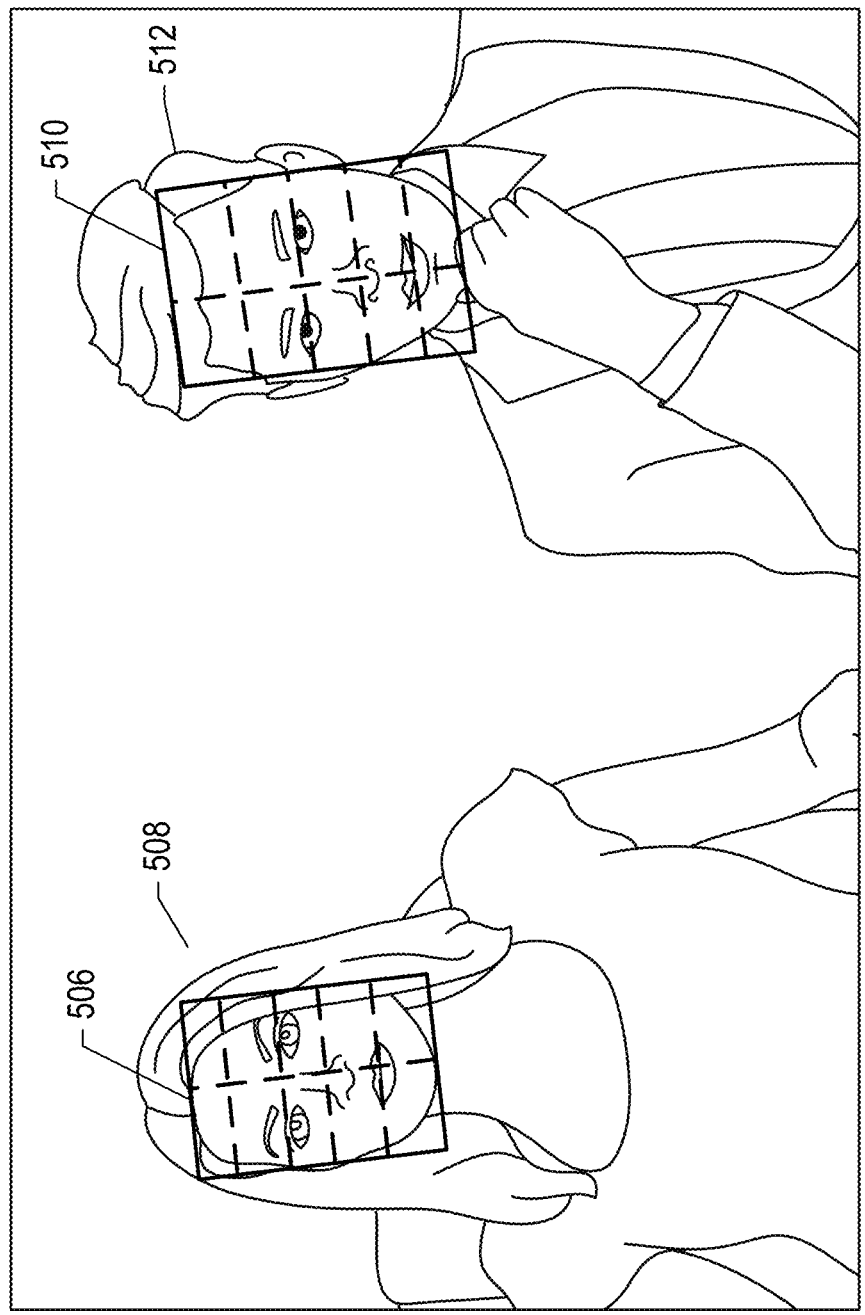
Figure 5C:
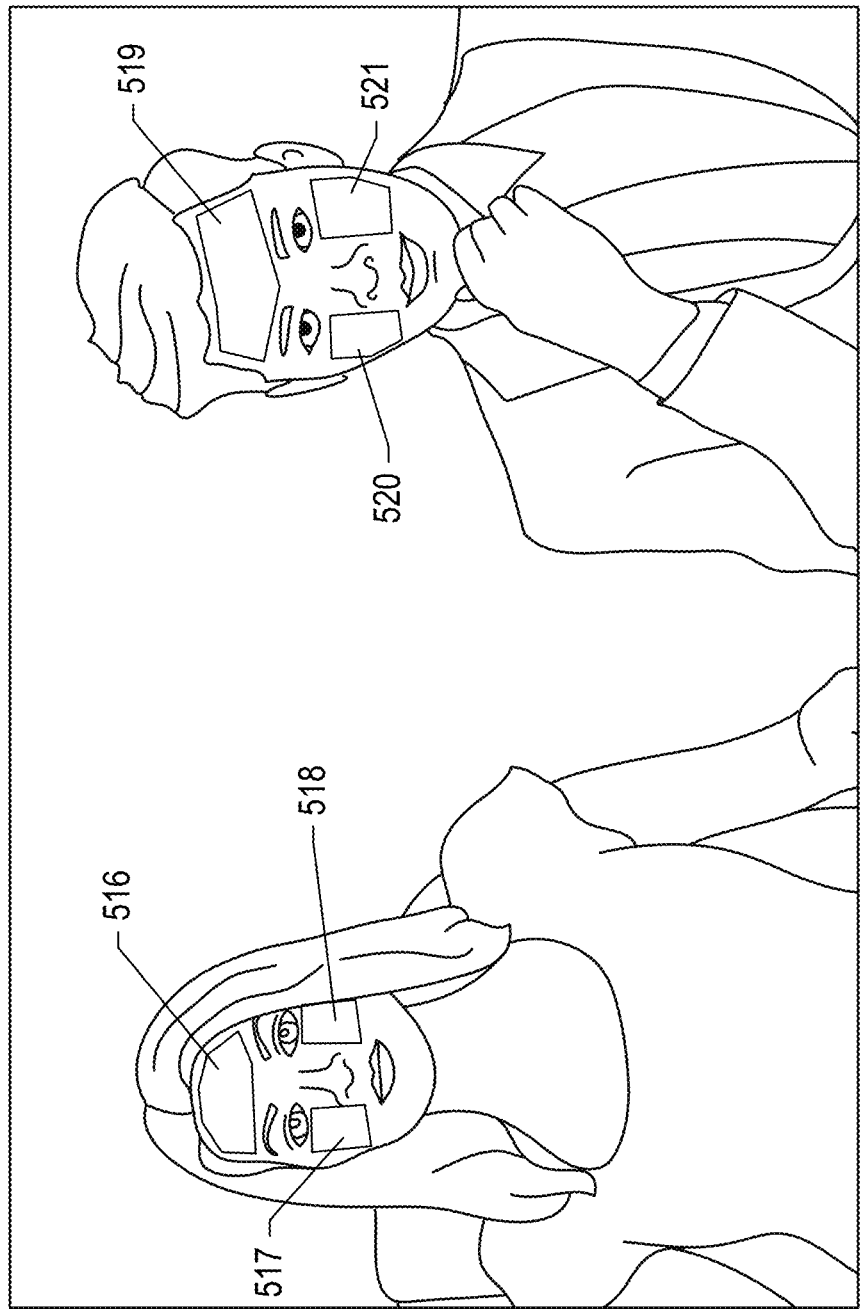
Figure 5D:
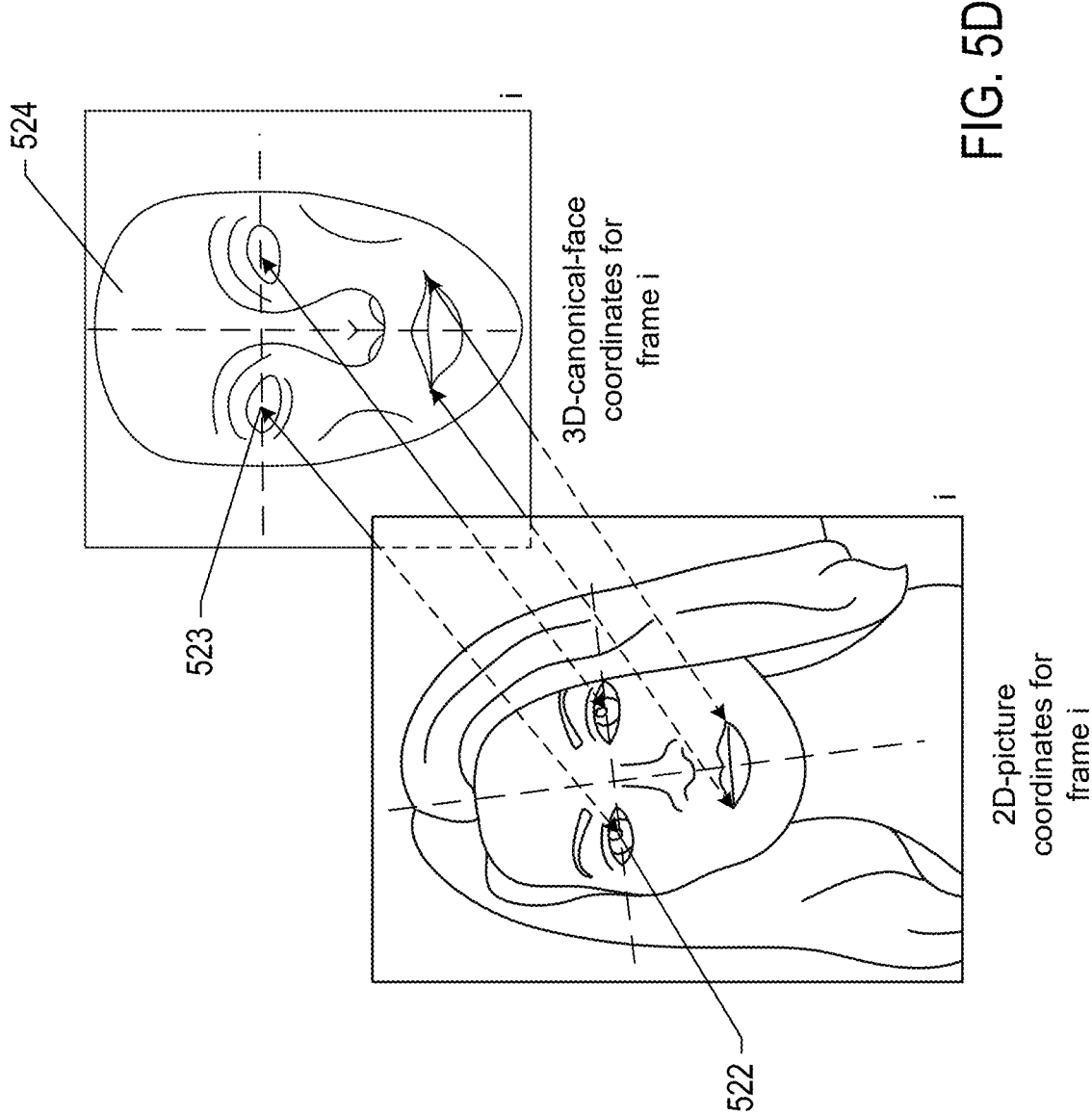
Figure 5E:
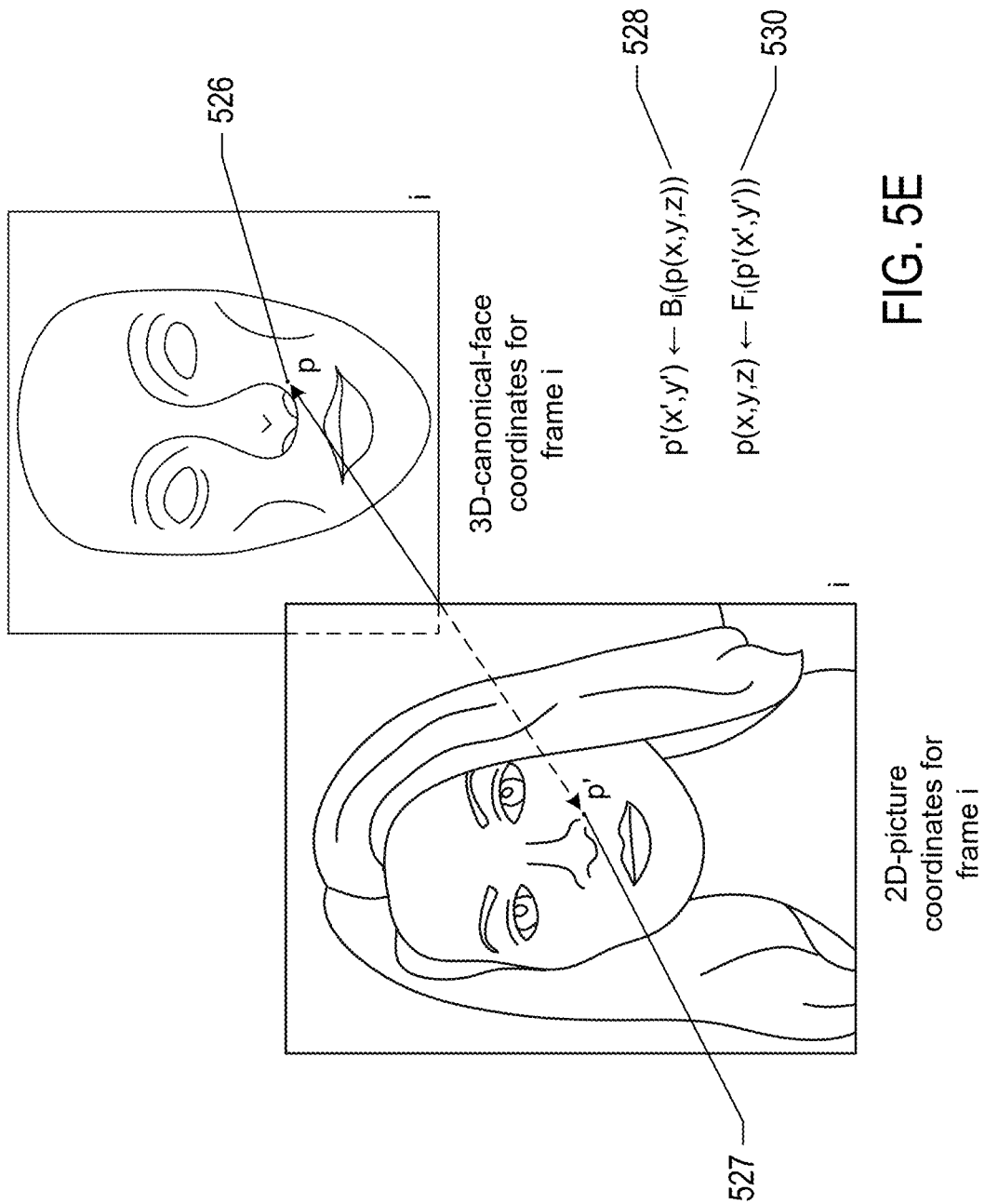

Methods and Subsystems that Generate Sequences of Recorded Adaptive Regions of Interest FIGS. 5A-H illustrate face detection and adaptive-region-of-interest identification. Figure SA shows a video frame from a video recorded in the example scenario illustrated in FIG. 1. Any of various different commercially available face-detection analysis methods, including face detection functionality provided by OpenCV, can be applied to the video frame to generate bounding boxes overlying the video frame indicating detected faces in the video frame, as shown in Figure SB. Bounding box 506 identifies the recognized facial image for the first participant 508 and bounding box 510 identifies the recognized facial image for the second participant 512. The bounding boxes may also contain reference line segments, shown in FIG. 5B as dashed line segments within the bounding boxes, to represent a vertical axis of bilateral symmetry and horizontal axes, including a horizontal axis passing through the pupils of both eyes and a horizontal axis coincident with the curve representing the interface between upper and lower lips. As shown in FIG. 5C, once bounding boxes defining facial sub-images have been generated, it is relatively straightforward to recognize relatively large areas of facial skin 516-521 that are candidates for regions of interest ("ROIs") that represent 2-dimensional areas from which color-intensity signals can be extracted over all or large subsets of the sequential video frames in a video recording. It is generally necessary, for subsequent signal analysis, for the raw color-intensity signals to be extracted from a particular adaptive region of interest ("AROI") for each human subject so that the extracted raw color-intensity-signal datapoints share a common basis for interpretation.

Figure 5F:
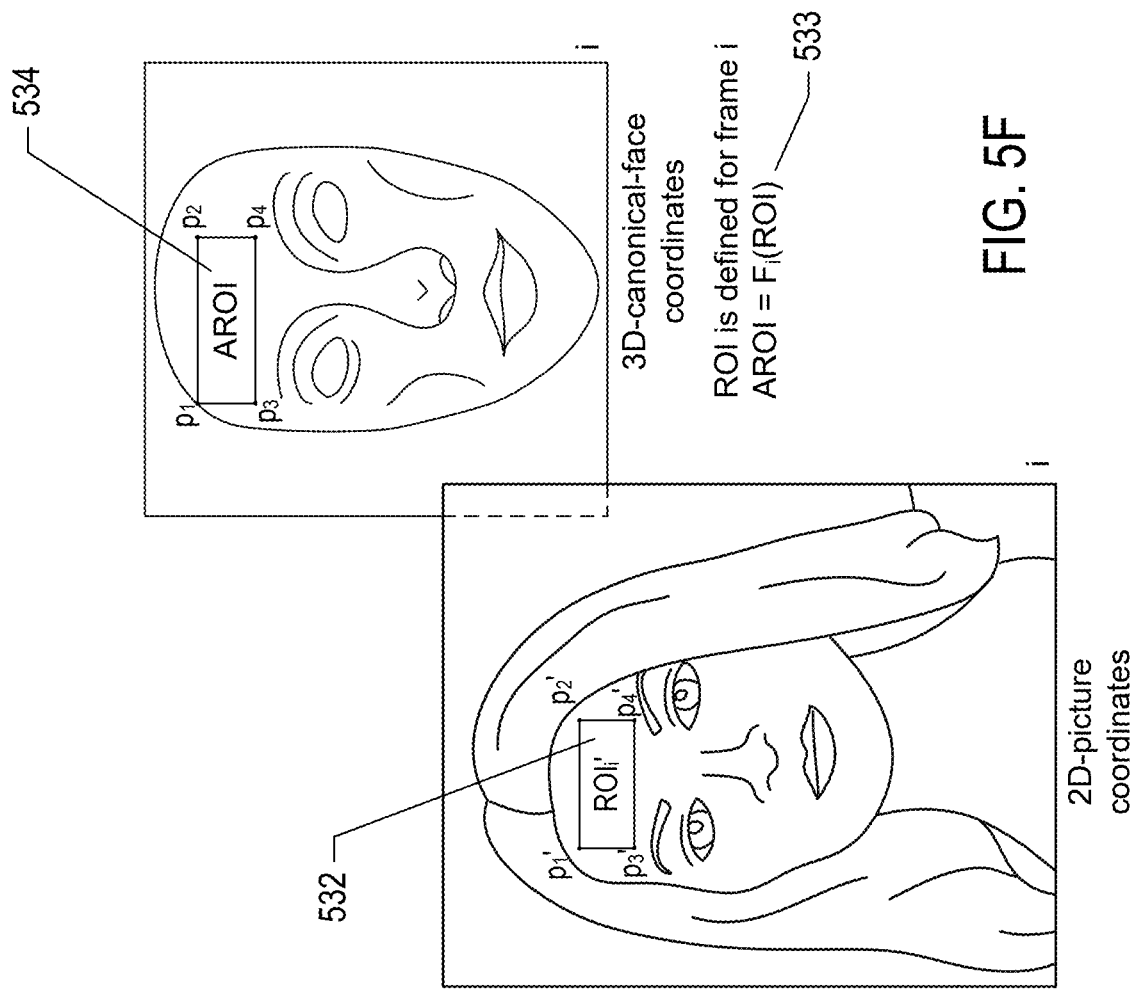
Figure 5G:
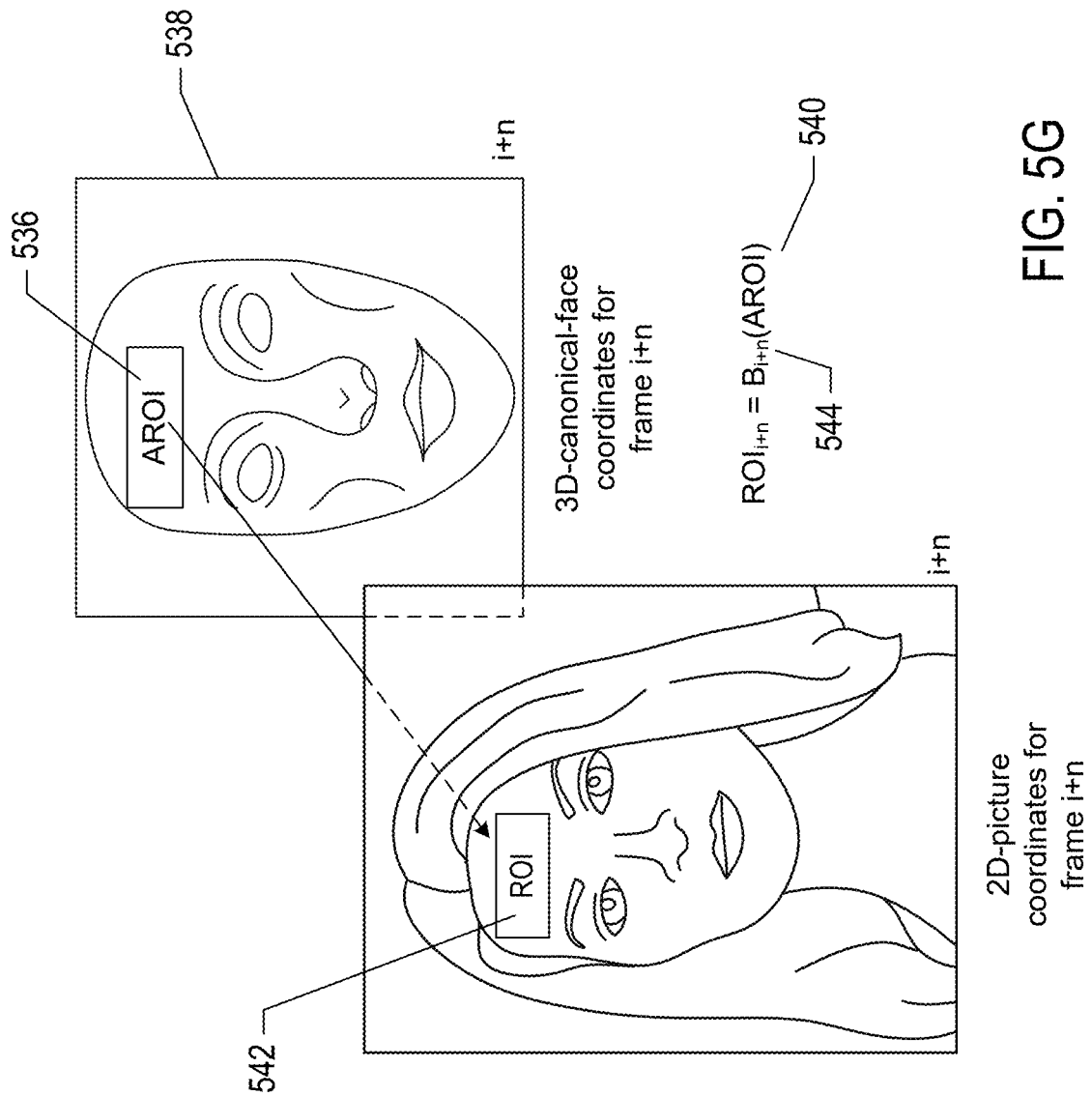

Once facial images have been identified in a video frame, the 2-dimensional coordinates for facial features within the visual images can be mapped to 3-dimensional coordinates for the facial features on the surface of a 3-dimensional canonical-face surface using any of various commercially available 2-dimensional-to-3-dimensional mapping methods, including methods provided by MediaPipe. Thus, for example, the 2-dimensional coordinates for the left eye pupil 522 can be mapped to the 3-dimensional coordinates for the left eye pupil 523 on the surface of a 3-dimensional canonical face 524. The mapping is bidirectional, as shown in Figure SE. For example, a point p 526 on the 3-dimensional canonical-face surface can be mapped to the corresponding point p' 527 on the 2-dimensional facial image by a backwards transformation 528 and the point p' on the 2-dimensional facial image can be mapped to corresponding point p 526 on the 3-dimensional canonical-face surface by forward transformation 530. As shown in FIG. 5F, a region of interest ("ROI") 532 defined by points representing the vertices of a polygon, in this case a rectangle, can be identified by searching for a large area with skin color and free of non-skin features within a 2-dimensional facial sub-image within video frame i. By using the forward transformation, the ROI can be mapped 533 to a corresponding AROI 534 on the 3-dimensional canonical-face surface. The AROI is defined by the 3-dimensional coordinates of the vertices of the polygon that defines both the ROI and AROI. As shown in FIG. 5G, the same 3-dimensional coordinates can be used to describe the same AROI 536 for a subsequent video frame 1+n 538, which can then be mapped 540 back to a corresponding 2-dimensional ROI 542 in the 2-dimensional video frame i+n. The backwards and forwards transformations are video-frame dependent, as indicated by the subscripts, for example subscript 544, used with the "F" and "B" symbols indicating the forward and backward coordinate transformations. The 3-dimensional coordinates for the AROI are canonical-face-surface coordinates, rather than image coordinates, however, and thus the 3-dimensional coordinates for the AROI in video frame i+n are identical to the 3-dimensional coordinates for the AROI in video frame i. By contrast, the 2-dimensional coordinates for the ROI in video frame i+n may differ from the 2-dimensional coordinates for the ROI in video frame i, since the 2-dimensional coordinates are image coordinates rather than facial-surface coordinates. Thus, the 3-dimensional coordinates for the AROI can be mapped 542 to the 2-dimensional coordinates for the ROI in video frame i+n even though the 3-dimensional coordinates for the AROI were originally obtained by transformation of the 2-dimensional coordinates for the ROI in video frame i. In other words, once the 3-dimensional coordinates for an AROI are determined, the same 3-dimensional coordinates for the AROI can be used to find the corresponding ROI in subsequent video frames, provided, of course, that a sub-image of the subject's face is present in the subsequent video frames. This allows, as shown in FIG. 5H, for an AROI to be mapped back to the 2-dimensional sub-images of a subject's face in two different video frames despite changes in the orientation and/or position of the subject's head in the interval of time between the times at which the two different video frames were recorded. In a first video frame 550, an ROI 552 spans a portion of the subject's forehead, with the subject's face oriented parallel to the image plane of the video-recording apparatus. In a second, subsequent video frame 554, the subject has turned his head to the right, but once the backward coordinate transformation for the subsequent video frame is determined, the AROI is easily mapped to a corresponding ROI 556 within the 2-dimensional facial sub-image. Notice that the shape of the ROI in the second video frame differs greatly from the shape of the ROI in the first video frame, and such shape changes would be difficult to predict without the backward coordinate transformation from 3-dimensional AROI coordinates to 2-dimensional ROI coordinates.

Figure 6:
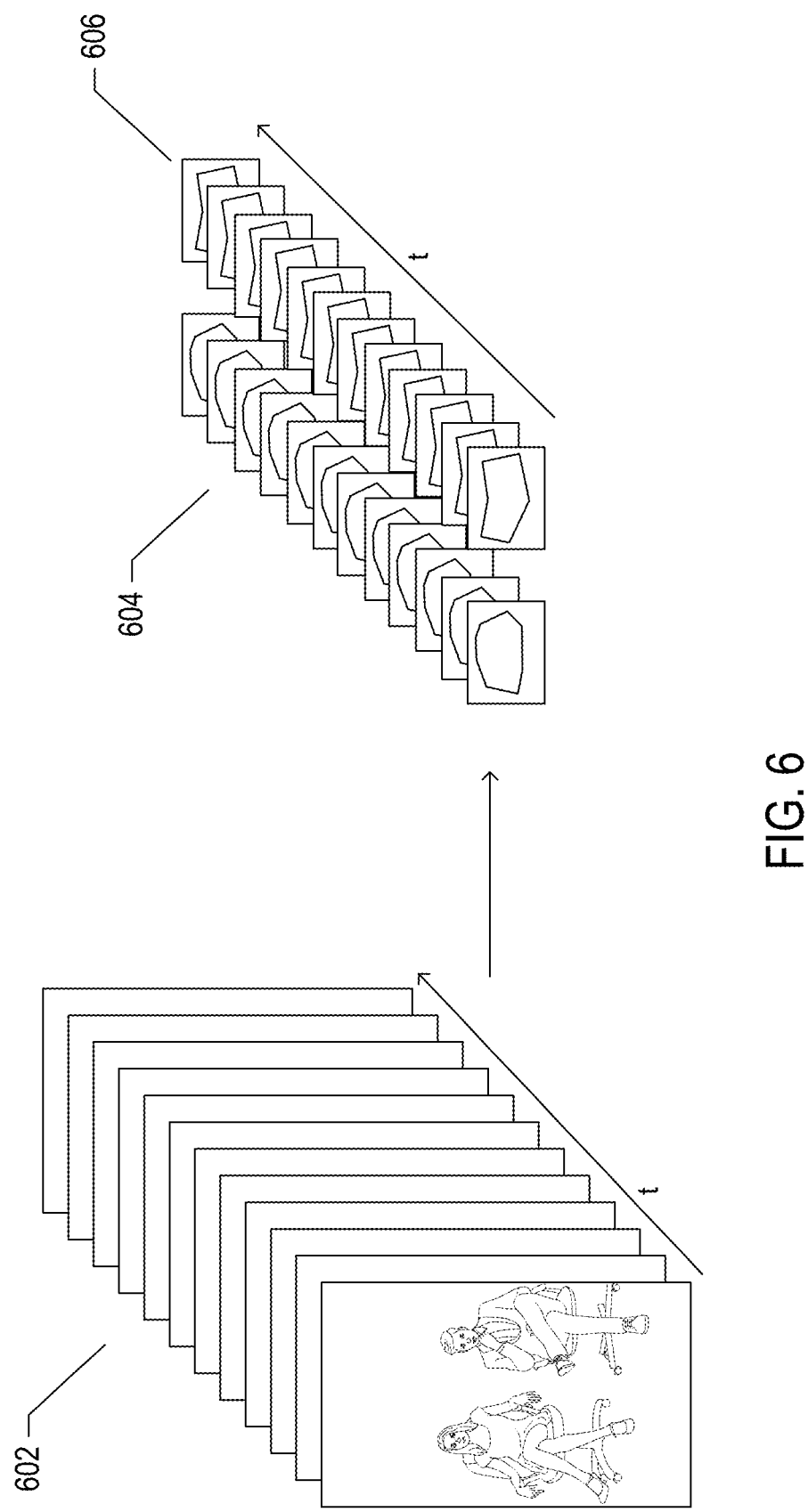
FIG. 6 illustrates reduction of a sequence of recorded-video frames to two sequences of ROI sub-images.

FIG. 6 illustrates reduction of a sequence of recorded-video frames to two sequences of ROI sub-images. The recorded video for the interaction between the two participants, introduced with reference to FIG. 1, is represented on the left of FIG. 6 as a time-ordered sequence of video frames 602. Following determination of an AROI for each of the two participants, the recorded-video information can be reduced to two time-ordered sequences 604 and 606 of AROI-containing sub-images extracted from the corresponding video frames. This represents a first phase of recorded-video processing for determining heartbeat rates for the two participants. The remaining portion of the current subsection of this document provides a detailed disclosure of this first recorded-video-processing phase. Note that, in certain cases, a different AROI may be used for a particular subject, patient, or participant for different portions of a video recording. For example, were the hair of a subject, patient, or participant to suddenly fall over, and obscure a large part of the subject's, patient's, or participant's forehead, then a previously used forehead-resident AROI may no longer be useable, as a result of which a new cheek-resident AROI might be selected and used for subsequent frames.

Figure 7A:
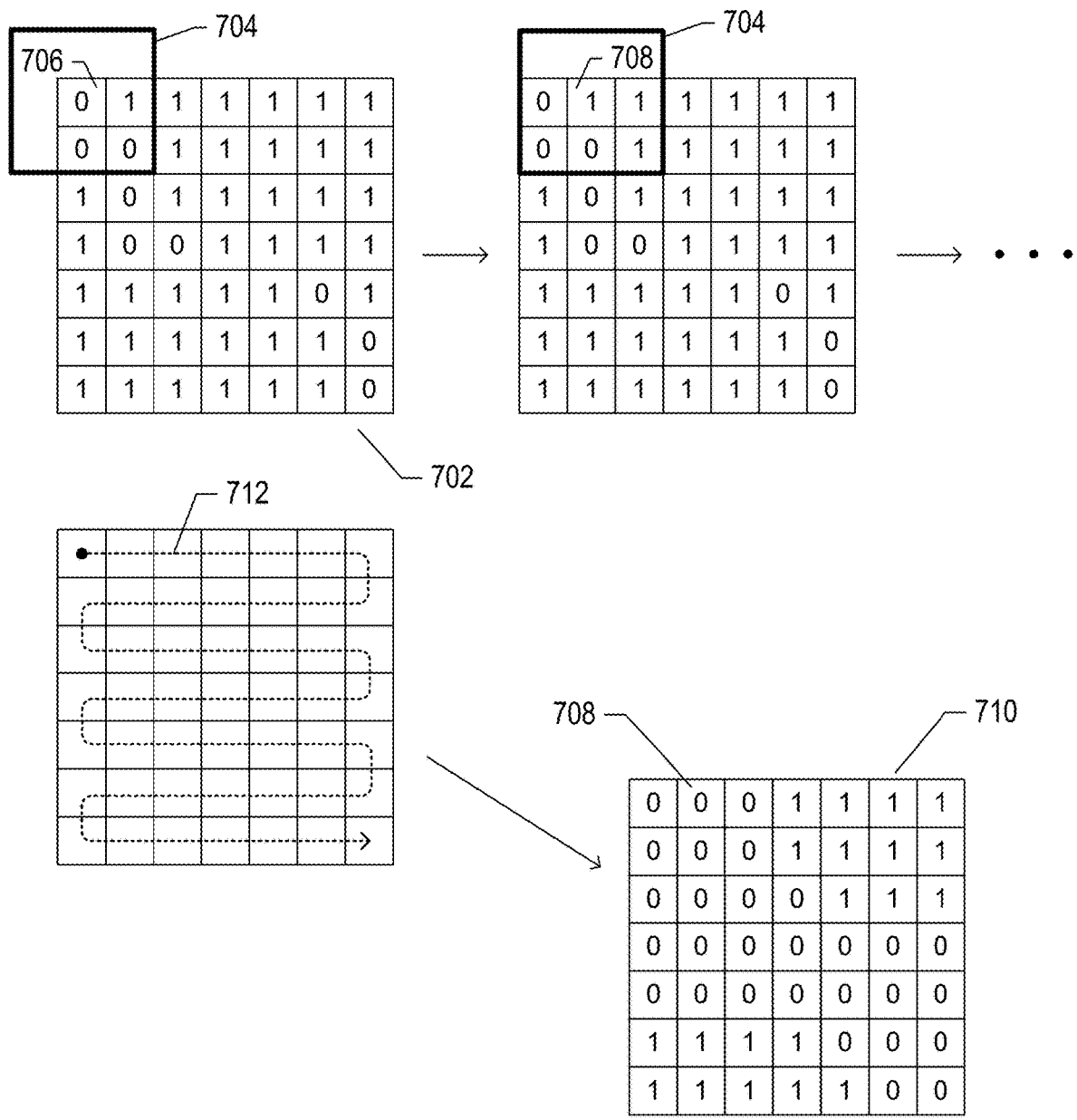
Figure 7B:
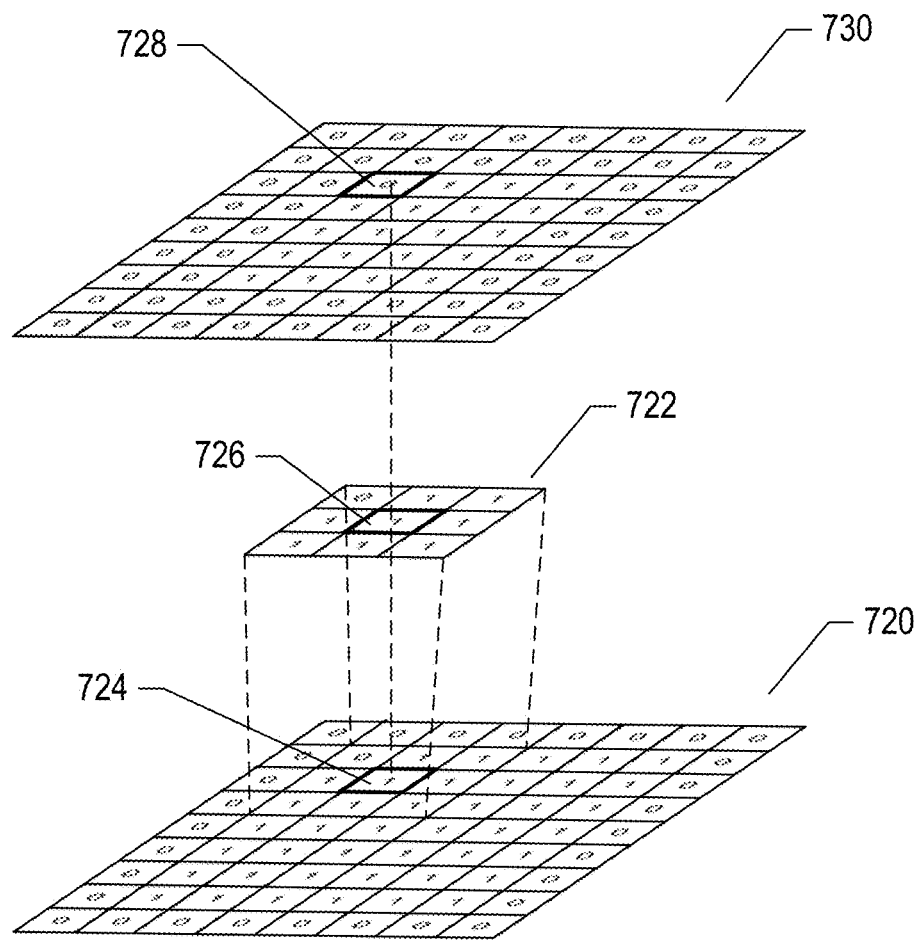

FIGS. 7A-C illustrate an erosion operator that is applied to a digital image or digital-image mask. The top left-hand portion of FIG. 7A shows a small portion of a digital-image mask 702. The digital-image mask is a matrix of pixels, but the pixels contain only one of two numerical values: (1) 0, or FALSE; and (2) 1, or TRUE. The pixels with value 0 represent pixels that are being masked when the digital-image mask is applied to a digital image. The pixels with value 1 represent the pixels that are not masked when the digital-image mask is applied to a digital image. Digital-image masks are used to remove pixels from a digital image. The value 0 also corresponds to pure black, with the three color-channel intensities of the RGB color model all equal to 0. The values 0 and 1 also commonly correspond to Boolean values FALSE and TRUE, in various programming languages. A small square with sides of a length corresponding to 3 pixels 704 represents an erosion operator. As shown in the top left-hand portion of FIG. 7A, the erosion operator is centered over the top left-hand pixel 706 of the digital-image mask. When any of the digital-image mask pixels underlying the erosion operator have the value 0, the digital-image mask pixel in a resulting, eroded digital mask underlying the center of the erosion operator is set to 0. Thus, application of the erosion operator to pixel 706 in digital-image mask 702 results in pixel 706 in a resultant digital-image mask having the value 0. In the top right-hand portion of FIG. 7A, the erosion operator 704 has been moved to center over pixel 708 in the digital-image mask. This pixel has the value 1, but since three of the pixels in the digital-image mask overlain by the erosion operator of the value 0, the value of pixel 708 in the resultant mask is set to 0 by the erosion operator, as can be seen in the eroded digital-image mask 710 produced by applying the erosion operator to each pixel in the digital-image mask, as indicated by the erosion-operator application pixel path 712 along which the erosion operator is successively centered and applied. The erosion operator essentially erodes the 1-valued pixels bordering 0-valued pixels in the resultant digital-image mask, as can be seen in the eroded digital-image mask 710. In general, this has the effect of smoothing the boundaries between areas of 0-valued pixels and areas of 1-valued pixels as well as removing small 1-valued-pixel features within 0-value-pixel regions of the digital-image mask.

FIG. 7B illustrates operation of the erosion operator. An initial digital-image mask 720 is shown in the lower portion of FIG. 7B. An erosion operator 722 is centered over digital-image-mask pixel 724, with the value of that pixel and neighboring pixels projected upward into the erosion operator. Because there is a 0-valued pixel 726 within the erosion operator, the value 1 in pixel 724 of the digital-image mask is changed to 0 728 in the eroded digital-image mask 730. FIG. 7C shows a larger digital-image mask 736 and a corresponding eroded digital-image mask 738 produced by applying the above-discussed erosion operator to each pixel within the digital-image mask 736. Each of the darkly colored pixels has the value 0 and each of the unshaded pixels has the value 1. While the erosion operator, in the example shown in FIGS. 7A-C, is a 3×3 operator, erosion operators of different sizes and shapes can be alternatively employed. Erosion operators may be applied directly to digital images, with pixels having neighbors with average intensity values below a specified threshold set to the value 0 or to some other value by the erosion operator.

Figure 8C:
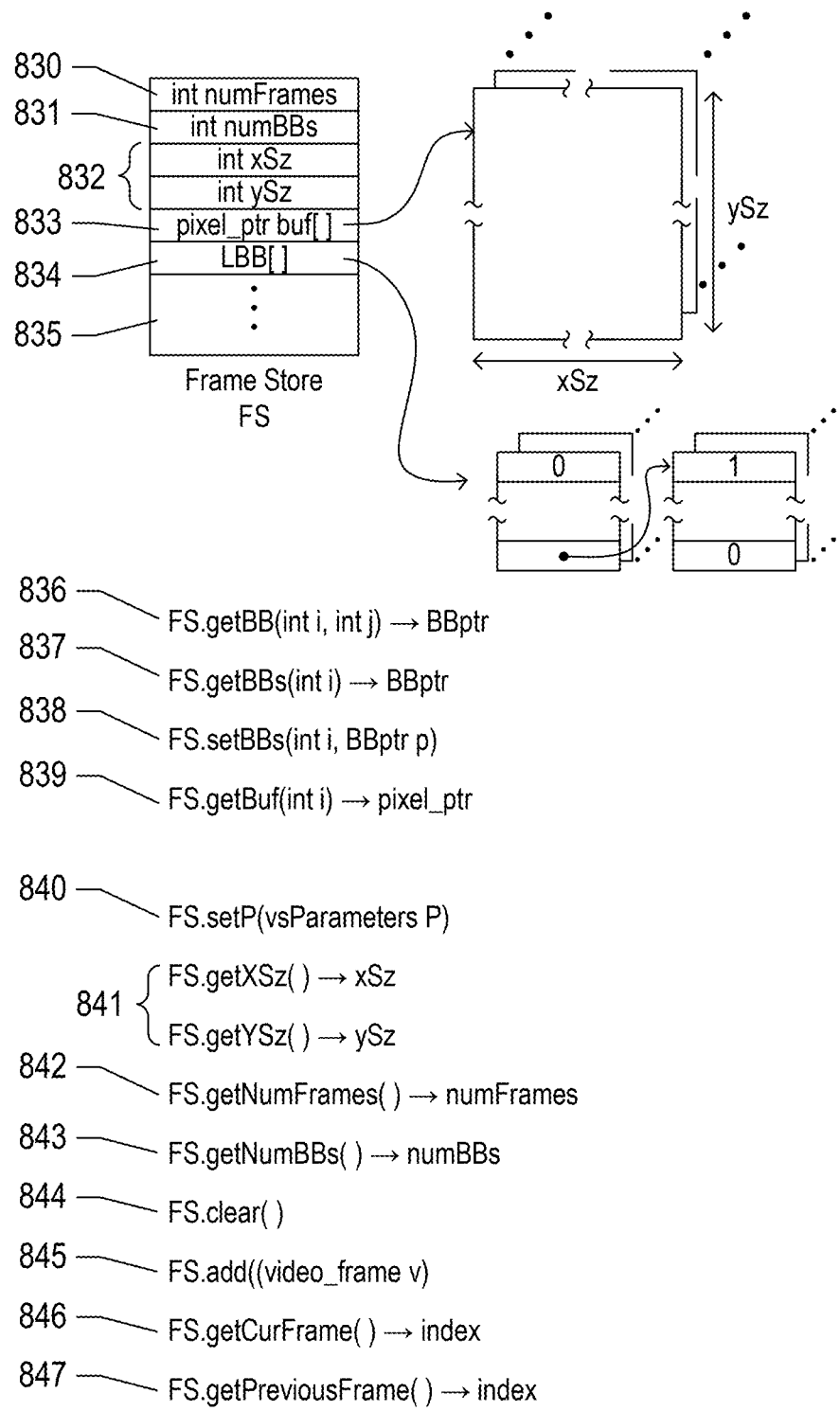
Figure 29:
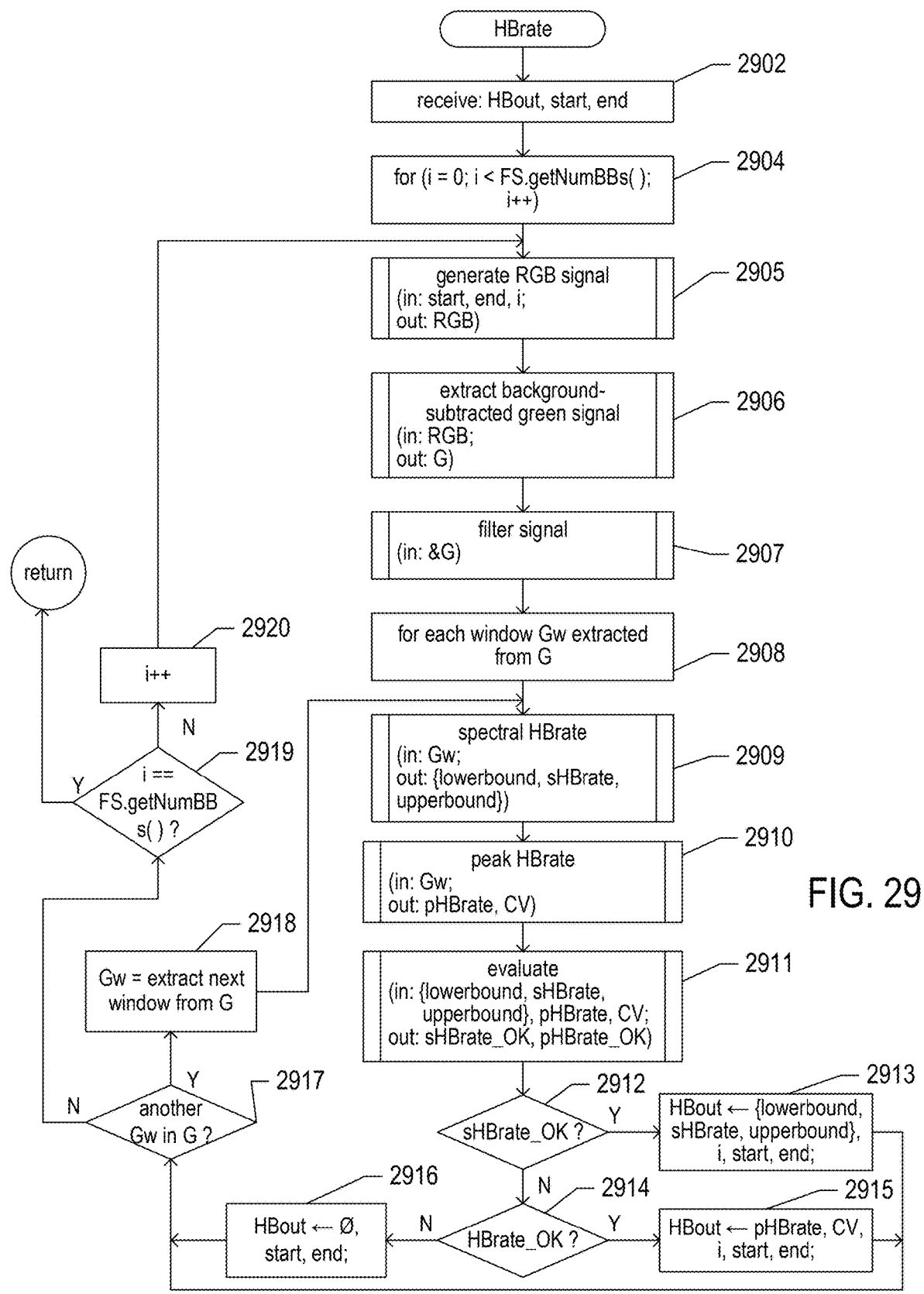
FIG. 29 FIG. 29 provides a control-flow diagram for the routine "HBrate," called in steps 1212 and 1222 of FIG. 12.

FIGS. 8A-D illustrate various global variables, constants, and data structures used in control-flow diagrams shown in FIGS. 9-16 which, together with FIG. 29, illustrate an implementation of recorded-video processing that produces heartbeat rates for imaged human subjects, patients, and/or participants. Figure 8A shows the declarations of a number of global variables and constants used in the control-flow diagrams shown in FIGS. 9-16. The global variable FS 802 is an instance of a FrameStore data structure, or object, discussed below with reference to FIG. 8C. This data structure stores a sequence of video frames along with bounding boxes for facial sub-images and other information. The variable online 803 indicates whether or not recorded-video processing is being carried out in real time, as the video is being recorded, or offline, following video recording. The main difference is that, during online processing, heartbeat rates are determined over blocks of frames and output immediately while during offline processing, heartbeat rates are determined for the entire recorded video following completion of video recording. In both cases, heartbeat rates are computed for successive time windows so that the recorded video can be annotated with heartbeat rates for subjects, patients, and/or participants. The integer variable blkStart 804 indicates the frame number of the first frame in a next block of video frames to be processed. The Boolean variable finished 805 indicates that video recording is complete and that no further frames will be recorded for subsequent processing. The array of 3D-AROI data structures, candidateAROIs[ ] 806, contains a set of 3D-AROI data structures, or objects, representing the different possible AROIs from which an AROI for a particular subject, patient, and/or participant can be selected for extracting color-intensity signals from facial sub-images of the subject, patient, and/or participant in a video recording. The integer array currentAROIs[ ] 807 includes indexes of 3D-AROI data structures in the array candidateAROIs to indicate the current AROI used for each subject, patient, or participant. The 2-dimensional array AROI_Tab[ ][ ] 808 stores information collected for each of the candidate AROIs during evaluation of the candidate AROIs with respect to the facial sub-images of a particular subject, patient, or participant. The first index corresponds to a candidate AROI index and the second index corresponds to one of two different types of information: (0) the count of frames in a sequence of frames for which acceptable skin-pixel/total-pixel ratios have been observed for the candidate AROI; and (1) the average skin-pixel/total-pixel ratio for frames from which color-intensity signals have been extracted using the candidate AROI. The integer constant blkSize 809 is the number of video frames collected in each first-level window, or block, of video frames generated during video recording. The integer arrays currentTs[ ] 810 and storedTs 812 contain the number of pixels in ROI masks and the arrays of masks currentMasks[ ] 814 and storedMasks[ ] 816 contain ROI masks used for color-intensity-signal extraction, FIG. 8B illustrates a bounding-box data structure BB and a list of bounding-box data structures LBB. The BB data structure 820 includes information that describes a bounding box that defines a facial sub-image. This information includes an index or identifier for the bounding box 821, x and y coordinates for the lower left-hand corner of the bounding box 822, the width of the bounding box 823, the height of the bounding box 824, and a pointer to another BB data structure 825. A schematic of a bounding box 826 is shown to indicate the meaning of certain of the information stored in the BB data structure. The LAB data structure 827 is a singly-linked list of BB data structures. A function member of the LBB class, getBB( ) 828, returns a pointer to a BB data structure corresponding to an input bounding-box index.

FIG. 8C illustrates an instance of the FrameStore data structure, or object, referred to as FS. This data structure stores a sequence of video frames and associated bounding boxes. The FrameStore data structure includes an indication of the number of video frames 830, the number of bounding boxes for each video frame 831, the size, in pixels, the video frames 832, an array of pointers to video frames 833, and an array of pointers to link lists of bounding boxes 834. Ellipsis 835 indicates that the FrameStore data structure may contain additional data members. An instance of the FrameStore data structure object includes numerous function members, including: (1) getBB( ) 836 which receives a frame number/ and BB index j and returns a pointer to the jth BB data structure for the ith video frame stored by the FrameStore data structure; (2) getBBs( ) 837, which receives and index for a video frame and returns a pointer to the list of BB data structures associated with the frame; (3) setBBs( ) 838, which adds a list of BB data structures to the FrameStore data structure associated with a particular video frame: (4) gerBuf( ) 839, which returns a pointer to a video-frame buffer storing the video frame corresponding to an input frame number; (5) setP( ) 840, which receives a set of video parameters P and stores certain of the parameters within the FrameStore data structure; (6) getSx( ) and getSy( ) 841, which return the horizontal and vertical sizes of the stored video frames; (7) getNumFrames( ) 842, which returns the number of stored video frames; (8) getNumBBs( ) 843, which returns the number of BB data structures associated with each stored video frame; (9) clear( ) 844, which re-initializes the FrameStore data structure, deallocating allocated buffers and data-structure lists; (10) add( ) 845, which adds a next video frame to the FrameStore data structure; (11) getCarProme( ) 846, which returns the frame number of the most recently stored frame; and (12) getPreviousFrame( ) 847, which returns the frame number of the next most recently stored frame.

Figure 8D:
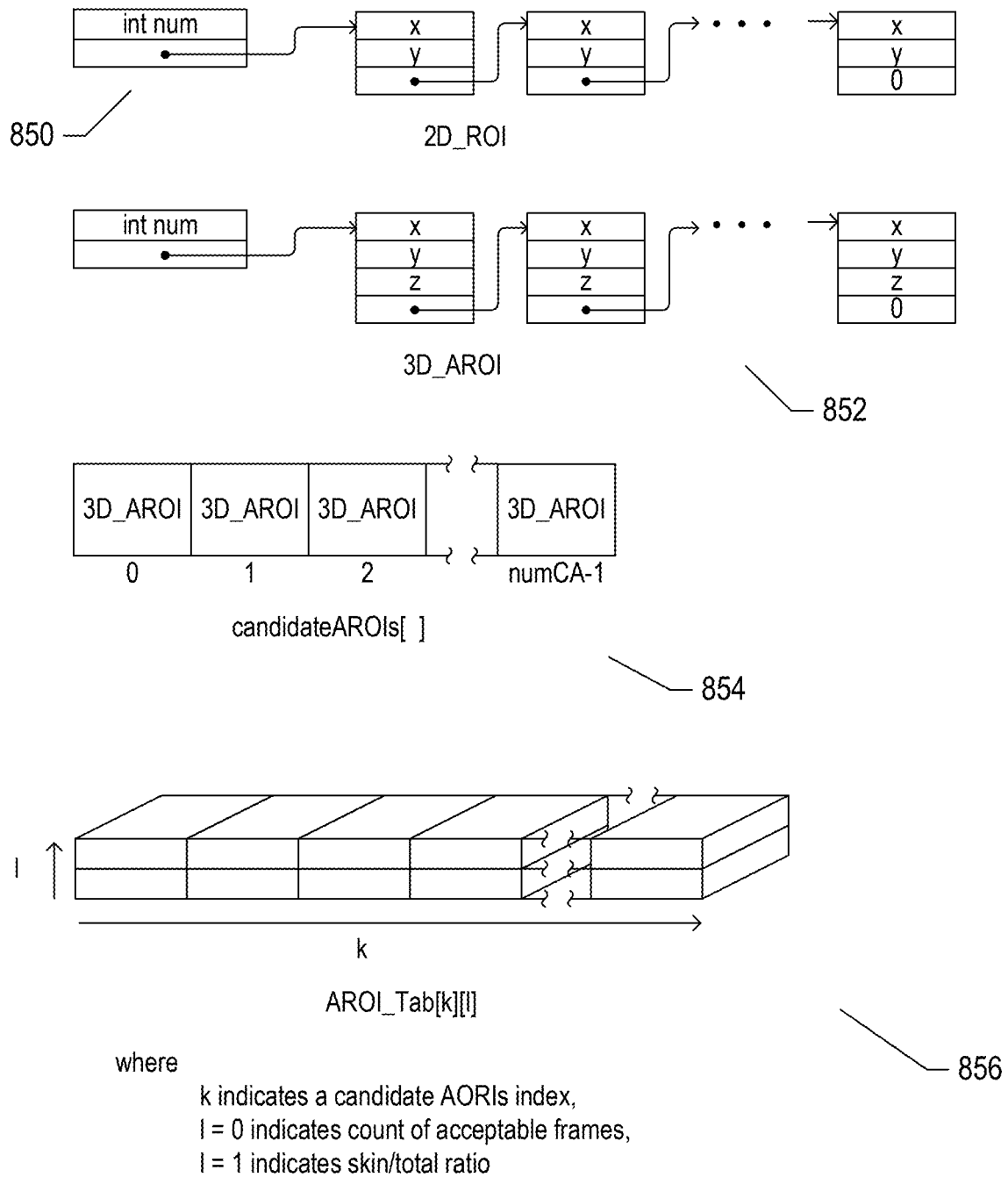

FIG. 8D illustrates a few additional data structures used in the control-flow diagrams provided in FIGS. 9-16. The 2D-ROI 850 and 3D-AROI 852 data structures are both linked lists of coordinates for points that together describe an ROI and an AROI, respectively. The array candidateAROIs[ ] 854, as mentioned above, contains 3D AROI data structures that each describes a possible candidate AROI for a bounding box that defines a facial sub-image in the recorded video. Finally, as also mentioned above, the 2-dimensional array AROI_Tab[ ][ ] 856 stores two statistical values for each candidate AROI. The first index is an index for a candidate AROI in the candidateAROIs[ ] array and the second index is either 0 or 1, with the index 0 referring to a count of acceptable frames detected within a sequence of frames and index 1 referring to the ratio of skin pixels to the total number of pixels within the ROIs corresponding to the candidate AROI in the sequence of video frames.

FIG. 9 provides a control-flow diagram for a routine "heartbeat detector" that represents one implementation of the currently disclosed methods and systems that determine heartbeat rates for subjects, patients, and/or participants imaged in a video recording. In step 902, the routine "heartbeat detector" receives a video stream VS, a set of video-stream parameters P, a Boolean value offline that indicates whether or not the routine "heartbeat detector" is to operate in an offline or online mode, output channel HBout to which determined heartbeat-rate values are output by the routine "heartbeat detector." and a constant value blkSize which indicates the number of video frames in each first-level window, or block, of video frames processed by the routine "heartbeat detector" to determine heartbeat rates for subjects, patients, and/or participants in the video recording. In step 904, the routine "heartbeat detector" initializes a FrameStore instance FS 906, sets video-stream parameters within the instance FS 907, initializes the variable blkStart 908, which indicates the number of the video frame with which the current block of video frames starts, initializes the array currentAROIs[ ] 909, sets the variable first to TRUE 910, and initializes the array candidateAROIs[ ] 911. In step 912, the routine "heartbeat detector" launches the asynchronous routine "asynchronous frame collect" to collect a next block or first-level window of video frames. In step 914, the routine "heartbeat detector" sends a process frames signal to a signal collector. Step 916 is the first step in a continuous loop in which successive blocks of video frames are collected and processed. In step 916, the routine "heartbeat detector" waits for the signal collector to receive both a frame collect signal and a process frames signal. Once the signals have been received, which clears the signal collector, the routine "heartbeat detector" calls the asynchronous routine "asynchronous process frames," in step 918, to process the most recently collected block of video frames. When the global variable finished is set to TRUE, as determined in step 920, the video recording has been finished and all frames have been collected, as a result of which the routine "heartbeat detector" either returns, in step 922, when in online mode, as determined in step 924, or clears the FrameStore instance, in step 926, and then calls the routine "asynchronous process frames" one more time, in step 928, before returning. Otherwise, the routine "heartbeat detector" again calls the routine "asynchronous frame collect," in step 930, to begin collecting a next block of frames and sets the global variable first to FALSE, in step 932 before returning to step 916 to wait for the frame collect and process frames signals. Thus, either as the video is being recorded, in online mode, or after the video is recorded, in offline mode, the routine "heartbeat detector" processes successive blocks of video frames in order to determine heartbeat rates for the subjects, patients, and/or participants within each block of video frames and output the determined heartbeat rates.

Figure 10:
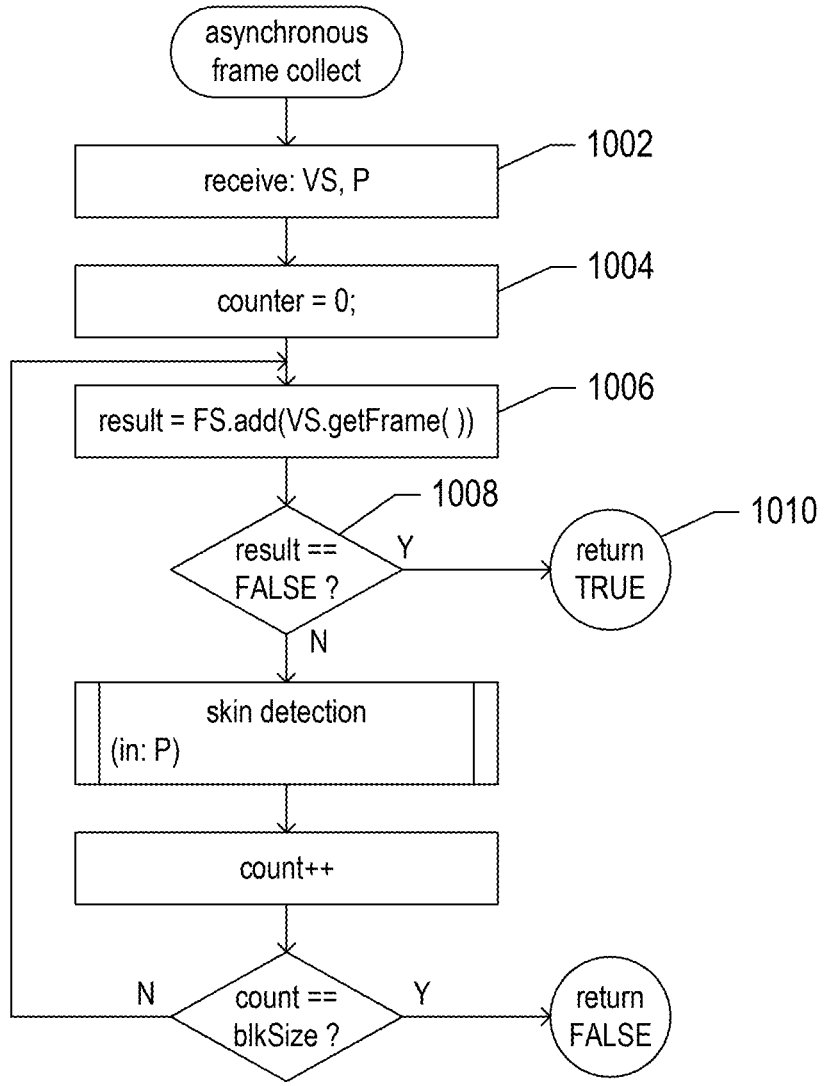
FIG. 10 provides a control-flow diagram for the routine "asynchronous frame collect." called in steps 912 and 930 of FIG. 9.

FIG. 10 provides a control-flow diagram for the routine "asynchronous frame collect," called in steps 912 and 930 of FIG. 9. In step 1002, the routine "asynchronous frame collect" receives the video stream I'S and the set of video-stream parameters P. Note that values and object instances received by routines illustrated in FIGS. 9-16 and 29 may be either received by value or by reference, depending on the implementation and on various efficiency concerns. The control-flow diagrams do not generally specify whether arguments are received by reference or value. In step 1004, the routine "asynchronous frame collect" sets a local variable counter to 0. In step 1006, the routine "asynchronous frame collect" sets a local variable result to the Boolean result value returned by the member function add( ) of the FrameStore instance FS. The result value is TRUE when a next frame is received by the video stream and returned by the video-stream member function getFrame( ) as an argument to the member function add( ) of the FrameStore instance FS and FALSE when there are no more frames to be received by the video stream. The call to the video-stream member function getFrame( ) is asynchronous. When the result value is FALSE, indicating that the video stream has been completed and no further frames will be available, as determined in step 1008, the routine "asynchronous frame collect" returns the value TRUE 1010. Otherwise, in step 1012, the routine "asynchronous frame collect" calls a routine "skin detection," to detect facial sub-images in the video frame and, in step 1014, increments the local variable count. When the local variable count stores a value equal to the constant blkSize, as determined in step 1016, the routine "asynchronous frame collect" returns the value FALSE. Otherwise, control returns to step 1006 for addition of a next video frame to FS.

Figure 11A:
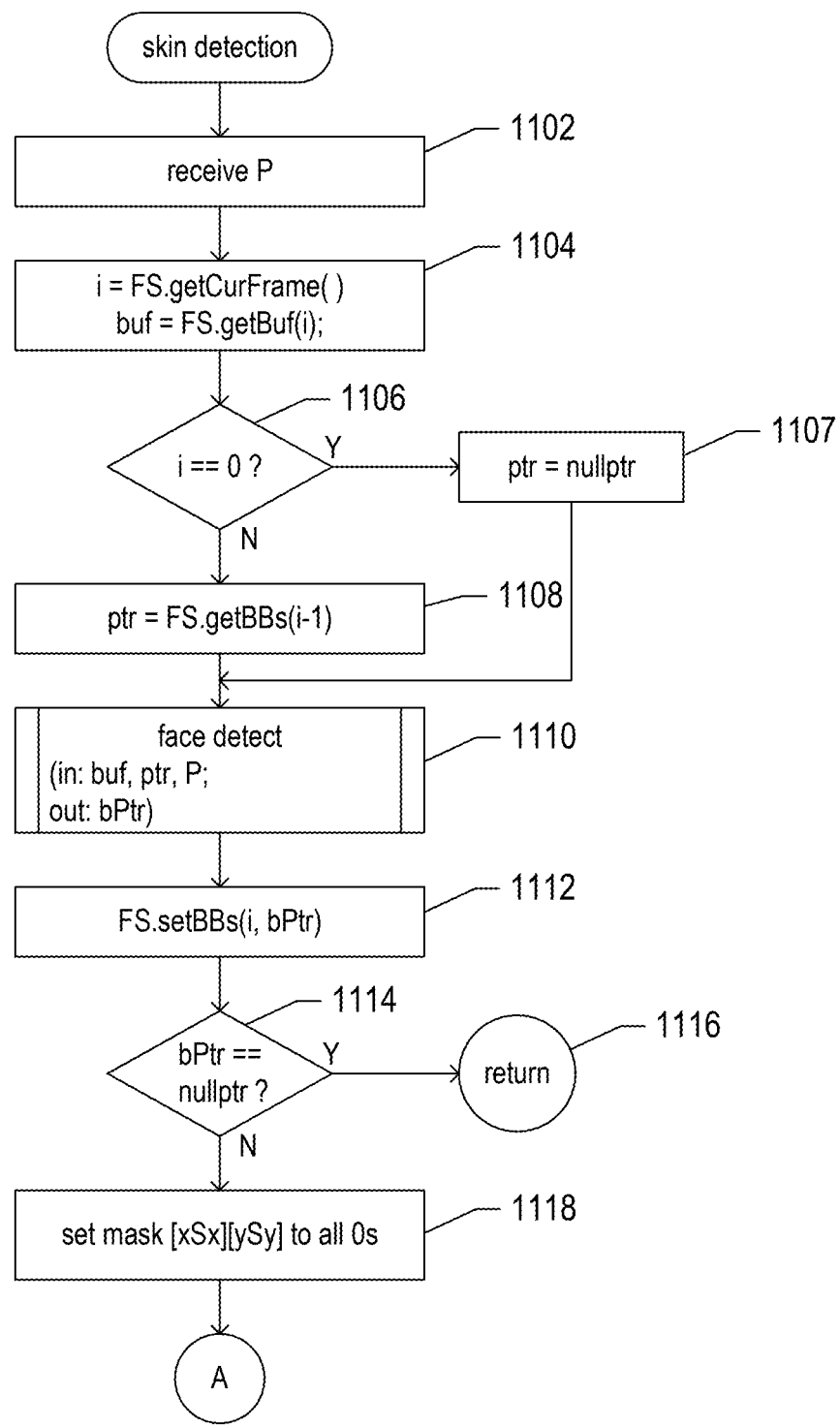
FIGS. 11A-C provide control-flow diagrams for the routine "skin detection," called in step 1012 of FIG. 10.
Figure 11B:
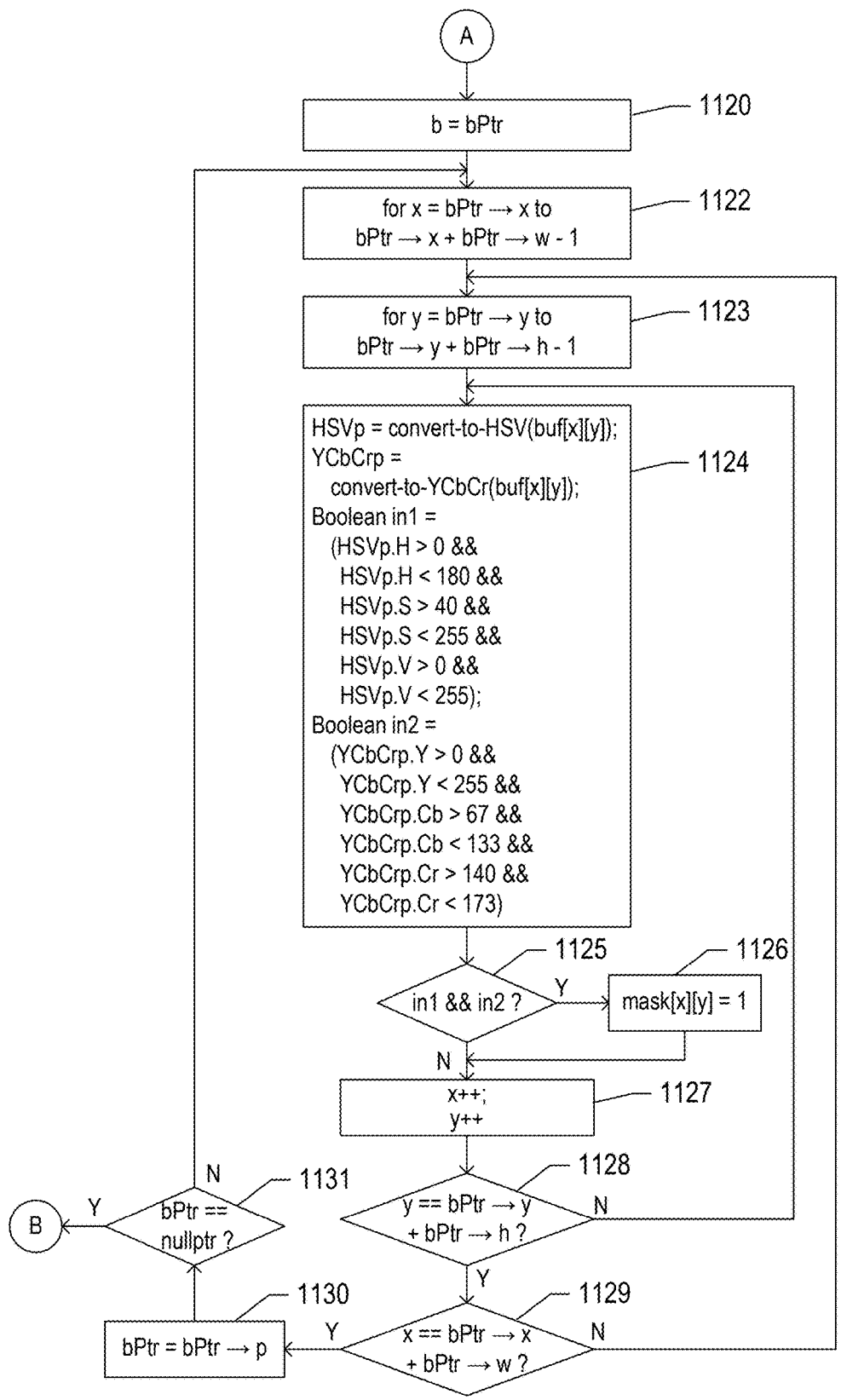
Figure 11C:
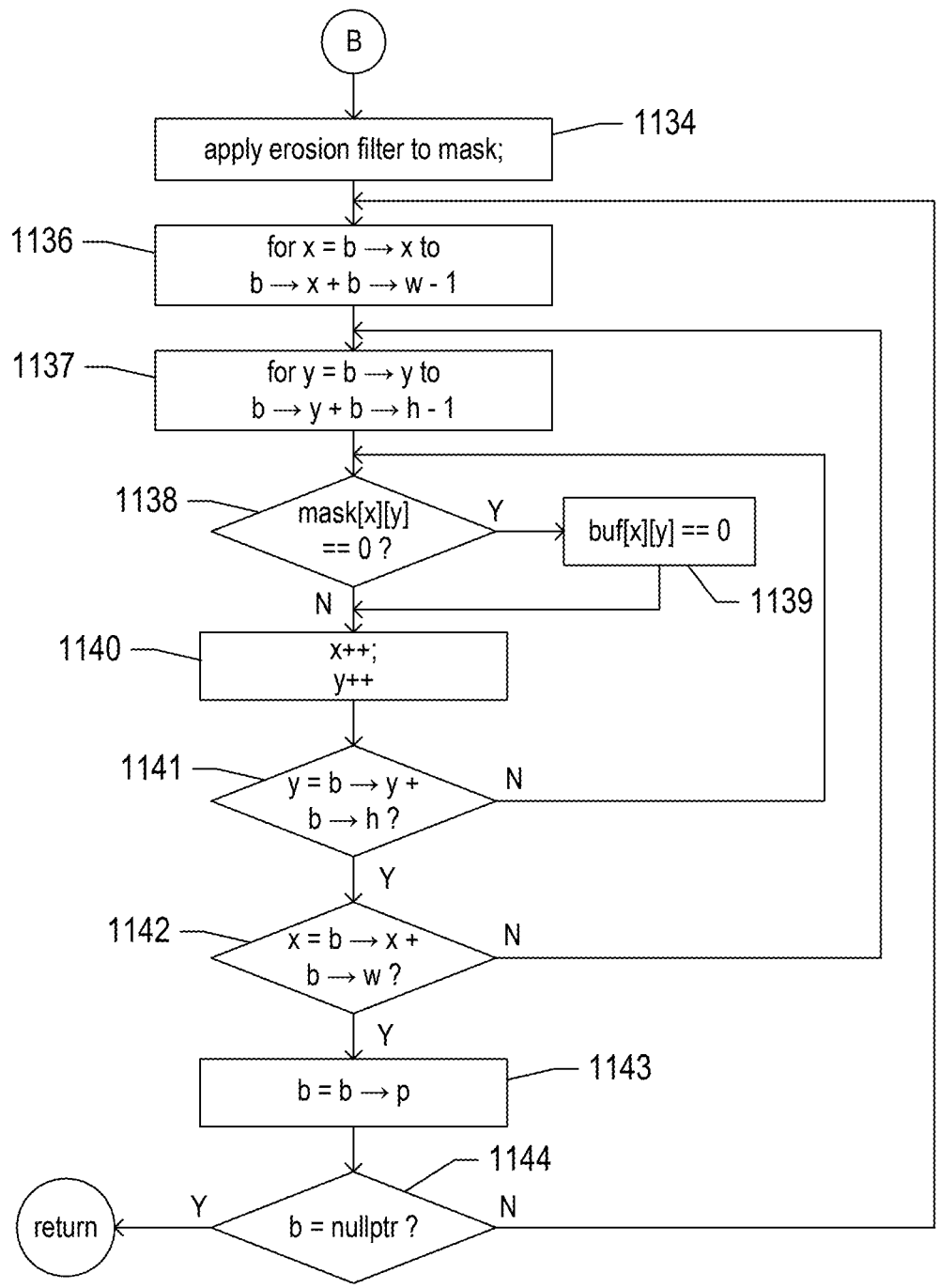

FIGS. 11A-C provide control-flow diagrams for the routine "skin detection," called in step 1012 of FIG. 10. In step 1102, the routine "skin detection" receives the set of video-stream parameters P. In step 1104, the routine "skin detection" sets local variable i to the number of the current, or most recently stored, frame in FS and sets local variable buf to point to the first pixel in the current video frame. When the current frame is the first video frame, as determined in step 1106, the local variable ptr is set to null, in step 1107. Otherwise, in step 1108, the local variable ptr is set to reference the first pixel in the previously received video frame. In step 1110, the routine "skin detection" calls the routine "face detect" to detect facial sub-images in the current frame and return a pointer to a list of BB data structures describing the bounding boxes for the detected facial sub-images. In step 1112, the list of BB data structures is added to FS in association with the current frame. The routine "face detect" represents one of various different types of commercially available third-party face-detection methods. These methods often involve the use of neural networks and other machine-learning technologies to recognize facial sub-images. Calls to third-party face-detection methods can be packaged in the routine "faced detect" so that whatever indications and values returned by the third-party face-detection methods can be translated into a list of BB data structures corresponding to bounding boxes for the detected facial sub-images. When no list of BB data structures is returned, as determined in step 1114, the routine "skin detection" returns 1116, with the local frame associated with a null BB-data-structure pointer in FS. Otherwise, in step 1118, the routine "skin detection" sets a local mask of the same size as the video frames to all 0 values.

Turning to FIG. 11B, the routine "skin detection," in step 1120, sets local variable 6 to point to the first of the BB data structures referenced by pointer bPtr, returned by the routine "face detect" in step 1110. In the nested loops of steps 1122-1131, the routine "skin detection" generates, in local variable mask, a mask for the pixels with skin-color values within the facial sub-images of the current frame represented by the list of BB data structures referenced by pointer bPtr. In the inner nested loops of steps 1122-1129, each BB data structure in the list of BB data structures is processed in order to set the pixels in the mask corresponding to pixels in the current video frame within the BB data structure with skin-color values to the Boolean value 1. For each pixel in the video frame corresponding to the currently processed BB data structure, local variable HSVp is set to the value of the pixel in the HSV color model, local variable YCbCrp is set to the value of the pixel in the YCbCr color model, the Boolean variable in/is set to indicate whether the pixel has an HSV value corresponding to skin color, and local Boolean variable in2 is set to indicate whether the pixel has an YCbCr value corresponding to skin color, in step 1124. When local Boolean variables in1 and in2 are both TRUE, as determined in step 1125, then the pixel in the local mask variable corresponding to the currently considered pixel of the video frame is set to value 1, in step 1126. After the currently considered BB data structure has been processed in the inner nested loops of steps 1122-1129, bPtr is set to the pointer value contained in the current BB data structure, in step 1130. When bPtr is now equal to the value nullpointer, as determined in step 1131, control flows to step 1134 in FIG. 11C. Otherwise, control returns to step 1122 for processing the next BB data structure in the list of BB data structures returned by the routine "face detect" in step 1110.

Figure 12:
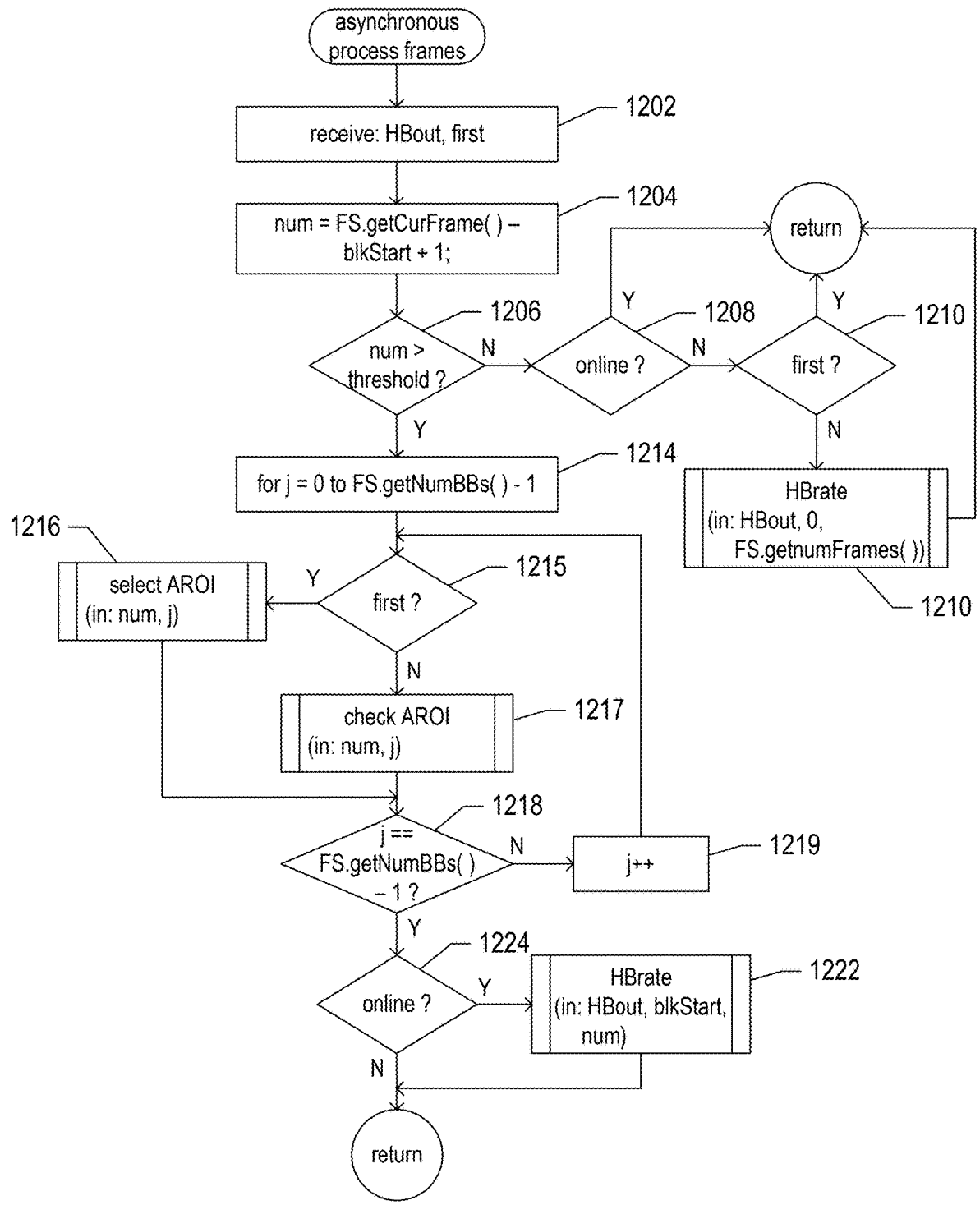
FIG. 12 provides a control-flow diagram for the routine "asynchronous process frames," called in steps 918 and 928 of FIG. 9.

In step 1134 in FIG. 11C, the routine "skin detection" applies an erosion filter to the mask, as discussed above with reference to FIGS. 7A-C. Then, in the nested for-loops of steps 1136-1142, the portions of the mask corresponding to the first BB data structure are applied to the current video frame to remove all non-skin-colored pixels from the portion of the current video frame corresponding to the first BB data structure. In step 1143, local pointer b is set to the pointer in the currently considered BB data structure. When local pointer b now has the value null pointer, as determined in step 1144, the routine "skin detection" returns. Otherwise, control returns to step 1136 for masking current-video-frame pixels with non-skin-color values corresponding to the next BB data structure representing the next facial sub-image. Thus, following completion of the routine "skin detection," only pixels of the current video frame corresponding to skin portions of the facial sub-images detected in the current video frame have non-0 values. All other pixels have been set to 0. At this point, depending on the implementation, the current video frame stored in FS may be compressed to only include blocks containing non-0 values, in order to decrease the amount of memory used for storing the video frames, FIG. 12 provides a control-flow diagram for the routine "asynchronous process frames." called in steps 918 and 928 of FIG. 9. In step 1202, the routine "asynchronous process frames" receives the output channel HBout and Boolean value first, which indicates whether or not the routine "asynchronous process frames" is being called to process the first block of frames in a video recording. In step 1204, local variable num is set to the number of frames to be processed. Normally, num is equal to blkSize, but the final block may contain fewer frames. When the number of frames to process is not greater than a threshold value, as determined in step 1206, and when heartbeat detection is operating in online mode, as determined in step 1208, the routine "asynchronous process frames" returns. When heartbeat detection is operating in offline mode and the first block of frames is being processed, as determined in step 1210, the routine "asynchronous process frames" returns, since there is little point in determining heartbeat rates for a single block of frames with less than a threshold number of frames. Otherwise, in step 1212, a routine "HBrate" is called to generate heartbeat rates for the subjects, patients, and/or participants in the video recording since heartbeat detection is operating in offline mode and the video recording is now complete. When the number of frames to be processed is greater than the threshold value, as determined in step 1206, the current block of frames is initially processed, in the for-loop of steps 1214-1219, to ensure that each subject, patient, or participant is associated with a valid AROI. Following completion of the for-loop of steps 1214-1219, the routine "HBrate" is called, in step 1222, to generate heartbeat rates for the subjects, patients, and/or participants in the video recording for the current block of frames when heartbeat detection is operating in online mode, as determined in step 1224. The routine "HBrate" is discussed in the next section of this document, as it represents the signal-generation and signal-analysis phase of heartbeat detection. In the for-loop of steps 1214-1219, the routine "select AROI" is called, in step 1216, for each BB data structure associated with the current frame when the initial block of frames are being processed and otherwise calls the routine "check AROI." in step 1217. The routine "select AROI" determines an AROI for each facial sub-image. The routine "check AROI" checks to make sure that the AROI for each facial sub-image is still valid and, if not, calls the routine "select AROI" to determine a new AROI for those facial sub-images with now invalid AROIs.

Figure 13A:
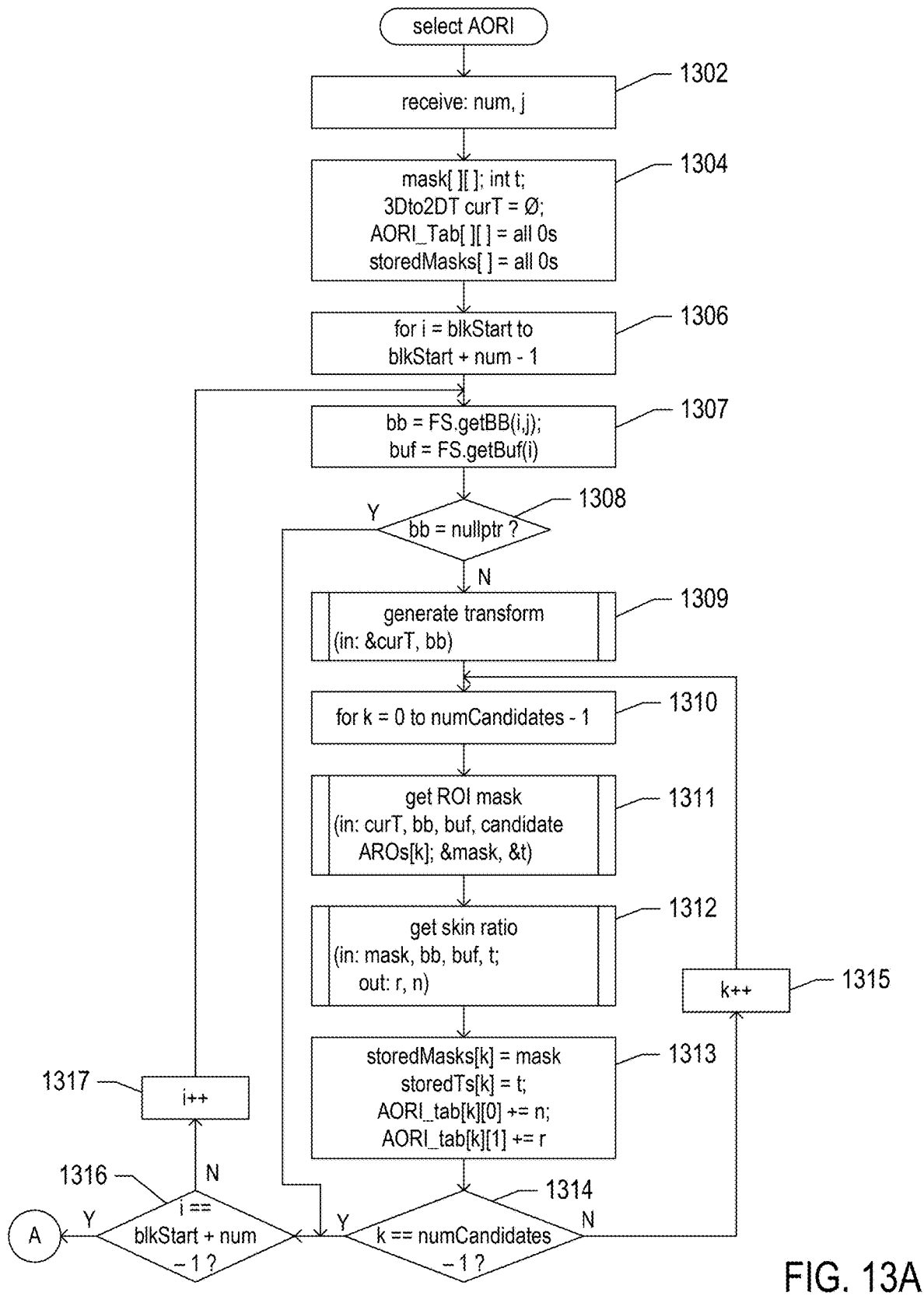
FIGS. 13A-B
Figure 13B:
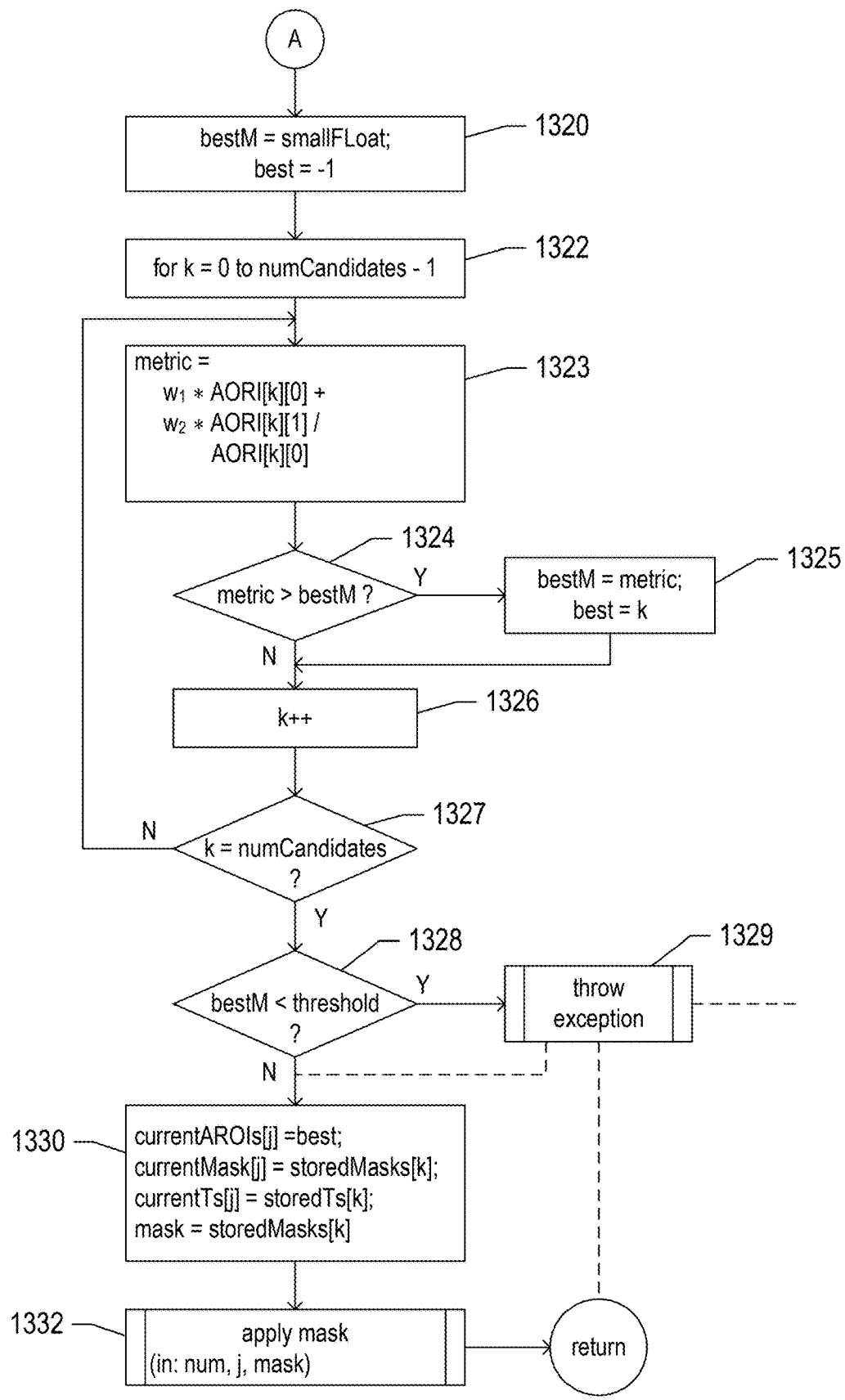

FIGS. 13A-B provide control flow diagrams for the routine "select AROI," called in step 1216 of FIG. 12. In step 1302, the routine "select AROI" receives the number of frames to be processed and an index j of the current BB data structure to be considered. In step 1304, the routine "select AROI" initializes a local mask, local variable t, a pointer to a 3D-to-2D transformation curT, the 2-dimensional array AROI_Tab, and the array storedMasks[ ]. In the for-loop of steps 1306-1317, each video frame i in the block of video frames to be processed is considered. In step 1307, a pointer bb is set to reference the jth BB data structure associated with the currently considered video frame and a local variable buf is set to reference the current video frame. When bb contains the value nullptr, as determined in step 1308, the current iteration of the for-loop of steps 1306-1317 terminates. Otherwise, the routine "generate transform" is called, in step 1309, to generate a coordinate-transformation function for the jth bounding box associated with the current frame that transforms 3D canonical-face-surface coordinates to 2D sub-image coordinates via a call to a third-party method discussed above with reference to FIGS. 5D-H. In the inner for-loop of steps 1310-1315, each of the candidate masks stored in the array candidateMasks[ ] is evaluated with respect to the jth bounding box. For each candidate mask, the routine "get ROI mask" is called, in step 1311, to generate a mask corresponding to the ROI in the current frame to which the candidate mask is mapped. This mask is used by the routine "get skin ratio," called in step 1312, to determine the skin-pixel-to-total-pixel ratio for the current frame as well as an indication of whether or not the current frame meets a threshold requirement for skin detection, and these computed statistics are stored, along with the ROI, in step 1313. Following the completion of the for-loop of steps 1306-1317, statistical information has been collected for all of the candidate masks for all of the frames in the currently processed block of frames.

In step 1320 of FIG. 13B, a local variable bestM is set to a very small value and local variable best is set to −1. Then, in the for-loop of steps 1322-1327, the statistics collected for each of the candidate AROIs are evaluated to select the best candidate AROI for the jth facial sub-image in the currently processed block of video frames. A metric value is computed, in step 1323, as a weighted sum of the number of video frames for which the candidate AROI has an acceptable skin-pixels-to-total-pixels ratio and the average skin-pixels-to-total-pixels ratio for the candidate AROI. When the metric computed for the currently considered candidate AROI is greater than the best metric so far observed, as determined in step 1324, bestM is set to the currently computed metric and best is set to the index of the currently considered candidate AROI. Following completion of the for-loop of steps 1322-1327, if no best candidate AROI has been selected, as determined in step 1328, error handling is initiated, in step 1329. This may result in a number of different possible outcomes, including removing the jth facial sub-image from consideration during processing of the current block video frames. Otherwise, in step 1330, the best candidate AROI is stored in the array currentAROIs[ ] to indicate that this is the AROI to be used for the jth facial sub-image, the current mask associated with the selected AROI is stored in the array currentMasks[ ], the number of pixels in the current mask is stored in the array currentTs, and the local variable mask is set to the current mask associated with the selected AROI. In step 1332, the current mask is applied to the video frames in the block of video frames being processed via a call to the routine "apply mask."

Figure 14:
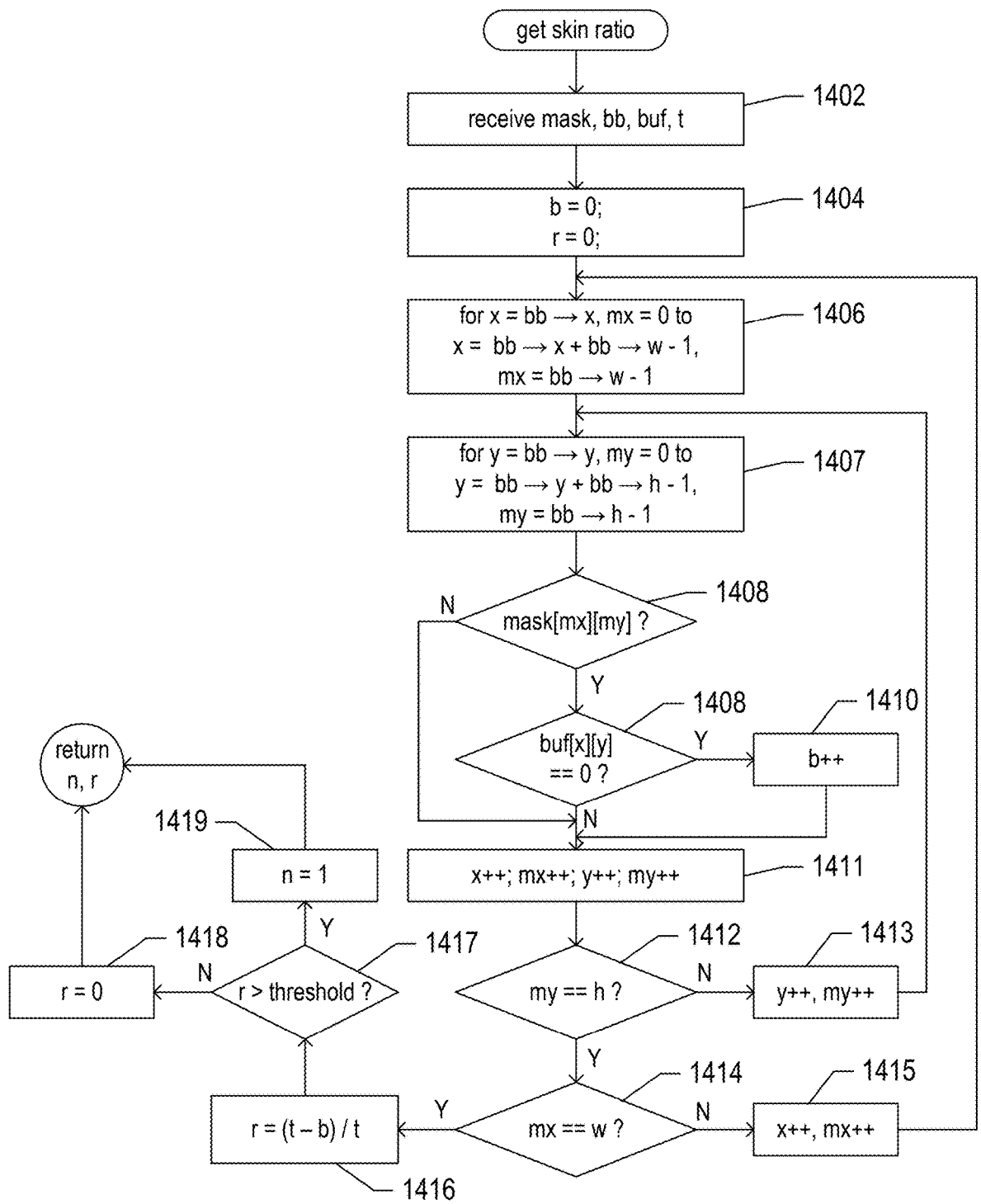
FIG. 14 provides a control-flow diagram for the routine "get skin ratio," called in step 1312 of FIG. 13A.

FIG. 14 provides a control-flow diagram for the routine "get skin ratio," called in step 1312 of FIG. 13A. In step 1402, the routine "get skin ratio" receives an ROI mask, a pointer bb to a BB data structure, a pointer buf to a video frame, and an indication t of the number of pixels with value 1 in the mask. In step 1404, local variable b is set to 0 and local variable r is also set to 0. In the nested for-loops of steps 1406-1415, the number of non-skin pixels in the video image corresponding to the ROI represented by the received mask is counted and stored in local variable b. In step 1416, the ratio r of skin pixels to total pixels is computed. When that ratio has greater than a threshold value, as determined in step 1417, the routine "get skin ratio" returns the value 1 and the computed ratio. Otherwise, the routine "get skin ratio" returns the values 0 and 0. These returned values are used, by the routine "select AROI," to update the statistics stored for a candidate mask during evaluation of the candidate masks with respect to a particular facial sub-image in a block of video frames being processed.

Figure 15:
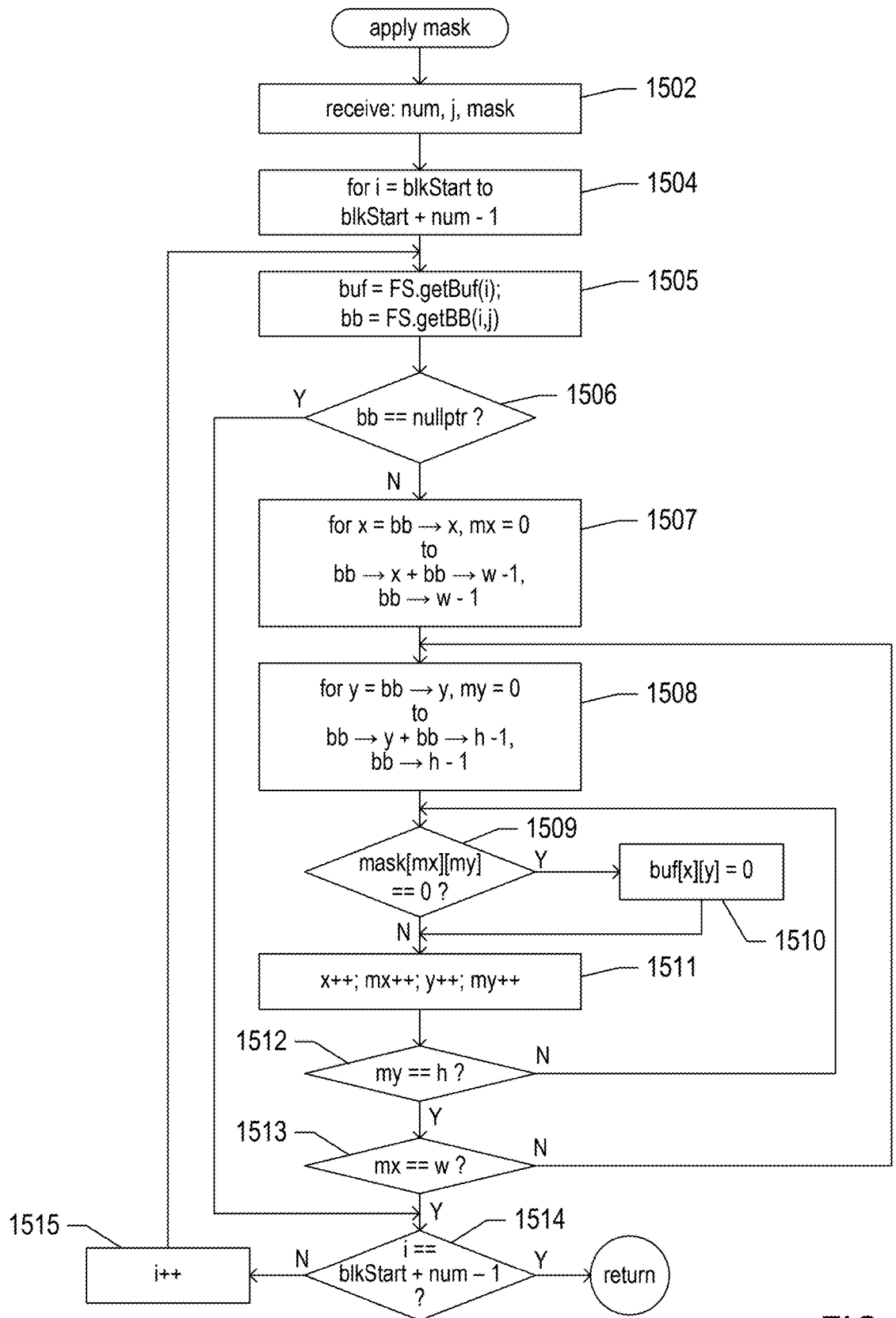
FIG. 15 provides a control-flow diagram for the routine "apply mask." called in step 1332 of FIG. 13B.

FIG. 15 provides a control-flow diagram for the routine "apply mask," called in step 1332 of FIG. 13B. In step 1502, the routine "apply mask" receives a number of frames that are being processed, an index j for the currently considered facial sub-image, and an ROI mask. In the outer for-loop of steps 1504-1515, each video frame/in a block of video frames is processed. In step 1505, the local variable buf is sent to point to the first pixel in the currently considered video frame and local variable bb is set to point to a list of BB data structures associated with the current frame. When bb stores the value nullptr, as determined in step 1506, the current iteration of the for-loop of steps 1504-1515 is terminated. Otherwise, in the nested for-loops of steps 1507-1513, the ROI mask is applied to each pixel in the bounding box represented by the BB data structure referenced by local variable bb.

Figure 16:
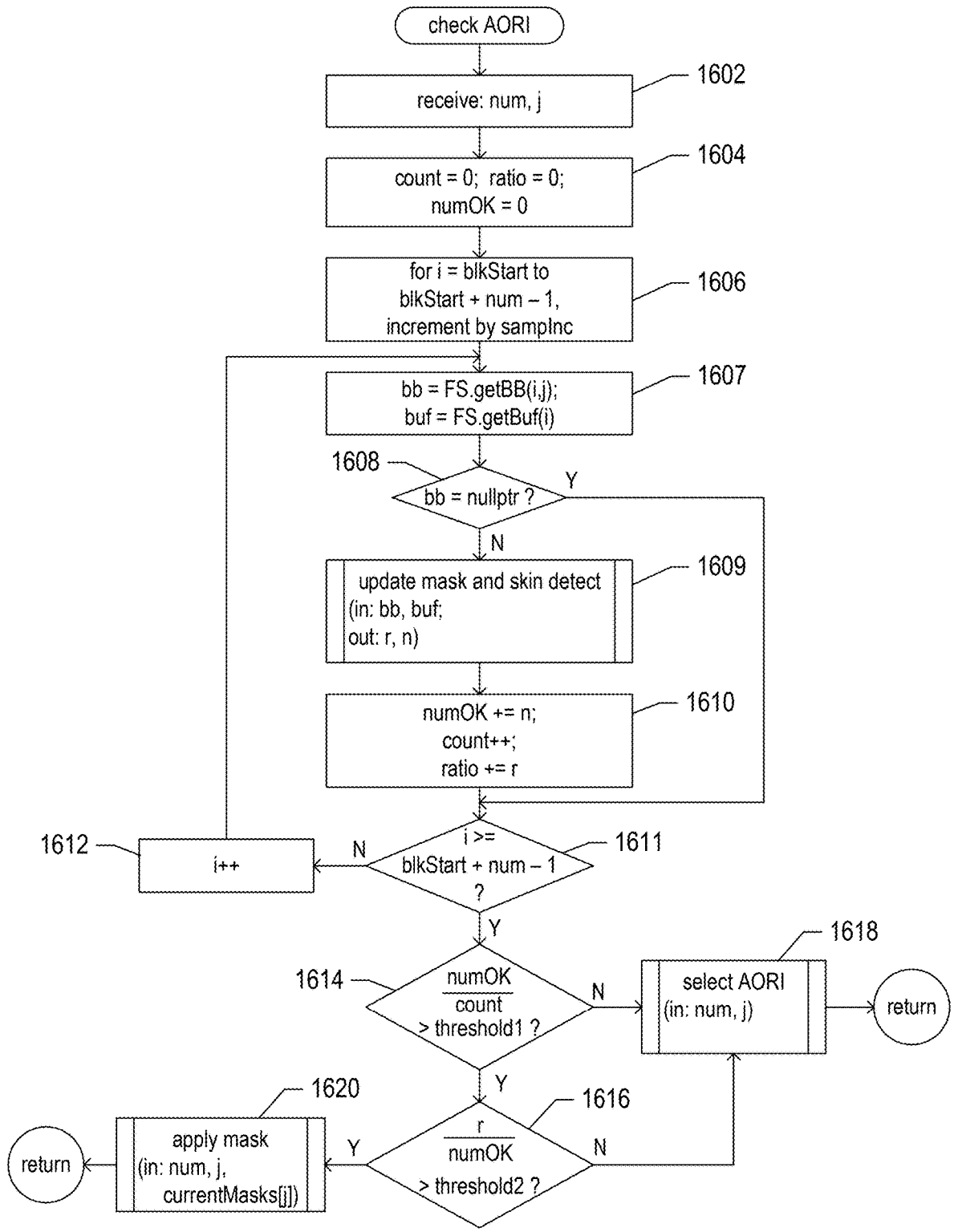
FIG. 16 provides a control-flow diagram for the routine "check AROI," called in step 1217 of FIG. 12.

FIG. 16 provides a control-flow diagram for the routine "check AROI," called in step 1217 of FIG. 12. In step 1602, the routine "check AROI" receives a number of frames that are being processed and the index/of a facial sub-image. In step 1604, local variables count, ratio, and numOK are set to 0. In the for-loop of steps 1606-1612, statistics are accumulated for the current mask associated with the jth facial sub-image as in the for-loop of steps 1310-1315 in FIG. 13A, described above. The routine "update mask and skin detect" called in step 1609, combines the routines "generate transform," "get ROI mask," and "get skin ratio," called in step 1309, 1311, and 1312 of FIG. 13A. The current ROI mask may be quickly checked, for continued applicability, and then may be updated using calls to "generate transform" and "get ROI mask" when the current ROI mask is no longer applicable to the current frame. When either the number of frames for which the current AROI has an acceptable skin-pixels-to-total-pixels ratio is less than or equal to a first threshold, as detected in step 1614, or when the average skin-pixels-to-total-pixels ratio for the current AROI is less than or equal to a second threshold value, as determined in step 1616, the current AROI is deemed no longer valid and the routine "select AROI" is called, in step 1618, to select a new AROI for the jth facial sub-image. Otherwise, in step 1620, the current mask for the current AROI is applied to the current frame.

Signal Generation and Analysis

Figure 17A:
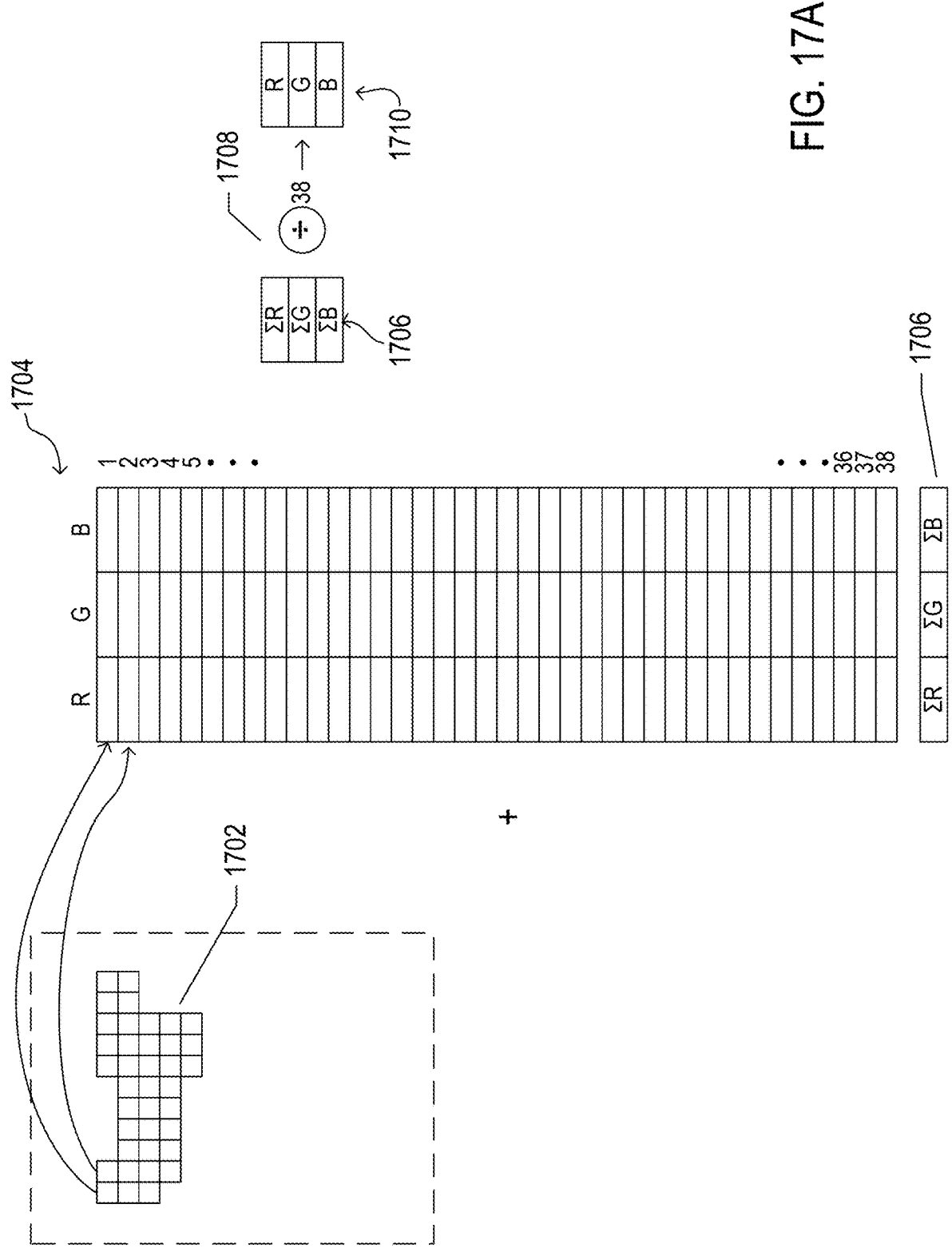
FIGS. 17A-B illustrate generation of raw color-intensity signals from ROIs corresponding to facial sub-images within a sequence of video frames.
Figure 17B:
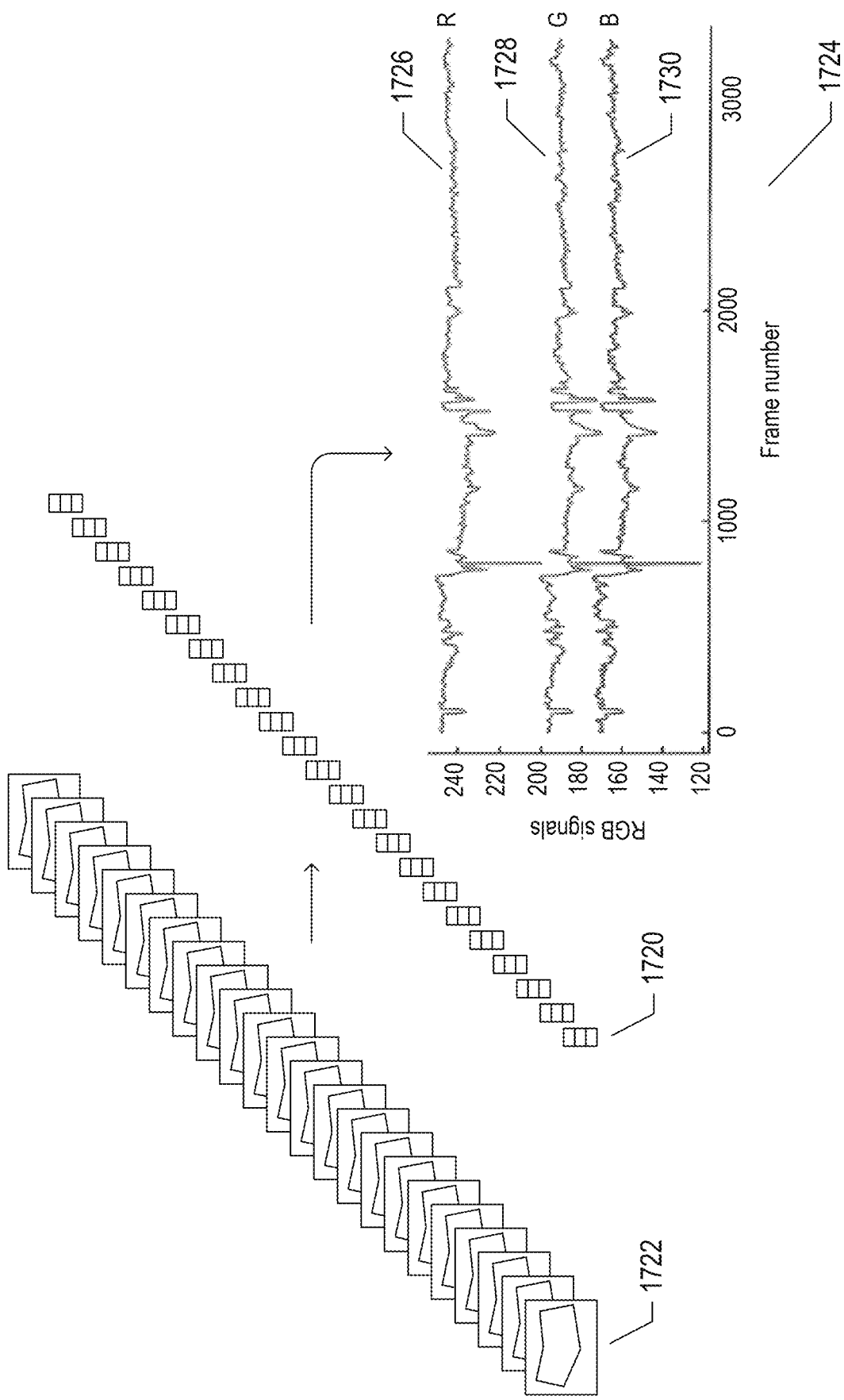

FIGS. 17A-B illustrate generation of raw color-intensity signals from ROIs corresponding to facial sub-images within a sequence of video frames. As shown in FIG. 17A, the red, green, and blue intensity values for each pixel within an ROI 1702 can be conceptually entered into a column 1704 of red, green, and blue intensity values, with each row in the table corresponding to a pixel in the ROI. The intensity values in each column can be summed to produce a vector of total intensity values 1706 for the ROI. Each of the summed intensity values in the vector of total intensity values is then divided 1708 by the number of pixels in the ROI to produce a final vector of average color-intensity values 1710 for the ROI. As shown in FIG. 17B, a time-ordered series of average color-intensity-value vectors 1720 can thus be generated from a time-ordered series of ROIs 1722 extracted from a time-ordered series of video frames. The color-intensity values can then be considered to be datapoints for color-intensity signals that can be plotted in a 2-dimensional plot 1724, which shows a separate plotted signal for each of the color channels red 1726, green 1728, and blue 1730.

Figure 18A:
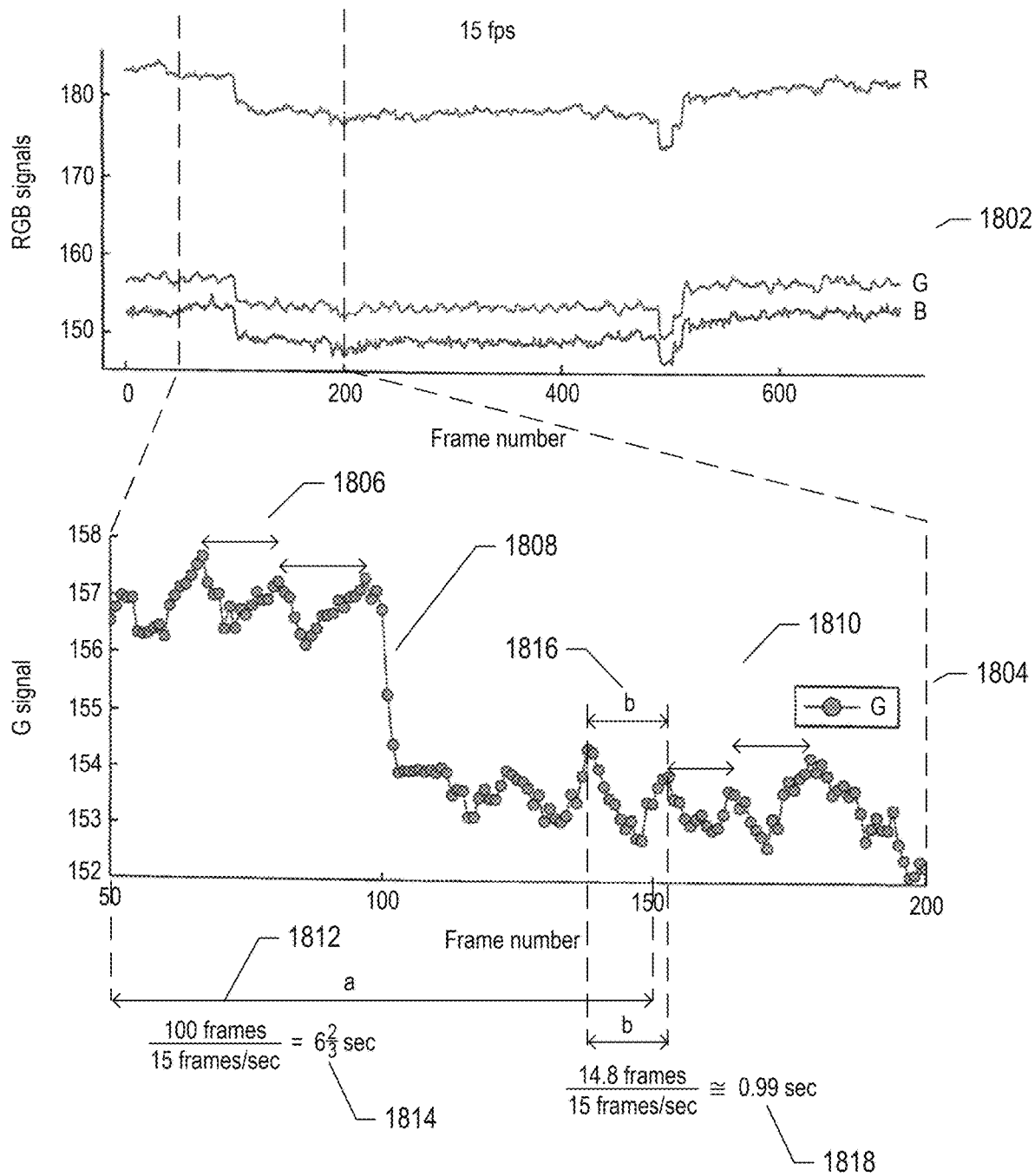
FIGS. 18A-B illustrate the general nature of the raw color-intensity signals.
Figure 18B:
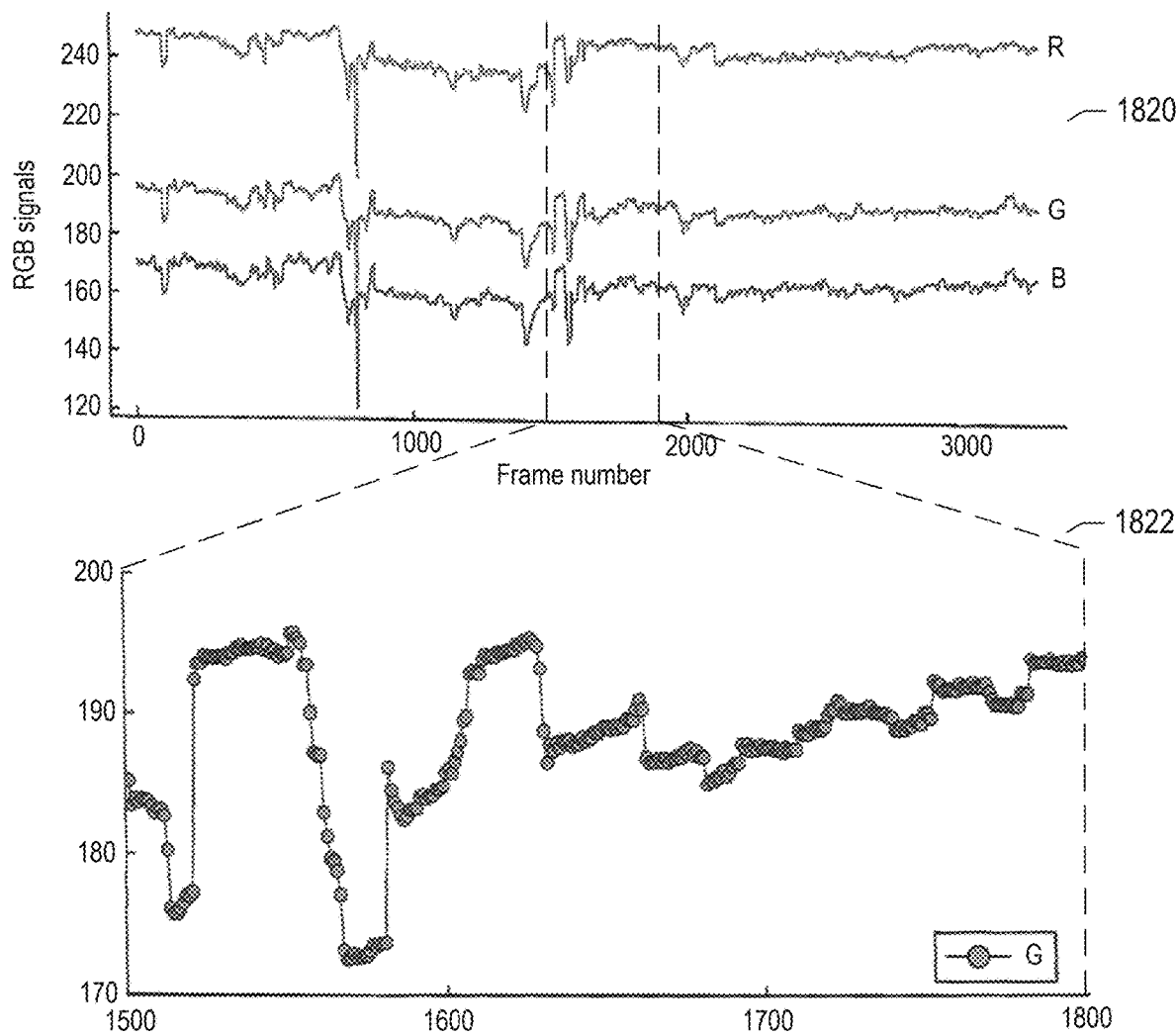

FIGS. 18A-B illustrate the general nature of the raw color-intensity signals. FIG. 18A shows a plot of a portion of the raw color-intensity signals produced from a 15 frames-per-second ("fps") video recording 1802 and a plot of a magnified portion of the green color-intensity signal 1804. The initial portion of the magnified green color-intensity signal 1806 appears to oscillate at a somewhat regular frequency. There is then a steep downward cliff 1808 in the green-color-intensity signal after which the signal again appears to again oscillate at a somewhat regular frequency 1810. As shown below the plot of the magnified portion of the green color-intensity signal 1804, the horizontal axis represents frame number, but also implicitly represents time, since the frames are sequentially ordered at regular intervals in time. Thus, a 100-frame segment 1812 of the horizontal axis represents 6 and ⅔ seconds 1814. One of the periods of oscillation 1816 corresponds to 0.99 seconds 1818. The normal human heartbeat rate varies around 1 beat per second, and thus the regular oscillations in the left-hand 1806 and right-hand 1810 portions of the magnified green color-intensity signal would appear to correspond to the heartbeat rate of the subject, patient, or participant associated with the ROIs from which the signal was extracted. In fact, it is well known that the heartbeat rate of a human is reflected in periodic changes in skin color, which may be related to changes in color related to the oxygen levels in blood, local volume of capillaries, or other physiological parameters. Were the extracted color-intensity signals regularly oscillating about a constant average intensity, as in portions 1806 and 1810 of the plot of the magnified portion of the green color-intensity signal. extraction of the local period of the oscillation at regular time points would be fairly straightforward, as indicated in FIG. 18A. However, as can be seen in plot 1802, there are numerous steep plunging cliffs and rising cliffs in the raw color-intensity signals that complicate heartbeat-rate determination. These anomalies often represent changes in a subject's position and/or orientation or changes in the illumination intensity in the subject's environment. Thus, raw color-intensity signals include numerous anomalies and noise due to subject movement, varying illumination intensity, movement of the video-recording apparatus, video-recording-apparatus instabilities, and other factors.

FIG. 18B shows a plot 1820 of a portion of the color-intensity signals extracted from a 30 fps video recording and a plot 1822 of a small, magnified portion of the green color-intensity signal. In this case, the anomalies and noise inherent in the signal almost completely mask the oscillating heartbeat-related component of the signal that was visible in plot 1804 of FIG. 18A. This illustrates the level of noise and anomalies commonly observed in raw color-intensity signals extracted from recorded-video frames. In order to have any chance of accurately determining the heartbeat rate for subjects, patients, and/or participants imaged in a recorded video, a first step that removes as much of the non-heartbeat-related signal components from the raw color-intensity signals is needed.

Figure 19:
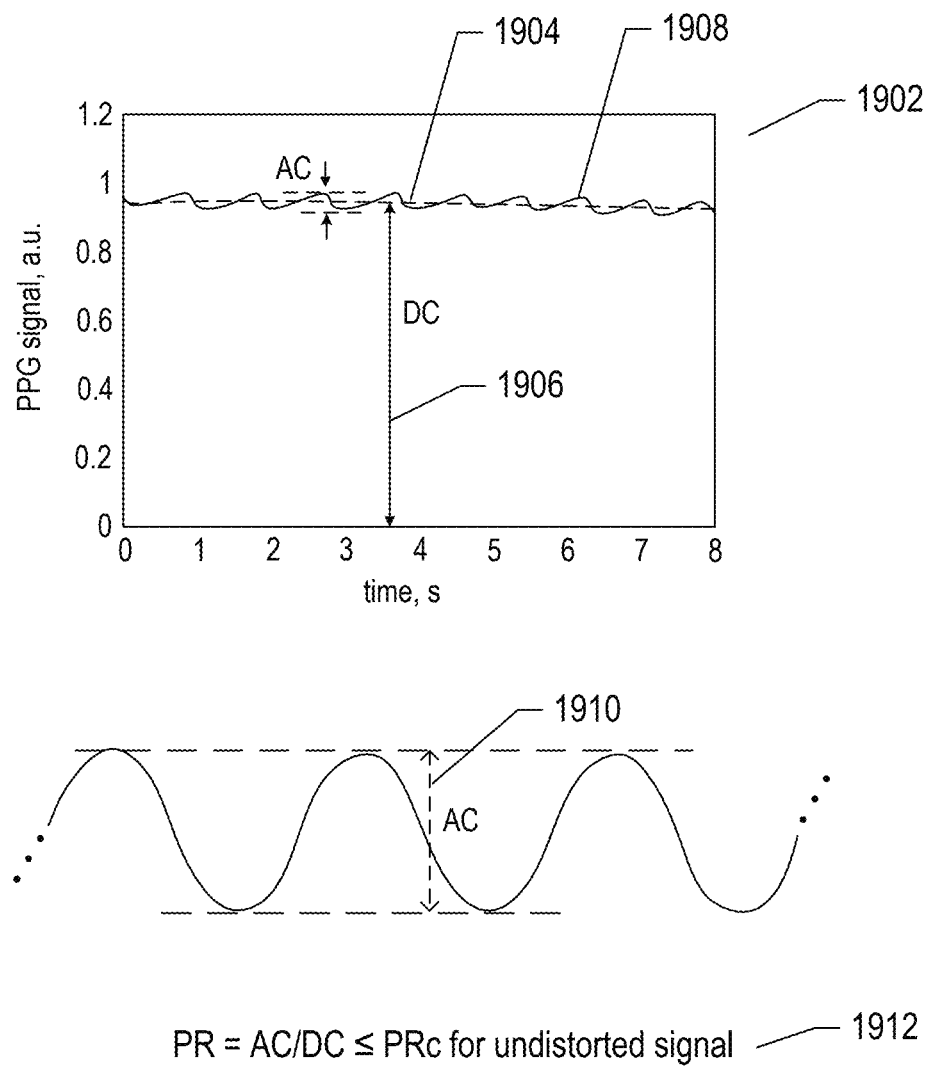
FIG. 19 illustrates "AC" and "DC" color-intensity-signal components.

FIG. 19 illustrates "AC" and "DC" color-intensity-signal components. Plot 1902 shows a representation of a short portion of an ideal color-intensity signal. The signal includes, for the short period of time, a relatively constant background component, represented by horizontal dashed line 1904, with a constant intensity represented by a vertical line segment 1906. This component of the color-intensity signal is referred to as the "DC" component and the intensity of this component is referred to as DC. The color-intensity signal includes an additional AC component represented by the curved, oscillating signal 1908. The intensity AC 1910 of the AC component is proportional to the amplitude of the AC component. As shown by expression 1912. it has been found that the ratio PR=AC/DC in many different video recordings, analyzed together with specific heartbeat-rate detection information, is less than or equal to a constant $PR_C$.

Figure 20B:
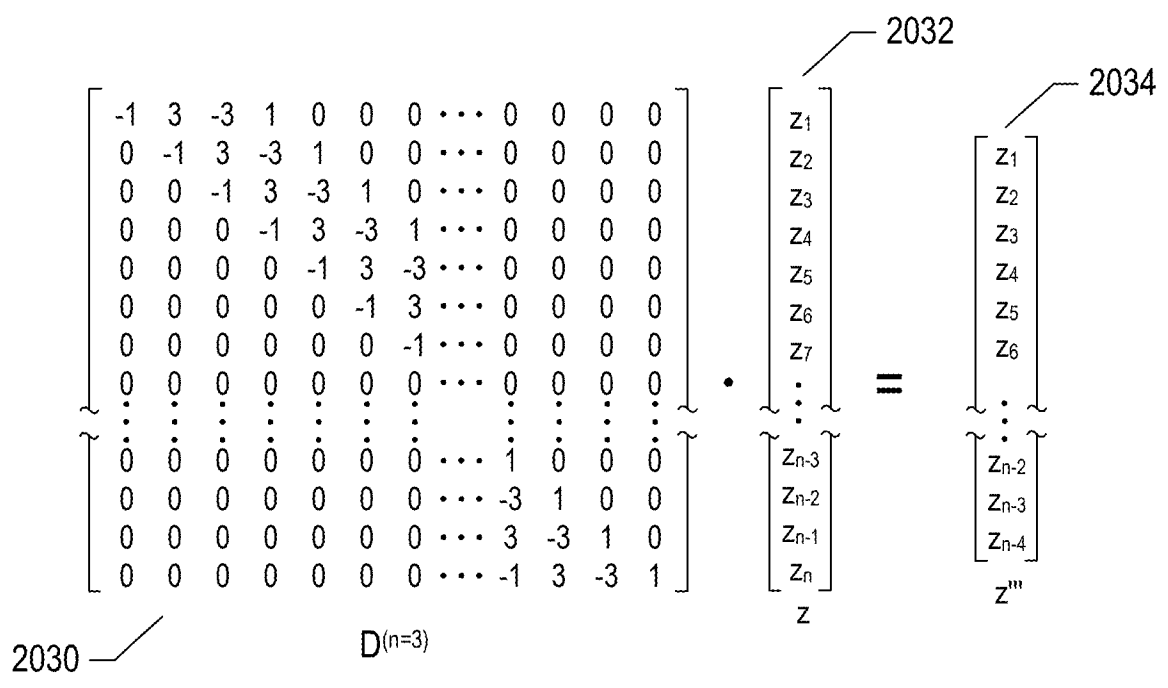

FIGS. 20A-B illustrate computation of the third derivative of a discrete signal. Expression 2002 is the classic expression of the first derivative of a continuous function f(x). Three different discrete analogs of the first-derivative operator are shown by expressions 2004-2006. Using the second of these expressions, the discrete second derivative is obtained by expression 2008. Taking the value of/to be 1, this reduces to expression 2010. Similarly, using expression 2005 and assuming/to be 1, an expression 2012 for the third derivative is obtained. When a signal f(x) is expressed as a column vector 2014 of the signal values at successive points in time or, in other words, as the values of a sequence of datapoints, then application of a third-differential operator 2016 derived from expression 2012 to a 4-datapoint subsequence 2018 within the signal produces the third derivative of the signal at the center of the four-datapoint subsequence, as indicated by arrow 2020. The terms in the third-differential operator 2016 are the coefficients in expression 2012. Similar discrete differential operators can be derived for the second, fourth, and other differentials. For example, for the second differential, the operator is [1, −2, 1], the coefficients in expression 2010. The operators are related to rows of the Pascal's triangle or, in other words, to binomial coefficients.

FIG. 20B illustrates matrix multiplication of a column vector representing a discrete signal to produce a corresponding column vector representing the third derivative of the discrete signal. The matrix $D^{(3)}$ 2030 consists of rows in which the third-differential operator 2016 moves rightward by one position in each successive row starting, at the top, at the leftmost position within the top row. Multiplication of the signal z 2032 by this matrix results in successive application of the third-differential operator along the signal, producing a resultant signal z''' 2034 representing the third differential of the signal. Signal z''' is four elements shorter since the third-differential operator, when aligned with the top or bottom of the signal vector z, computes the third differential at a point in the signal between the second and third elements. There are ways to estimate the values for the third differential of the first and second elements and the final two elements, but this is not needed in the methods discussed below.

Figure 21A:
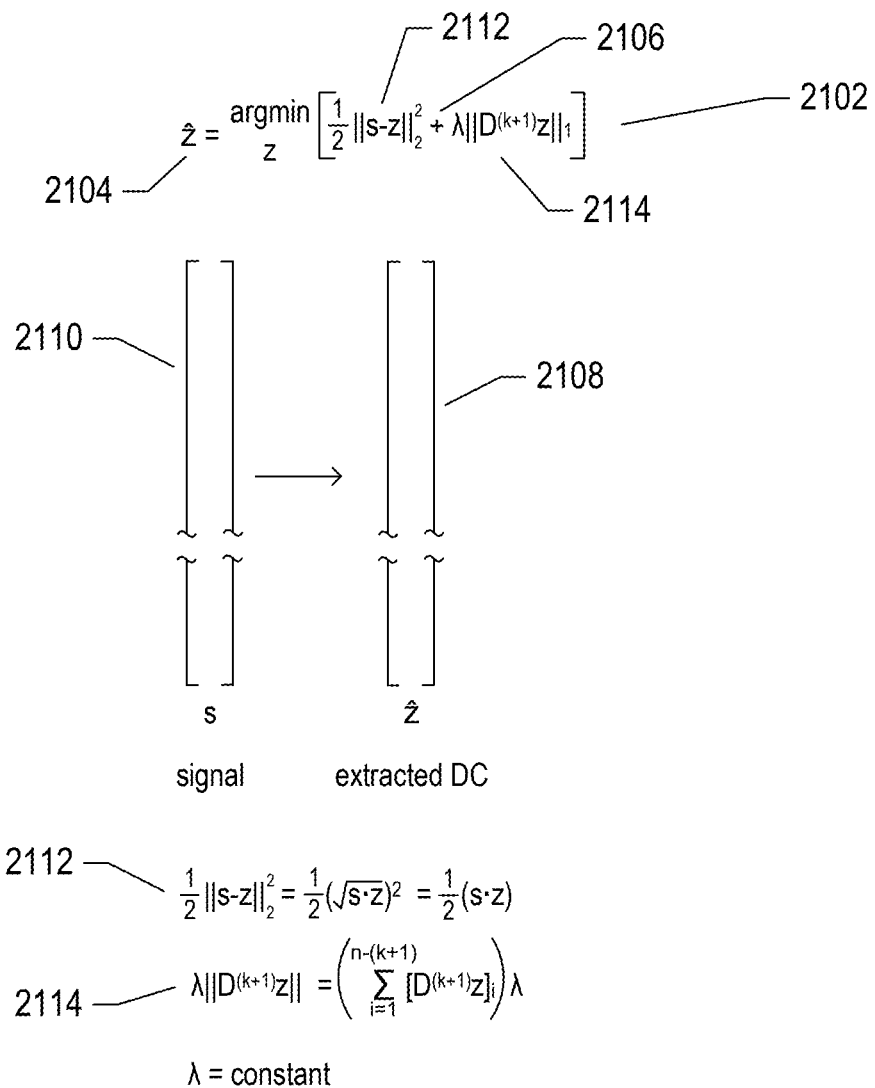
FIGS. 21A-B illustrate a method used in the currently disclosed methods and systems for determining a background component of a color-intensity signal.
Figure 21B:
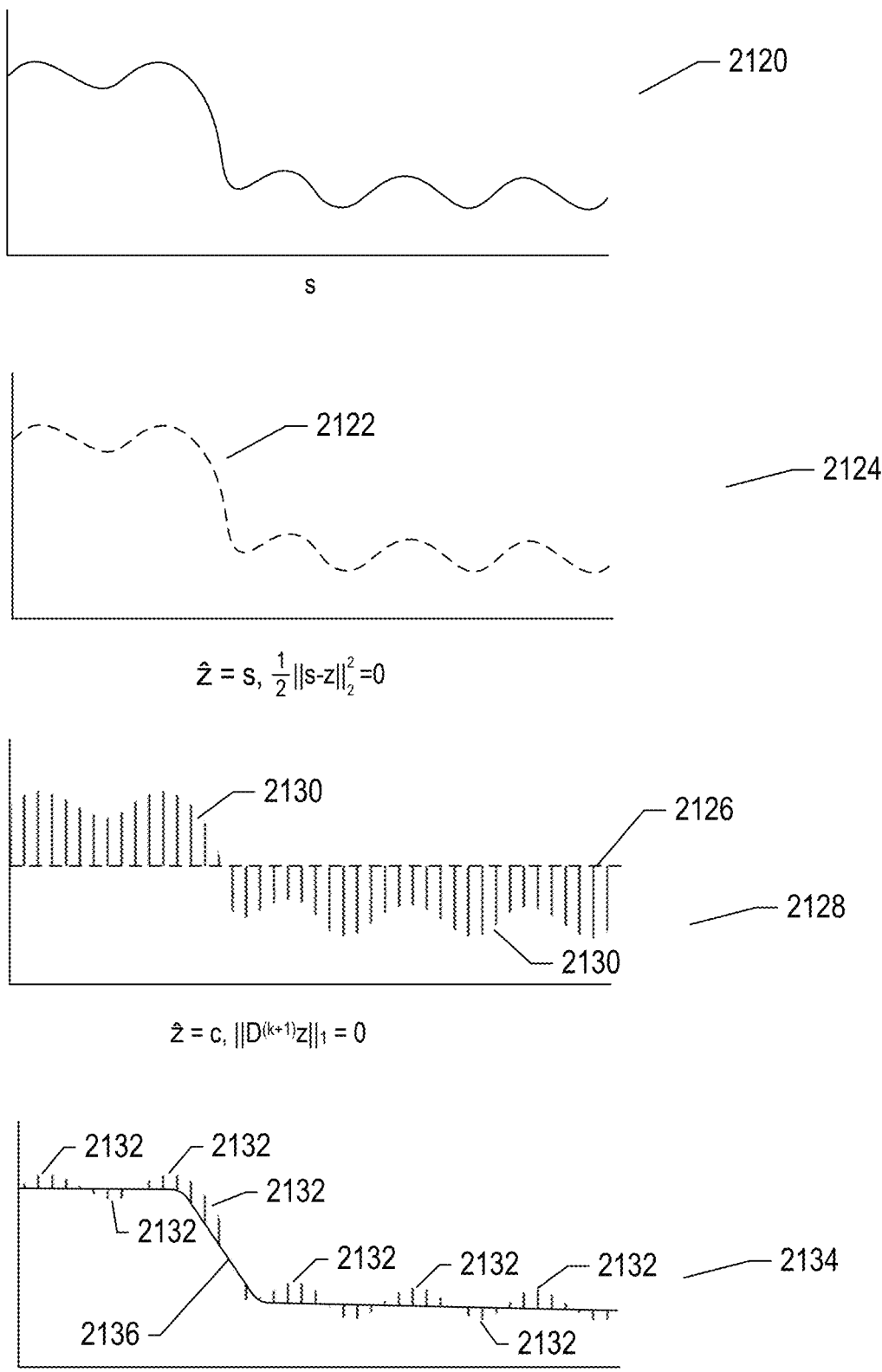

FIGS. 21A-B illustrate a method used in the currently disclosed methods and systems for determining a background component of a color-intensity signal. The background-signal component of a color-intensity signal can be subtracted from the color-intensity signal to produce a background-subtracted, or detrended, color-intensity signal that can be used for heartbeat-rate determination. An expression for the method 2102 is provided at the top of FIG. 21A. The background signal 2104 is obtained by a minimization of the bracketed expression 2106. This minimization process extracts the DC component 2108 from the original signal 2110. The first term 2112 in expression 2106 is proportional to the square of the difference between the original signal s and a currently proposed DC signal component z, and is the vector dot product of s and z, s·z, multiplied by ½. The second term 2114 in expression 2106 is the sum of the elements in the third differential of the proposed DC signal z, multiplied by the constant $\lambda$. FIG. 21B illustrates the effects of these two terms. First, the original signal s is plotted 2120. Were only the first term 2112 to be minimized, the resulting background signal $\hat{z}$, shown as dashed curve 2122 in plot 2124, would be identical to the original signal s. The first term would thus end up having the value 0 following minimization. By contrast, were only the second term 2114 to be minimized, the resulting background signal $\hat{z}$, shown as dashed line 2126 in plot 2128, would be a horizontal line or constant-valued signal, and the difference between the original signal s and the resulting background signal $\hat{z}$ would be quite large, the sum of the length of the vertical line segments 2130 shown in plot 2128. However, when both terms of expression 2106 are together minimized, the difference between the resulting background signal $\hat{z}$ in the original signal, represented by the sum of the lengths of the vertical lines 2132 in plot 2134, is relatively small and the resulting background signal $\hat{z}$, plotted as dashed line 2136 in plot 2134, corresponds to the overall, relatively slowly varying trend in the original signal. By subtracting the background signal $\hat{z}$ from the original signal s, the AC component of the original color-intensity signal is recovered. In one implementation, the red color-intensity signal is used to determine the background signal $\hat{z}$, since the red color-intensity signal is generally noisier than either the green or blue color-intensity signals.

Figure 22A:
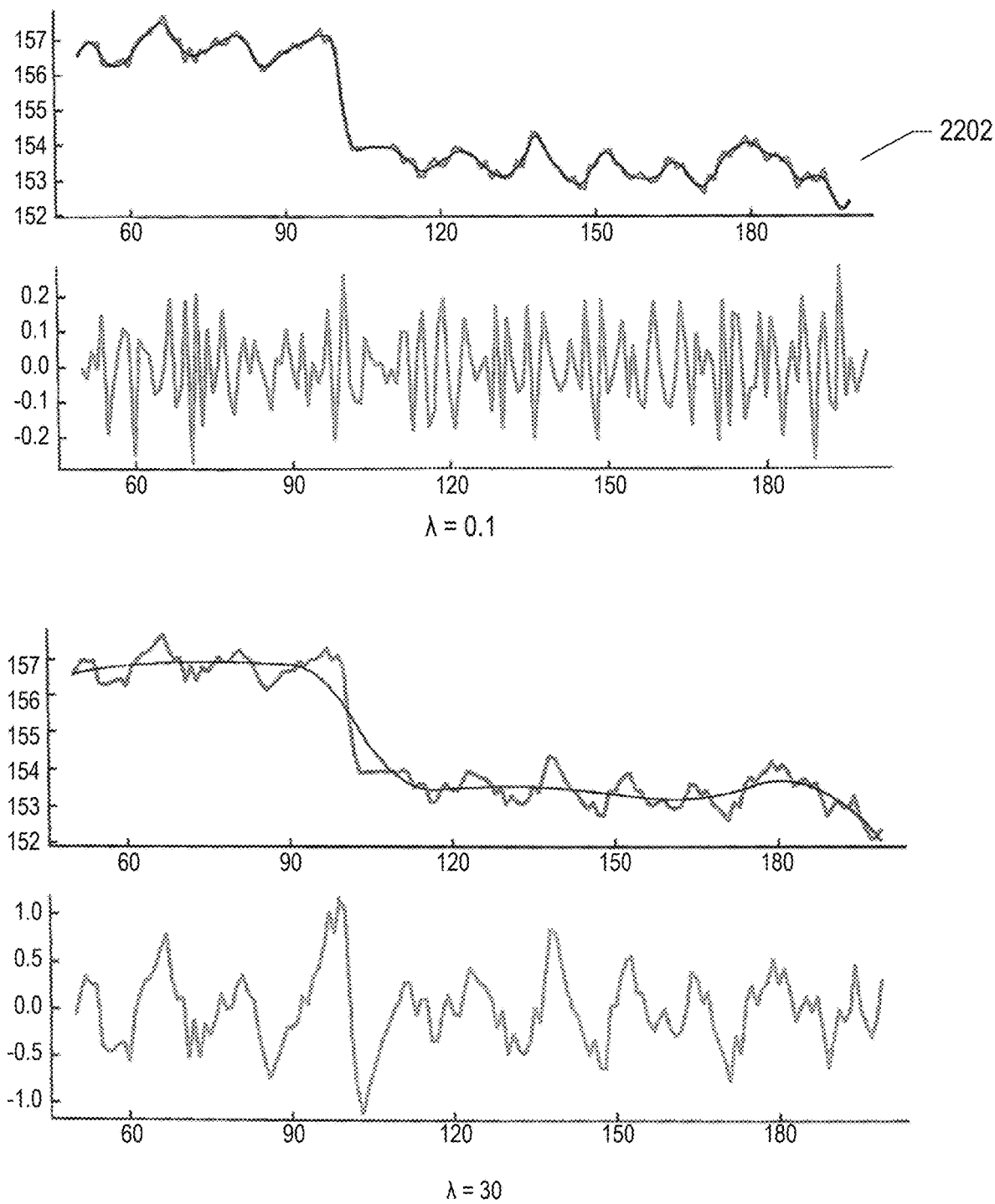
FIGS. 22A-D illustrate determination of the constant $\lambda$ in expression 2106 in FIG. 21A.

FIGS. 22A-D illustrate determination of the constant $\lambda$ in expression 2106 in FIG. 21A. First, FIG. 22A shows two pairs of plots 2202 and 2204, each showing a first plot of an original signal overlying the DC component extracted by the method discussed above with reference to FIGS. 21A-B and a second plot of the extracted AC component, at greater scale. The first pair of plots 2202 was produced using a value of the constant $\lambda$ equal to 0.1 and the second per plot 2204 was produced using a value of the constant $\lambda$ equal to 30. In this case, a larger value of the constant $\lambda$ is more effective in extracting a clean AC color-intensity-signal component.

Figure 22B:
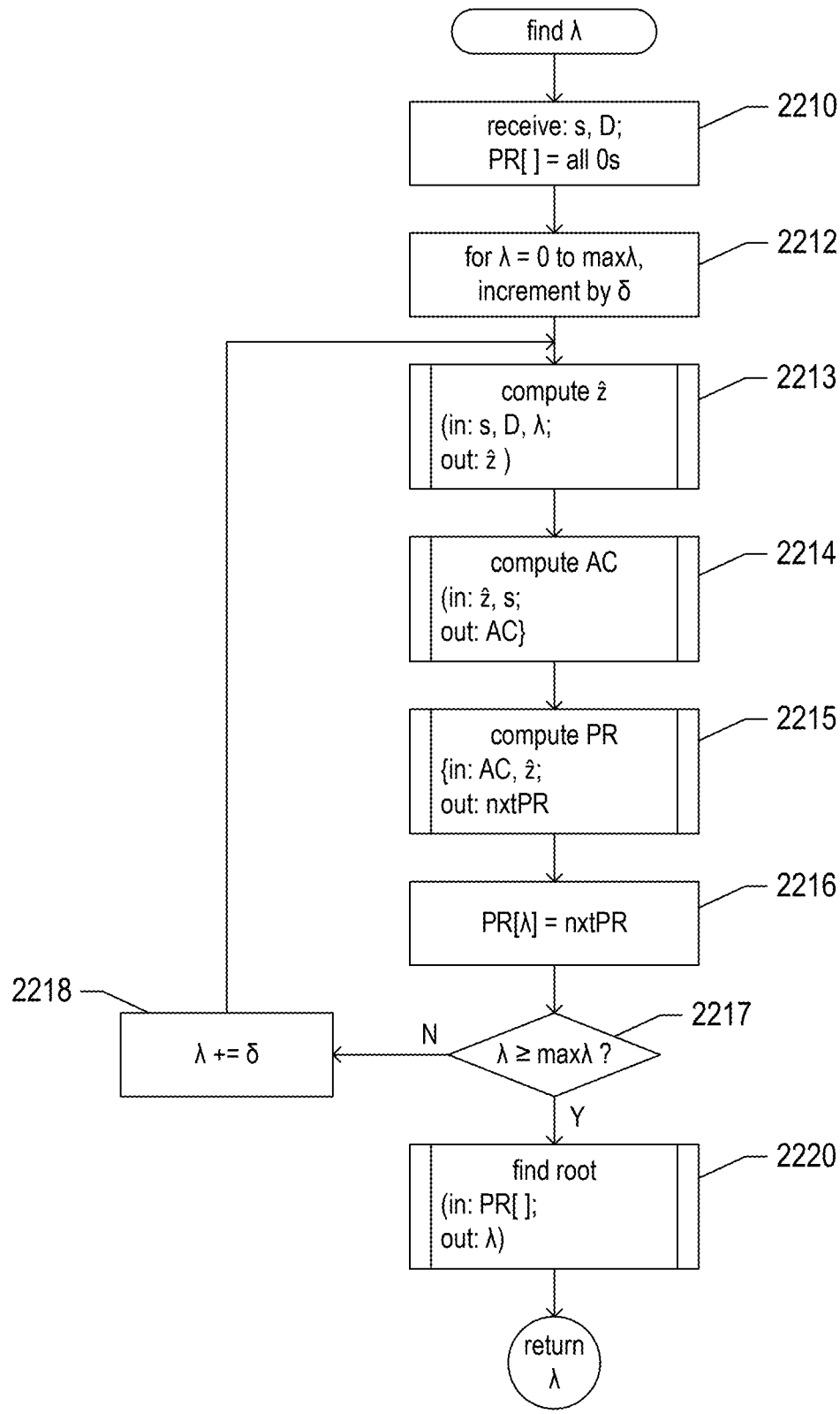

FIG. 22B provides a control-flow diagram for a method that finds the optimal value of constant $\lambda$ for use in determining $\hat{z}$. In step 2210, the routine receives an original signal s and the discrete differential-operator matrix D and sets an array PR[ ] to contain all zero values. Then, in the for-loop of steps 2212-2218, the routine computes the background signal $\hat{z}$ for each of multiple values of the constant $\lambda$ between 0 and max $\lambda$. For each background signal, the routine then computes the PR ratio by extracting the AC component and taking the ratio AC to the magnitude of the background signal. This produces a discrete function PR=f($\lambda$) stored in the array PR[ ]. Finally, in step 2220, the root of a function related to f($\lambda$) is determined in order to determine an optimal value for $\lambda$.

Figure 22C:
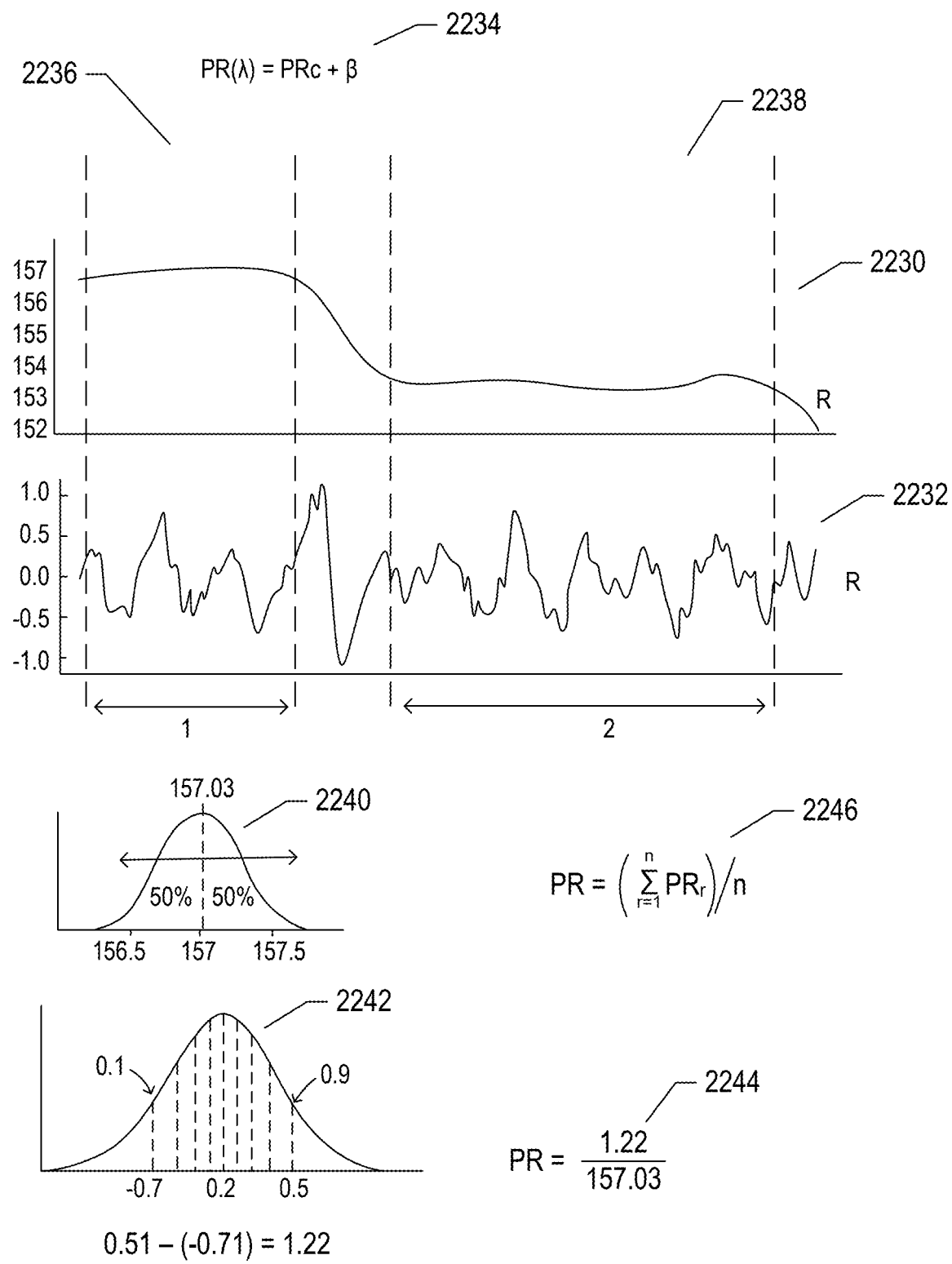

FIG. 22C illustrates how the PR ratio is determined in step 2215 of FIG. 22B. Plot 2230 shows the DC component of the original signal and plot 2232 shows the AC component of the original signal computed using a particular value of the constant $\lambda$. The expression 2234 illustrates the function for which a root is to be determined, where $\beta$ is a constant value. Those portions of the DC and AC signal components 2236 and 2238 in which the DC component is relatively flat and non-varying are used for the computation of the PR ratio. The magnitude of the DC component is determined as the mean of the distribution 2240 of the DC-component values in the considered regions 2236 and 2238. The magnitude of the AC component is also determined from a distribution 2242 of the AC-component values in the considered regions 2236 and 2238. In this case, the magnitude is determined as the difference between the 0.1 quantile and 0.9 quantile AC-component values. A PR ratio for each portion of the color-intensity signal 2236 and 2238 is then computed as the ratio of the AC-component magnitude to the DC-component magnitude 2244. Finally, a final PR ratio is computed 2246 as the average of the PR ratios computed for the portions of the color-intensity signal in which the DC component is relatively constant.

Figure 22D:
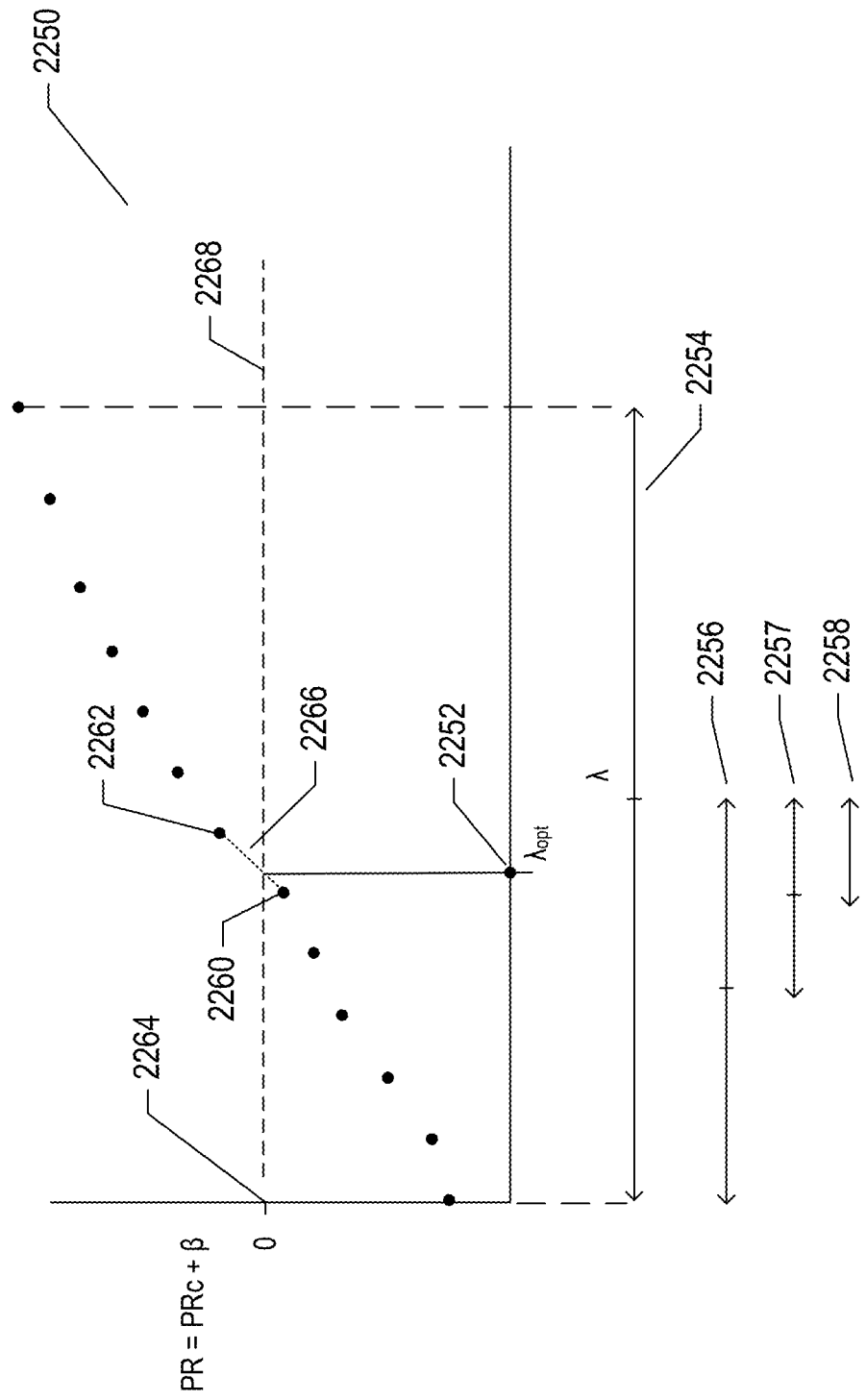

FIG. 22D illustrates finding the root of the expression 2234 provided in FIG. 22C. FIG. 22D shows a plot 2250 of the value $PR-PR_C+\beta$ for each value of $\lambda$. A bisection method is used to find the root of this equation 2252. The considered portion of the horizontal $\lambda$ axis 2254 is successively divided into two equal parts 2256-2258 until the two points 2260 and 2262 that bracket the value 0 2264 are identified. These two points can then be joined by a line segment 2266 and the $\lambda$ coordinate for the point at the intersection of that line segment with the horizontal line segment 2268 corresponding to the value 0 is used as the optimal value of $\lambda$, $\lambda$opt. The optimal value of $\lambda$ is equal to a value less than $PR_C$ by the value $\beta$, $PR_C-\beta$.

Figure 23A:
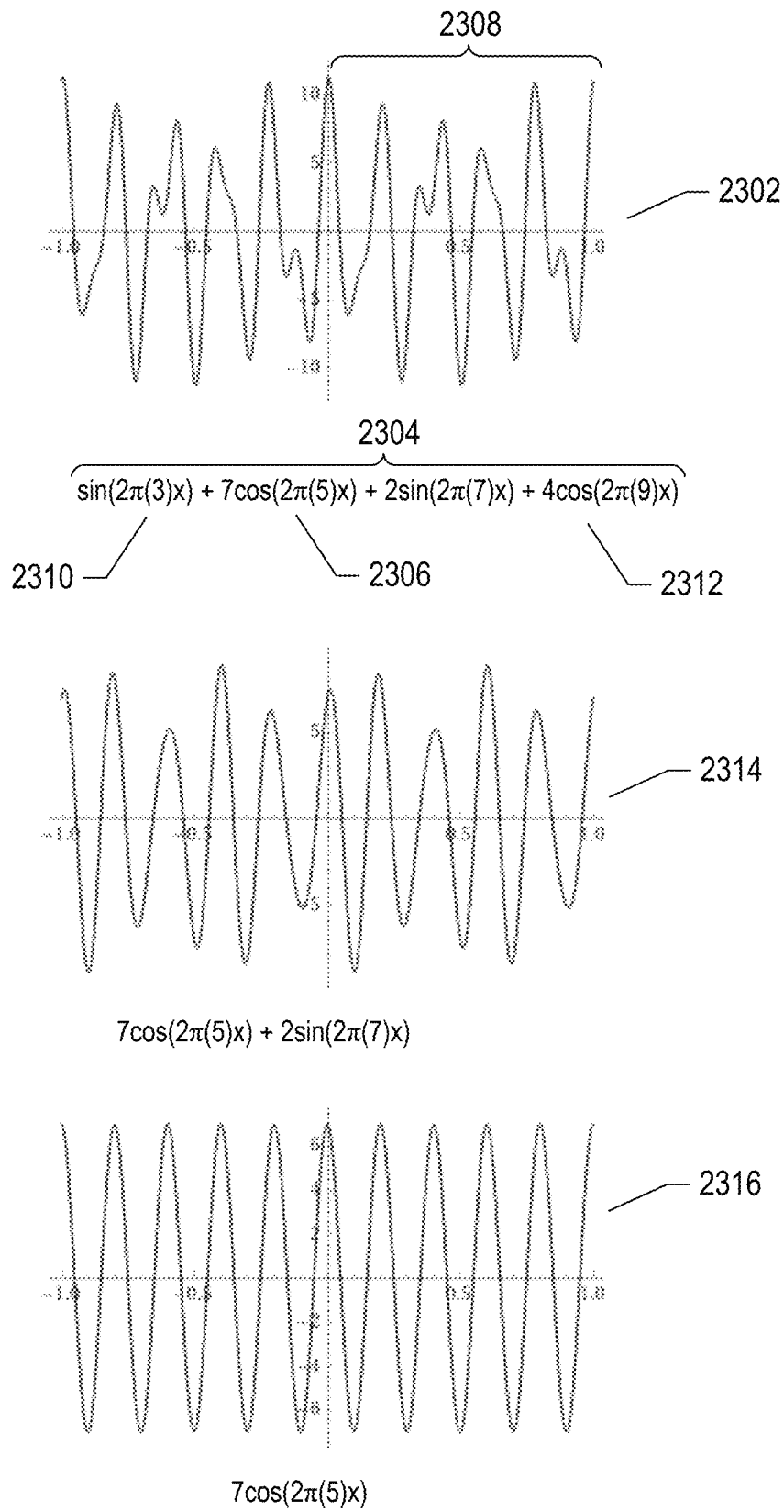
FIGS. 23A-C illustrate a filter method used in implementations of the currently disclosed heartbeat-rate determination methods and systems to filter the detrended green color-intensity signal to remove unwanted components.
Figure 23B:
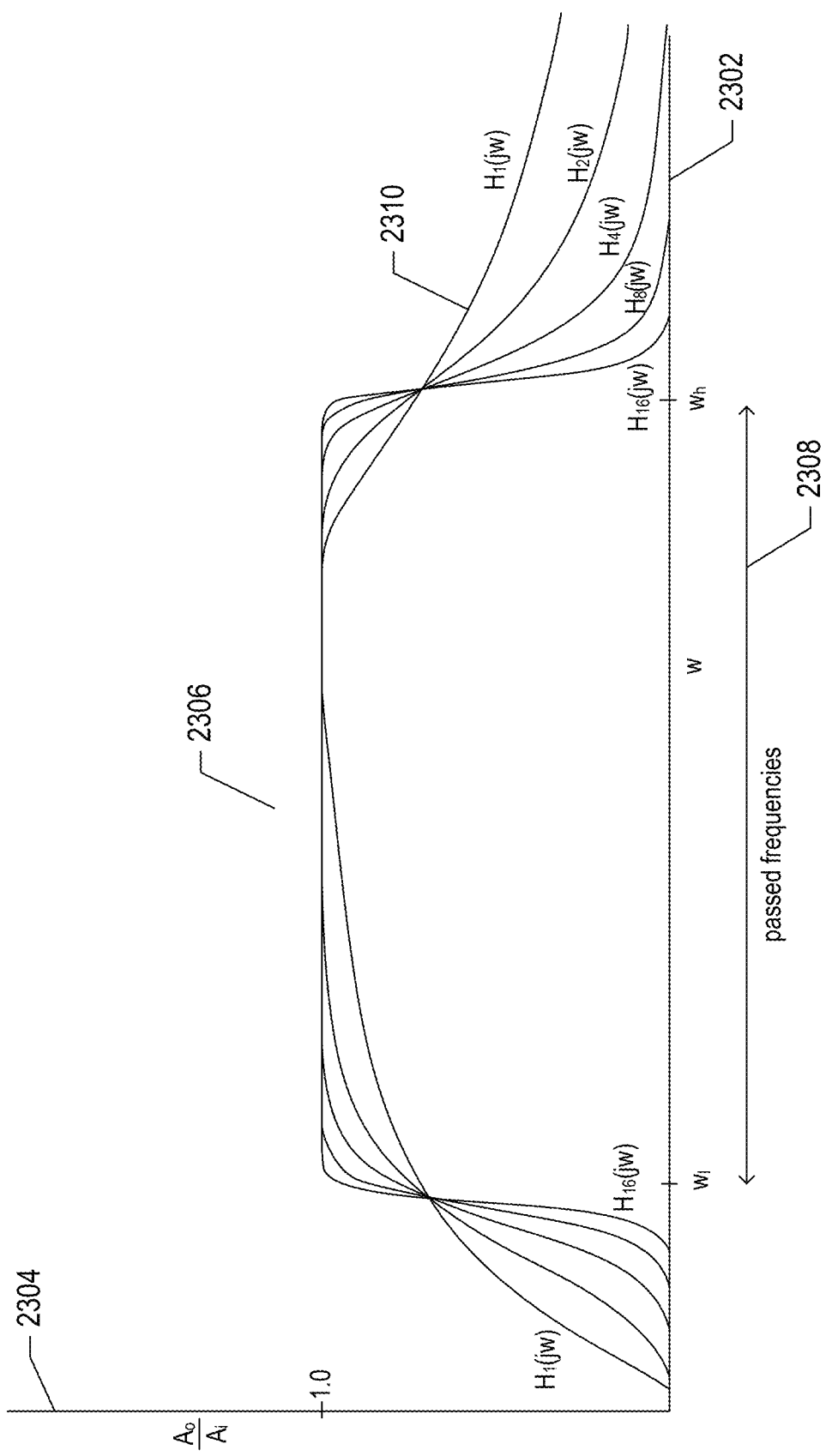
Figure 23C:
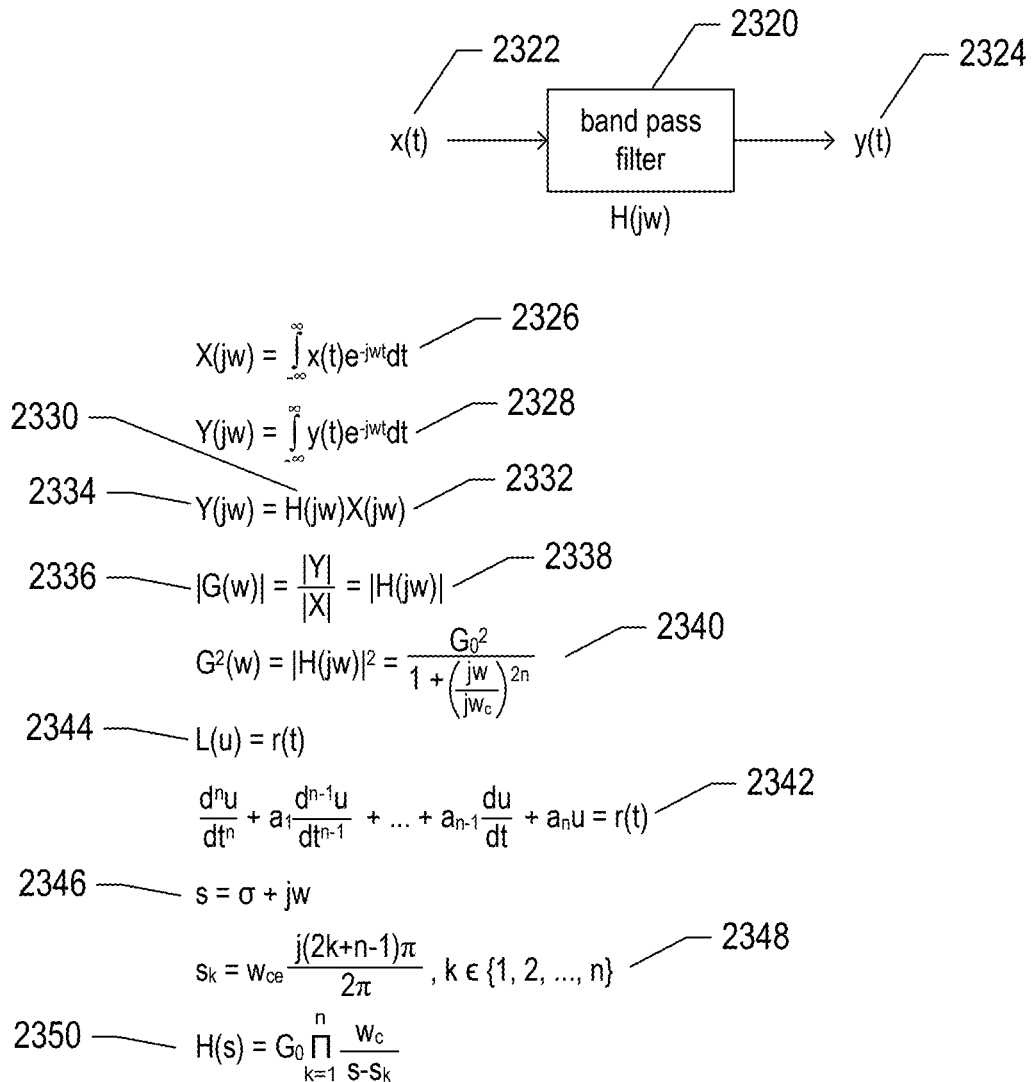

FIGS. 23A-C illustrate a filter method used in implementations of the currently disclosed heartbeat-rate determination methods and systems to filter the detrended green color-intensity signal to remove unwanted components. As a visual example, FIG. 23A shows a plot 2302 of an example multi-component signal. An expression for this signal 2304 is provided below the plot. Assume that the heartbeat signal corresponds to the second component 2306. The frequency of the signal is 5 with respect to some unit of time. Five distinct, regularly-spaced peaks would be expected in the right-hand portion of the plot 2308. However, instead, there are six peaks that are irregularly spaced. If a bandpass filter is applied to the signal to remove the first 2310 and final 2312 components of the signal, the resulting filtered signal, shown in plot 2314, includes only five peaks that are more evenly spaced than in the unfiltered signal shown in plot 2302. A perfect filter that selected only the desired component would produce a sinusoidal signal shown in plot 2316, but perfect filtering is generally impractical. The filtered signal 2314 is adequate for determining an estimated heartbeat rate. Thus, a next step in the signal-processing phase of the currently disclosed methods and systems is to bandpass filter the detrended green-color-intensity signal to select only green-color-intensity-signal components with periods in a range of periods about the expected or average heartbeat rate.

FIG. 23B illustrates a set of Butterworth bandpass filters. In this plot, the horizontal axis 2302 represents frequency and the vertical axis 2304 represents the gain provided by the filter. In the central portion 2306 of the filter curves, the gain is 1.0, indicating that the filter does not attenuate the input signal. Thus, line segment 2308 represents the range of frequencies of the input signal that are passed by the filter. Signal components with frequencies below and above this range of frequencies are removed by the bandpass filter from the output signal. The steepness of the filtering curves at each end of the passed-frequencies range increases with the order of the bandpass filter. The filtering curve of an order 1 bandpass filter 2310 has the least steepness and the steepness increases with increasing order. The subscripts of the symbol "H" indicate the order.

FIG. 23C illustrates computation of the transfer function H corresponding to a bandpass filter, such as a Butterworth filter. The bandpass filter can be viewed as a circuit element 2320 that receives an input signal 2322 and outputs an output signal 2324. The Laplace transforms of the input and output signals are given by expressions 2326 and 2328. The filter transfer function 2330 multiplied by the Laplace transform of the input signal 2332 generates the Laplace transform of the output signal 2334. The absolute value of the gain as a function of frequency 2336 is equal to the absolute value of the filter transfer function 2338, and can be computed from expression 2340, for a low pass filter, in which de is the critical frequency below which components are filtered from the signal and Go is the maximum gain produced by the filter in the past-frequencies range. The orders of the filter are related to the number of poles n, which is related to the number of terms in a differential equation used to compute the filter transfer function. In electronic systems, the number of terms in the differential equation is related to the number of circuit elements used to implement the filter. The differential equation 2342 is an expansion of the differential-operator equation 2344, where u and r are smooth functions of time. A set of solutions to this equation is found using a characteristic polynomial. In general, the transfer function is a function of s, given by expression 2346, rather than jω. Solution of the differential equation generates a set of n poles $s_k$ 2348 which are then used to generate an expression for the transfer function of the filter 2450. The denominator in this expression is referred to as a Butterworth polynomial, and the Butterworth polynomials are tabulated to allow for computation of n-pole Butterworth-filter transfer functions which, in turn, can be used to generate digital, computational Butterworth filters. In the currently disclosed methods and systems, a Butterworth filter of low order, such as order 2 or order 3, is used to filter the detrended green-color-intensity signal to remove unwanted components and produce a relatively clean signal that reveals the oscillating signal component corresponding to the heartbeat of a subject, patient, or participant recorded in a video.

Figure 24A:
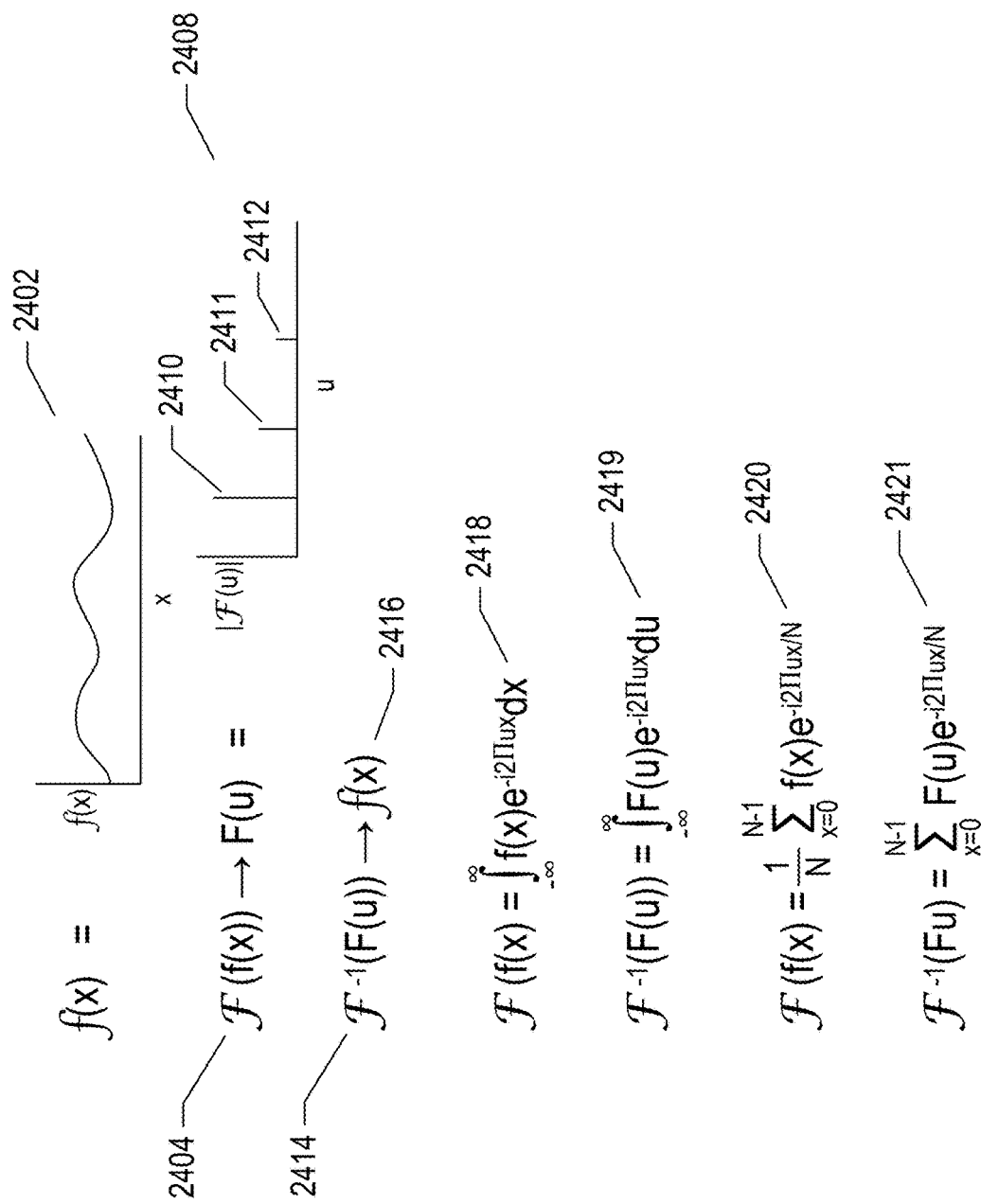

FIGS. 24A-C illustrate a first spectral method, used in the currently disclosed methods and systems, for processing the filtered, detrended, green-color-intensity signal to derive a heartbeat rate for each of multiple windows of frames or, equivalently, of signal datapoints. FIG. 24A illustrates Fourier transforms. Plot 2402 shows a time-domain signal f(x) where x represents time and f(x) maps time to signal intensity. The signal is composed of multiple oscillating components of different frequencies. A Fourier transform of the signal f(x) 2404 produces a frequency-domain signal F(u) 2406 plotted in plot 2408. Because the time-domain signal is composed of multiple oscillating components, the frequency-domain signal F(u) is a set of vertical spikes 2410-2412, each spike representing the frequency of one of the multiple oscillating components of the time-domain signal and the heights of the spikes proportional to the amplitudes of the oscillating components of the time-domain signal. An inverse Fourier transform 2414 applied to the frequency-domain signal F(u) produces the original time-domain signal $\hat{z}$ 460. Expressions 2418 and 2419 illustrate computation of the forward continuous Fourier transform and inverse or backward continuous Fourier transform, respectively. These are simple 1-dimensional Fourier transforms, but more complex, multi-dimensional Fourier transforms can be used for multidimensional problem domains. Note that the computation of the intensity or amplitudes for a particular frequency u using the frequency-domain function F(u) involves integrating over all times. Fourier transforms can also be discrete, and expressions 2420 and 2421 show the simple 1-dimensional discrete forward and inverse Fourier transforms corresponding to the continuous Fourier transforms shown in expressions 2418 and 2419.

FIG. 24B provides a simple example of the forward Fourier transform. Plot 2430 shows a simple cosine waveform, or signal, with frequency 4, defined by expression 2432. The frequency-domain function F(u) is shown by expression 2434. An expression 2436, f(t) has been replaced by cosine function and expression 2432. Using Euler's formula for complex exponentials of e, equivalent expression 2438 is obtained. Using the fact that sin (x)=−sin(−x), expression 2440 is obtained. The final integration term 2442 in expression 2440 is 0, since the result of integration of cos(x)sin(x) is 0 regardless of the value of x. The first integration term 2444 is non-0 only in the case that u=x, which results in the final expression 2446 for the frequency-domain function F(u). Each term in this expression represents a spike 2448 and 2450 in the plot 2452 of the frequency-domain function.

FIG. 24C illustrates a method used in the currently disclosed methods and systems to determine the amplitude coefficients of the principal components of the filtered, detrended, green-color-intensity signal. In many types of signal processing, a Fourier transform is employed to generate the amplitudes of the components of different frequencies in a signal. However, the more computationally-efficient method illustrated in FIG. 24C instead uses an optimization approach and a Fourier series representation of the filtered, detrended, green-color-intensity signal. The vector a 2460 includes an a amplitude and a b amplitude for the sine and cosine components, respectively, of each possible component of the filtered, detrended, green-color-intensity signal with a frequency selected from a set of evenly spaced frequencies $v_1, v_2, \ldots, v_n$, that span the range of frequencies within the filtered green-color-intensity signal. In general, a signal can be represented by a Fourier series which includes sin and cosine components for each possible signal-component frequency. Multiplication of the vector a of amplitudes by the Fourier matrix 2462 produces a column vector of signal intensities that represents a multi-component signal with component frequencies selected from $v_1, v_2, \ldots, v_n$. Each row of the Fourier matrix corresponds to a point in time and each column of the Fourier matrix Includes either the cosine term or the sign term for a particular component of the signal. The amplitudes of the components for an input filtered and detrended green-color-intensity signal s are obtained by minimizing expression 2464, as indicated by the full expression 2466. In this expression, $\gamma$ is a constant. This minimization problem is similar to the previously discussed minimization problem represented by expression 2106 in FIG. 21A. The first term 2468 in expression 2464 is the dot product of the generated signal $\Phi a$, where $\Phi$ is the Fourier matrix, and the input signal s. Thus, as in the previous minimization problem, the first term is minimized when the generated signal is identical to the input 2470. The second term 2472 in expression 2464 is simply the sum of the amplitudes in amplitude vector a. The more amplitudes that have value 0, the smaller the second term. Thus, the minimization problem is constrained to attempt to find as few signal components as possible to represent the input signal, with one of these signal components presumably the heartbeat signal.

Figure 25:
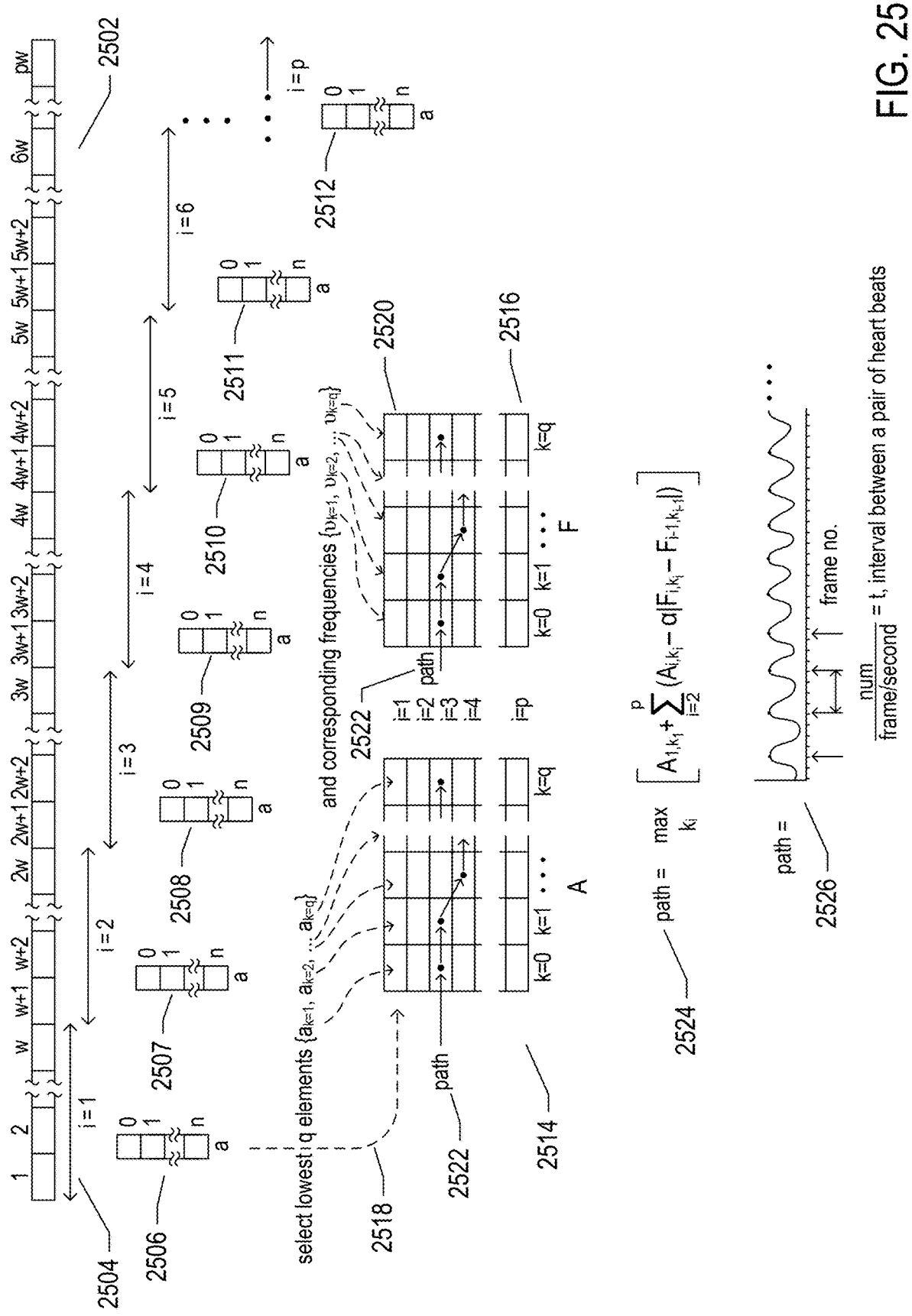
FIG. 25 illustrates spectral heartbeat-rate determination following generation of signal-component amplitudes using the optimization method discussed above with reference to FIG. 24C.

FIG. 25 illustrates spectral heartbeat-rate determination following generation of signal-component amplitudes using the optimization method discussed above with reference to FIG. 24C. As mentioned above, the filtered, detrended, green-color-intensity signal s 2502 is partitioned into signal subsequences, or windows. Each window is indexed by index i selected from the ordered set of indices {1, 2, ..., p}. Horizontal double-headed arrows, such as double-headed arrow 2504, represent the windows, each of length w, in signal s. For each window, the above-discussed optimization method, illustrated in FIG. 24C, is used to generate a vector of n signal-component amplitudes 2506-2512. These signal-component-amplitude vectors are then used to generate p rows in each of an amplitude matrix A 2514 and a frequency matrix F 2516. Each row in the amplitude matrix A is obtained by selecting the q largest amplitudes from the corresponding signal-component-amplitude vector, as indicated for the first row in the amplitude matrix by dashed arrow 2518. The corresponding row in the frequency matrix, as shown for the first row 2520 in FIG. 25, contains the frequencies corresponding to each of the q selected amplitudes in the corresponding row of the amplitude matrix. Once the amplitude matrix A and frequency matrix F are constructed, a path of row indices through the matrices is determined, with the path 2522 indicated in FIG. 25 as a set of matrix cells connected by arrows. The path is obtained by a third optimization indicated by expression 2524. This expression seeks a path with the generally greatest component-signal amplitudes but constrained to minimize the difference in frequencies between each step in the path. Selecting the greatest amplitudes in each of the signal-component-amplitude vectors can lead to an oscillatory heartbeat-rate sequence because of the intrinsic noise in collected RGB data due to motion and changing light conditions. As indicated by plot 2526 in FIG. 25, using the amplitudes and frequencies in the determined path results in a heartbeat-rate-related signal in which the oscillation period varies reasonably continuously and slowly over the time-frame of the signal s. The period of this signal, at each point in time, or, correspondingly, at each frame number corresponding to a datapoint in the signal, represents the instantaneous heartbeat rate for the subject, patient, or participant from which the raw green-color-intensity signal was extracted from the subject's, patient's, or participant's AROI.

Figure 26A:
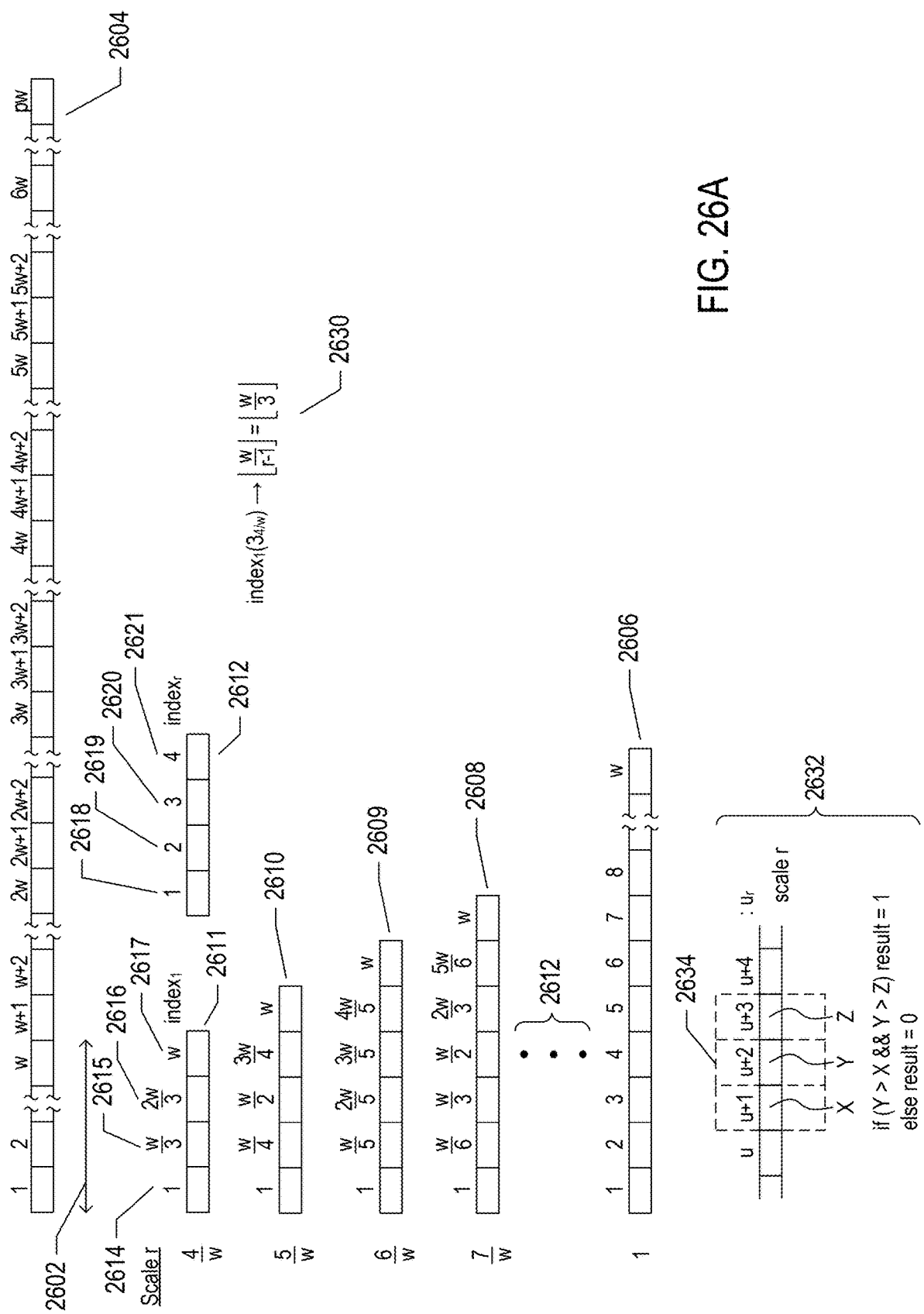
FIGS. 26A-B illustrate a second method, using the currently disclosed heartbeat-rate-determination methods and systems, for determining the heartbeat rate for a subject, patient, or participant from a filtered, detrended, green-color-intensity signal.
Figure 26B:
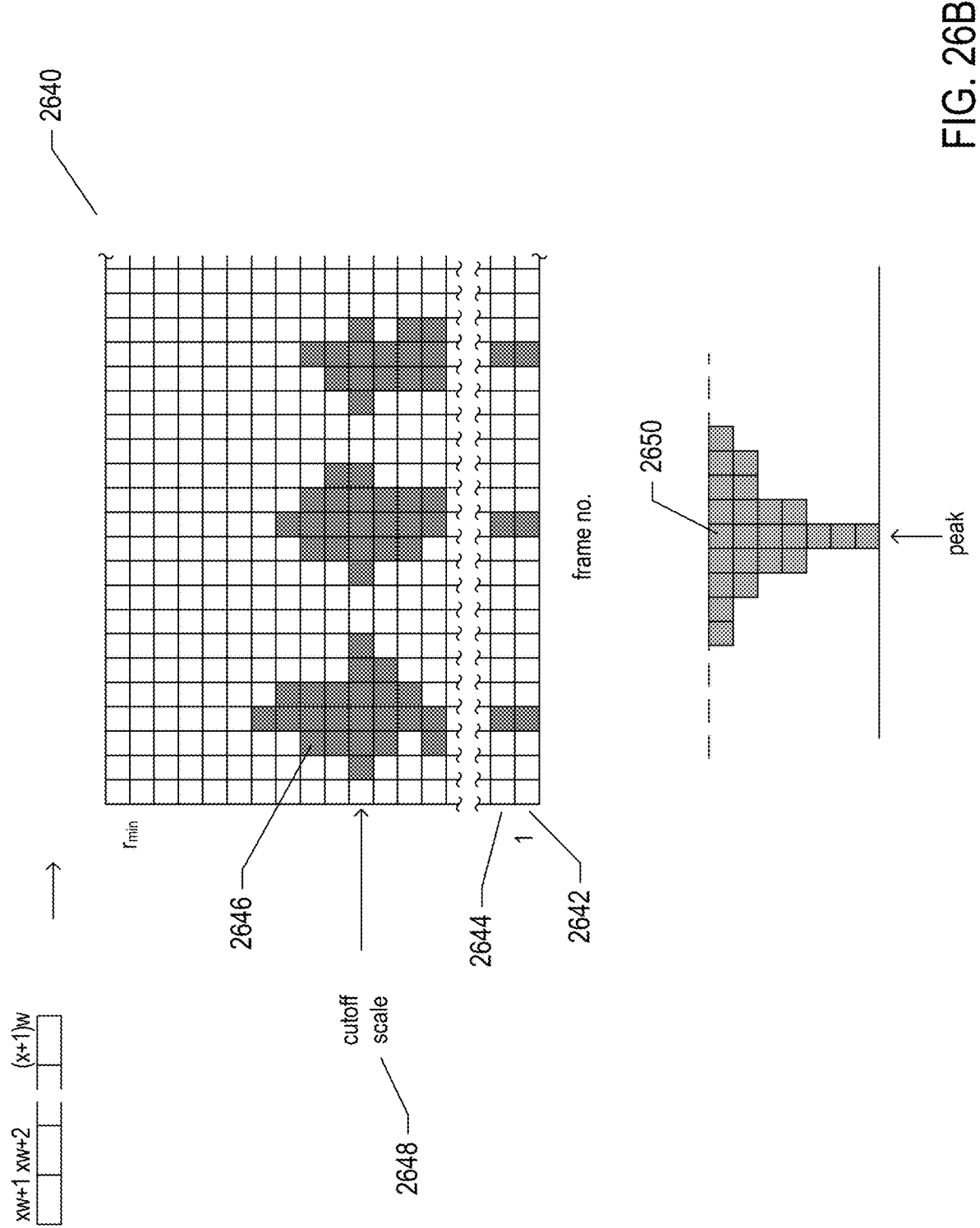

The optimization indicated by expression 2524 employs an additional optimization parameter $\alpha$. Thus, the spectral heartbeat-rate-determination method involves three different optimization parameters $\lambda$, $\gamma$, and $\alpha$, used in the three different optimization methods described by expressions 2106 in FIG. 21A. 2466 in FIG. 24C, and 2524 in FIG. 25, respectively. An additional parameter $\beta$ is used, in expression 2234, for determining the value of parameter A. Thus, the spectral heartbeat-rate-determination method involves numerous parameter values that need to be determined, generally by evaluating historical heartbeat-rate determinations from video recordings and additional physiological sensors. The problems described by expressions 2106 and 2466 are convex optimization problems that are solved using the alternating direction method of multipliers ("ADMM"). ADMM is method that splits/breaks the problem into smaller, more straightforwardly computable pieces. The problem described by expression 2524 can be efficiently solved using the dynamic programming approach. Dynamic programming is a general class of recursive computational methods in which a large optimization problem is factored into smaller sub-problems, but the small sub-problems are repetitive and reoccurring during solution of the larger optimization problem, as a result of which significant efficiencies are obtained by storing an initial solution for each sub-problem and reusing the stored solutions for every subsequent occurrence of the sub-problem. In general dynamic-programming optimization packages are commercially available, FIGS. 26A-B illustrate a second method, using the currently disclosed heartbeat-rate-determination methods and systems, for determining the heartbeat rate for a subject, patient, or participant from a filtered, detrended, green-color-intensity signal. As shown at the top of FIG. 26A, the second method also involves partitioning a filtered, detrended, green-color-intensity signal into multiple windows, where each window includes w datapoints or frames and corresponds to a time interval, as indicated by double-headed arrow 2602, which indicates a first window within filtered, detrended, green-color-intensity signal 2604. For each window, the datapoints in the window 2606 can be viewed at multiple different scales 2608-2611, with ellipsis 2612 indicating additional possible scales. For example, in order to generate a view of the datapoints 2606 at scale 4/w 2611, four datapoints spaced apart from one another at a regular interval are selected from datapoints 2606 to form a four-datapoint representation of the window 2612. The approximate indices for the four selected datapoints 2614-2617 are reindexed 2618-2621 in the 4/w-scale view of the window 2612. The transformation between the signal-datapoint indices to scaled-datapoint indices is shown by expression 2630, where symbol pairs "⌊ ⌋" indicate the floor operator which returns the largest integer less than or equal to a rational number operated on by the floor operator. Plot and expression 2632 illustrates a peak-finding operator. This operator, represented by dashed rectangle 2634, is applied to three successive datapoints within a datapoint window at an arbitrary scale r. When the value of the central datapoint in the three datapoints encompassed by the peak operator is greater than the other two datapoints, the central datapoint represents a local peak. The peak operator is applied across the scale=1 datapoints of the window 2606 and to additional scaled views of the window, such as view 2612 at scale 4/w, at increasingly smaller scales in order to find the peaks in the scale=1 window and additional increasingly smaller-scale windows. The indices of the identified peaks at each scale are then translated, using index transformation 2630, to indices for the scale=1 window. The cells or elements of Boolean arrays corresponding to the different scaled views of the original window with indices corresponding to peaks detected within the scaled views are set to one of Boolean values 0 and 1 and the remaining cells or elements of the Boolean arrays set to the other of the two Boolean values. In the current discussion, the cells or elements of the Boolean arrays corresponding to peak indices are set to 1 and all remaining cells or elements are set to 0. The Boolean arrays are then stacked one above another to form a scales matrix, such as scales matrix 2640 in FIG. 26B. In scales matrix 2640, the bottom row 2642 corresponds to the original signal window, or to the scale=1 scale, and each successive row, such as the next row 2644, corresponds to a lower scale. In certain implementations, each successive row, traversing the scales matrix upward from the bottom row, may have a scale equal to ½ the scale of the preceding row. In FIG. 26B, the cells containing Boolean value 1, or TRUE, are shaded and the cells containing Boolean value 0, or FALSE, are unshaded. The shaded cells form tree-like blocks of adjacent shaded cells, such as block 2646. The width of these blocks initially increases, with decreasing scale value, up to a cutoff scale 2648, and then more rapidly decreases. The cutoff scale is the scale for which the maximum number of elements in the corresponding Boolean array have Boolean value 1, or TRUE. Once the cutoff value is determined for the scales matrix, then only the rows of the scales matrix from the bottom row up to and including the row corresponding to the cutoff scale are considered. Within these considered rows, signal peaks correspond to columns of cells or elements, such as column 2650, in which all of the cells or elements are shaded. All of these cells or elements correspond to a peak identified by the peak operator at all of the scales between scale=1 and the cutoff scale. In other words, a peak determined at all of the scales up to the cutoff scale is considered to be a true peak in the signal from which the window was extracted. These peaks are then used to define the intervals between heartbeats, which corresponds to the heartbeat frequency at each point in the original signal. This peak-finding method for determining the heartbeat rate at each point in a filtered, detrended color-intensity signal does not depend on multiple parameters, as does the spectral heartbeat-rate-determination method, discussed above with reference to FIGS. 24A-25, and is more accurate for noisy signals, in general, but is also generally slightly less accurate for signals with minimal amounts of noise. In certain implementations of the currently disclosed methods, both the spectral method and the peak-finding method are used, and a choice is then made as to which of the results from the two methods are selected for overall heartbeat-rate determination based on the confidence intervals associated with the results obtained by the two different methods. In other implementations, either of the two methods may be used exclusively, and in still other implementations, some type of weighted average of the results returned by the two methods may be used, for example weights inversely proportional to the lengths of the confidence intervals.

Figure 27:
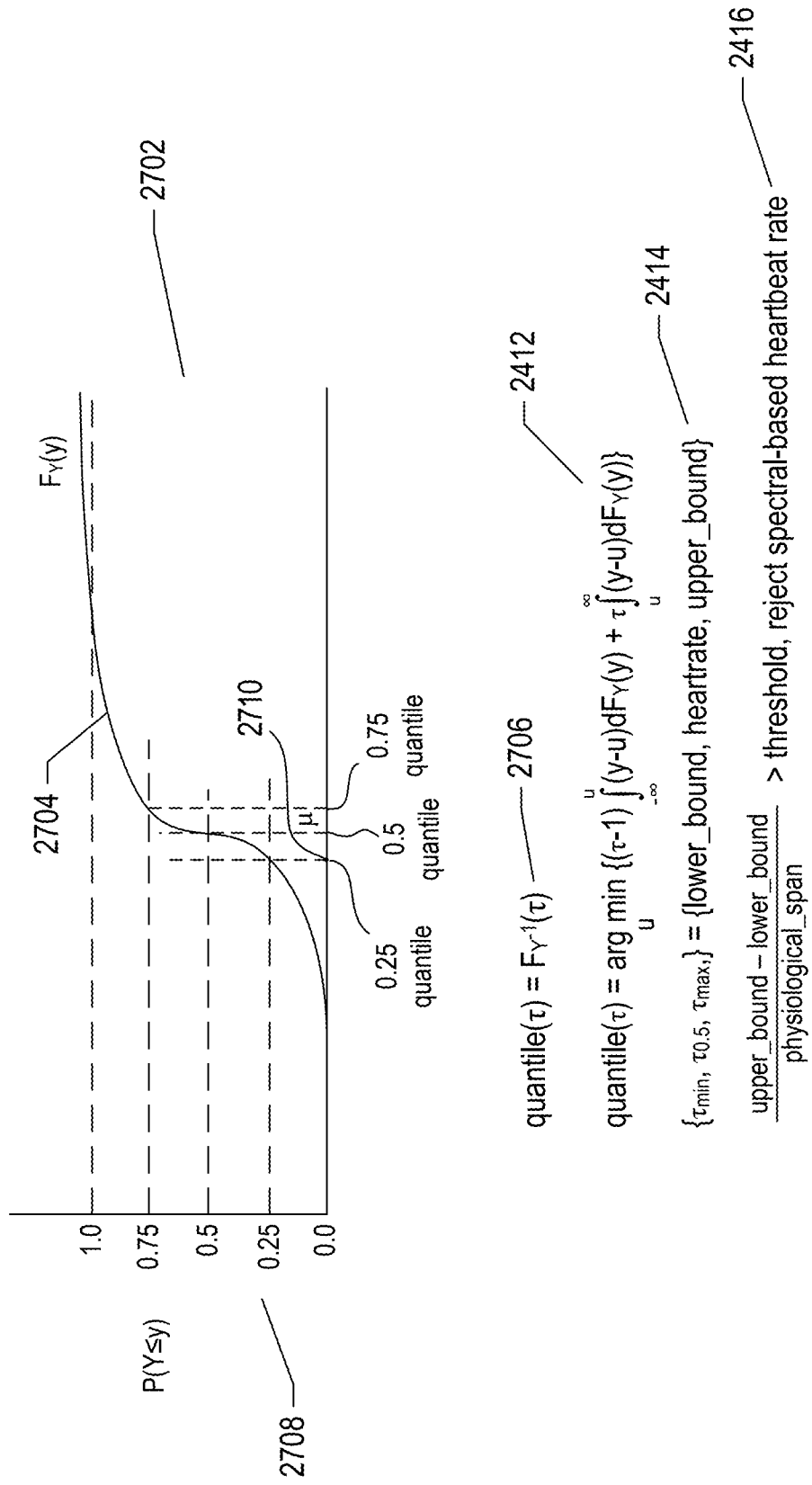
FIG. 27 illustrates determination of the confidence bounds for a heartbeat rate determined by the above-discuss spectral heartbeat-rate-determination method.

FIG. 27 illustrates determination of the confidence bounds for a heartbeat rate determined by the above-discuss spectral heartbeat-rate-determination method. In many implementations of the currently disclosed methods and systems, a quantile-regression method is used to determine the confidence bounds. Plot 2702 shows the plot of the cumulative distribution function 2704, $F_Y(v)$, for a random variable Y that, when sampled, returns values y. The y sample value corresponding to quantile τ is the value of the inverse cumulative distribution function at τ, as indicated by expression 2706. As can be seen graphically for quantile τ=0.25 (2708), the sample value corresponding to quantile τ=0.25 is the value represented by point 2710. The sample values corresponding to quantiles can be computed by a minimization method, indicated by expression 2712, referred to as quantile regression. Quantile regression can be used to compute $\tau_{min}$, $\tau_{max}$, and $\tau_{0.5}$ values for a series of determined heartbeat rates, and these can be returned as the lower bound, determined heartbeat rate, and upper bound for a heartbeat-rate determination, as indicated by expression 2414. These values can be used to determine whether or not to reject a heartbeat-rate determination by, for example, by rejecting a determined heartbeat rate when the difference between the upper and lower bounds divided by a known physiological span of heartbeat rates is greater than a threshold value, as indicated by expression 2416.

Figure 28:
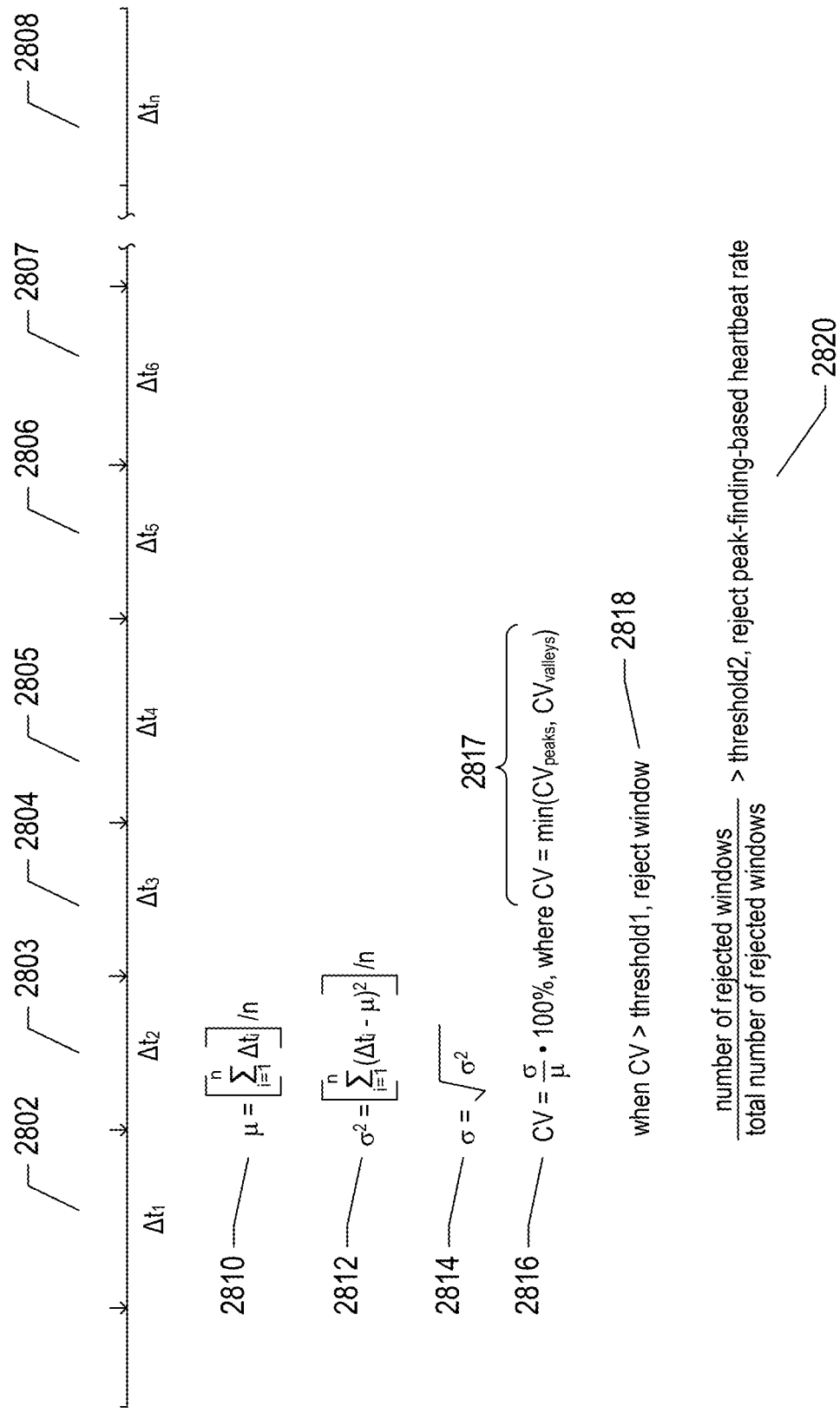
FIG. 28 illustrates determining statistics used to accept or reject a heartbeat-rate determination made by the peak-finding method, discussed above with reference to FIGS. 26A-B.

FIG. 28 illustrates determining statistics used to accept or reject a heartbeat-rate determination made by the peak-finding method, discussed above with reference to FIGS. 26A-B. At the top of FIG. 28, the intervals Δt between determined peaks 2802-2808 are illustrated. The mean 2810, variance 2812, and standard deviation 2814 for the intervals are computed by simple, well-known statistical methods. A confidence value CV is computed as the percentage ratio of the standard deviation to the mean, as indicated by expression 2816. The intervals between peaks can be determined either for the maximum peak values or for the minimum values corresponding to valleys between peaks, and the minimum CV is then selected from the CV values for peaks and valleys, as indicated by expression 2817. When the CV value computed for a window extracted from a signal is greater than a threshold value, the heartbeat rate determined by the peak-finding method for that window is rejected, as indicated by expression 2818. This leads to expression 2824 for accepting or rejecting a heartbeat-rate determination based on the peak-finding method.

FIG. 29 provides a control-flow diagram for the routine "HBrate," called in steps 1212 and 1222 of FIG. 12. This routine carries out heartbeat-rate determination for a sequence of frames of a recorded video. As discussed above with reference to FIG. 12, when the currently disclosed heartbeat-rate determination methods and systems are operating in offline mode, the heartbeat-rate determination is carried out over the entire video recording, following completion of video recording. By contrast, when the currently disclosed heartbeat-rate determination methods and systems are operating in online mode, the heartbeat-rate determination is carried out over each of a number of blocks or windows, in near real time. This level of windowing potentially partitions an entire video recording into blocks or windows of successive frames. There is, as discussed above, a second level of windowing employed in both the spectral heartbeat-rate determination and the peak-finding heartbeat-rate determination methods. In certain implementations, the second level of windowing coincides with the first level of windowing, so that spectral and peak-finding heartbeat-rate determinations are carried out for either each of the first-level windows, in online mode, or for the entire video recording, in offline mode. In other implementations, spectral and peak-finding heartbeat-rate determinations are carried out for second-level windows into which first-level windows are partitioned.

In step 2902, the routine "HBrate" receives output channel HBout and the starting and ending frames in the video recording for which heartbeat-rate determination is to be made, start and end. In the outer for-loop of steps 2904-2920, each of the different bounding box indexes/corresponding to a different patient, subject, or participant is considered. In step 2905, the routine "generate RGB signal" is called to generate the RGB signals for the currently considered subject, patient, or participant, as discussed above with reference to FIGS. 17A-B. In step 2906, a background-subtracted, or detrended, green-color-intensity signal is determined from the raw RGB signals as discussed above with reference to FIG. 18A-22D. In step 2907, the detrended, green-color-intensity signal is filtered to remove unwanted component signals, as discussed above with reference to FIGS. 23A-C.

In the inner for-loop of steps 2908-2917, the filtered, detrended, green-color-intensity signal is divided into second-level windows and the heartbeat rate is determined for each of these second-lower-level windows Gw. In step 2909, the spectral heartbeat-rate determination method is carried out, via a call to the routine "spectral HBrate," as discussed above with reference to FIGS. 24A-25 and 27. In step 2910, the peak-finding heartbeat-rate determination method is carried out, via a call to the routine "spectral HBrate," as discussed above with reference to FIGS. 26A-B and 28. In step 2911, a routine "evaluate" is called to evaluate the confidence bounds associated with the heartbeat-rate determinations carried out in steps 2909 and 2910. When the heartbeat-rate determination made by the spectral method meets confidence-bounds criteria, as determined in step 2912, the determined heartbeat rate is output to the output channel in step 2913. Otherwise, when the peak-finding-based heartbeat-rate determination is determined to meet confidence criteria, in step 2914, the heartbeat-rate determination made by the peak-finding method is output to the output channel in step 2915. When the heartbeat-rate determination made by both of the spectral and peak-finding methods does not satisfy the confidence criteria, then a null heartbeat rate is output to the output channel, in step 2916. When there is another second-level window Gw for which a heartbeat-rate determination is needed, as determined in step 2917, the next second-level window is extracted from the filtered, detrended, green-color-intensity signal, in step 2918, and control returns to step 2909 for another iteration of the for-loop of steps 2908-2918. Otherwise, when there is another bounding box corresponding to another subject, patient, or participant to consider, as determined in step 2919, the bounding-box index i is incremented, in step 2920, and control returns to step 2905 for another iteration of the outer for-loop of steps 2904-2920.

Figure 30:
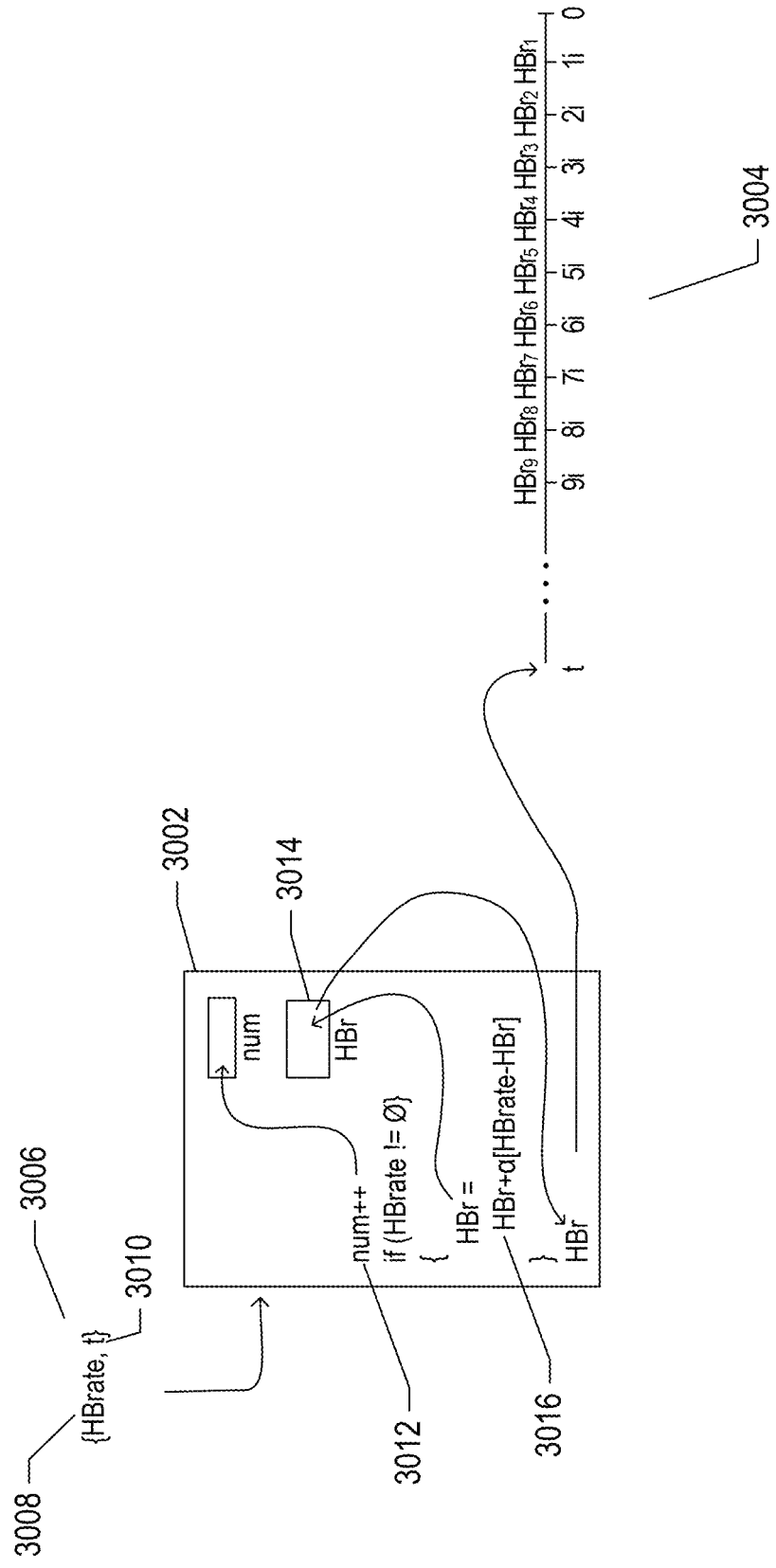
FIG. 30 illustrates processing of the output heartbeat-rate determinations.

FIG. 30 illustrates processing of the output heartbeat-rate determinations. As discussed above, multiple heartbeat-rate determinations are output during processing of the video recording. The output heartbeat-rate determinations are collected and smoothed by a local temporal discounting and averaging process, as shown in the heartbeat-rate-determination component 3002, which outputs a series of determined heartbeat rates at regular time intervals over the entire time period of the recorded video 3004. There is a different heartbeat-rate-determination component for each subject, patient, and/or participant for which heartbeat rates are determined. Each received heartbeat-rate determination 3006 includes a local heartbeat rate 3008 for a particular time 3010 within the video recording. A count of the number of received heartbeat-rate determinations is incremented 3012 and, if the received heartbeat-rate determination is not a null heartbeat rate, as determined in step 2916 of FIG. 29, the temporally discounted and averaged heartbeat rate HBr 3014 is updated as indicated by expression 3016. The temporally discounted and averaged heartbeat rate HBr 3014 is then output by the heartbeat-rate-determination component 3002. This smoothing process ensures that the final sequence of determined heartbeat rates are relatively smoothly varying and noise free. In alternative embodiments, a single heartbeat-rate-determination component currently determines a time-ordered series of smoothed heartbeat-rate values for each subject, patient, or participant imaged in the video recording.

The present invention has been described in terms of particular embodiments, it is not intended that the invention be limited to these embodiments. Modifications within the spirit of the invention will be apparent to those skilled in the art. For example, any of many different implementations of the currently disclosed heartbeat-rate-determination methods and systems can be obtained by varying various design and implementation parameters, including modular organization, control structures, data structures, hardware, operating system, and virtualization layers, automated orchestration systems, virtualization-aggregation systems, and other such design and implementation parameters. As discussed above, the signal processing phase of the heartbeat-rate determination can employ either or both of spectral and peak-finding methods. Any of a variety of different optimization-solution methodologies, including dynamic programming and ADMM, can be used to solve the multiple different optimization problems that arise in the above-described heartbeat-rate determination methods. Different first-level and second-level window sizes and other constant and parameter values can be employed in different implementations and may even be dynamically reevaluated during processing of a given video recording.

The invention claimed is:
1. A heartbeat-rate video monitoring system comprising:
a video-recording device that records a video of one or more human subjects; and
a video-recording analysis component, implemented within a computer system having one or more processors, one or more memories, and one or more mass-storage devices that
receives recorded video frames from the video-recording device,
determines, for each human subject imaged in the recorded video frames, an adaptive region of interest ("AROI"),
extracts one or more color-intensity signals from a set of regions of interest ("ROIs") within the recorded video frames corresponding to each determined AROI as the average intensities of skin-color pixels in the set of regions of interest for each of one or more color channels, with the average intensity of skin-color pixels generating a single datapoint for each video frame, the single datapoint including
a time and a scalar intensity value for one color-intensity signal and associated color channel, or
a time and a vector of intensity values for two or more color-intensity signals and associated color channels, and
analyzes the one or more color-intensity signals extracted from each set of regions of interest corresponding to each human subject to determine the heart-beat rate for each human subject at one or more time points within the recorded video frames by
detrending one of the color-intensity signals, a color-intensity signal detrended by determining a DC signal component as a minimization of the vector difference of a color-intensity signal and the DC component and the product of a constant λ and a magnitude of a differential of the color-intensity signal, and subtracting the DC signal from the same or a different color-intensity signal to produce an AC signal component, filtering the detrended color-intensity signal, determining a first set of heartbeat rates by spectral analysis of the filtered, detrended color-intensity signal, determining a second set of heartbeat rates by peak-finding analysis of the filtered, detrended color-intensity signal, using the first set of heartbeat rates and second set of heartbeat rates to determine a final set of heartbeat rates for the window, and outputting the determined final set of heartbeat rates.

2. The heartbeat-rate video monitoring system of claim 1 wherein a value for the constant λ is determined by solving for the root of an expression of a PR ratio, AC/DC, as a function of λ, where AC is proportional to the amplitude of the AC component and DC is the magnitude of the DC component.

3. The heartbeat-rate video monitoring system of claim 2 wherein the root of the expression $PR(\lambda)=PR_C-\beta$ is used as the constant λ for determining the DC signal, where $PR_C$ is a maximum PR value observed in previous heartbeat-rate determinations from recorded videos.

4. A heartbeat-rate video monitoring system comprising:
a video-recording device that records a video of one or more human subjects; and
a video-recording analysis component, implemented within a computer system having one or more processors, one or more memories, and one or more mass-storage devices that
receives recorded video frames from the video-recording device,
determines, for each human subject imaged in the recorded video frames, an adaptive region of interest ("AROI"),
extracts one or more color-intensity signals from a set of regions of interest ("ROIs") within the recorded video frames corresponding to each determined AROI as the average intensities of skin-color pixels in the set of regions of interest for each of one or more color channels, with the average intensity of skin-color pixels generating a single datapoint for each video frame, the single datapoint including
a time and a scalar intensity value for one color-intensity signal and associated color channel, or
a time and a vector of intensity values for two or more color-intensity signals and associated color channels, and
analyzes the one or more color-intensity signals extracted from each set of regions of interest corresponding to each human subject to determine the heart-beat rate for each human subject at one or more time points within the recorded video frames by
detrending one of the color-intensity signals,
filtering the detrended color-intensity signal,
determining a first set of heartbeat rates by spectral analysis of the filtered, detrended color-intensity signal by for each of multiple successive windows of datapoints extracted from the filtered, detrended color-intensity signal
determining, by minimizing a sum of differences between amplitudes for a set of filtered, detrended color-intensity-signal components with frequencies in the range of frequencies passed by the bandpass filter by minimizing a sum of a first term comprising a magnitude of a difference between a signal generated from a current set of amplitudes and Fourier-series sin and cosine components and the filtered detrended color-intensity signal and a second term comprising a product of a third term proportional to a sum of the current amplitudes and a constant γ; and
generating a heartbeat-rate signal from the determined amplitudes,
determining a second set of heartbeat rates by peak-finding analysis of the filtered, detrended color-intensity signal,
using the first set of heartbeat rates and second set of heartbeat rates to determine a final set of heartbeat rates for the window, and
outputting the determined final set of heartbeat rates.

5. The heartbeat-rate video monitoring system of claim 4 wherein generating a heartbeat-rate signal from the determined amplitudes further comprises:
generating
an amplitude matrix A containing, as rows, an ordered set of a number of the highest amplitudes for each window, and
a frequency matrix F containing, as rows, an ordered set of frequencies corresponding to the amplitudes in the corresponding row of the amplitude matrix A;
generating a path of column indices for each successive column in the amplitude matrix A and corresponding column in the frequency matrix F by maximizing a sum of a first term comprising the amplitude in an element of the amplitude matrix A indexed by the first column index and a second term comprising a sum of differences, one difference for each column index following the first column index, between a first difference term comprising the amplitude in the indexed amplitude-matrix-A element and a second difference term comprising a difference between frequencies in the frequency matrix F indexed by the column index and the preceding column index; and
constructing the heartbeat-rate signal from the path of column indices, amplitudes in the amplitude matrix A, and frequencies in the frequency matrix F indexed by the column indices in the path.

6. A heartbeat-rate video monitoring system comprising:
a video-recording device that records a video of one or more human subjects; and
a video-recording analysis component, implemented within a computer system having one or more processors, one or more memories, and one or more mass-storage devices that
receives recorded video frames from the video-recording device,
determines, for each human subject imaged in the recorded video frames, an adaptive region of interest ("AROI"),
extracts one or more color-intensity signals from a set of regions of interest ("ROIs") within the recorded video frames corresponding to each determined AROI as the average intensities of skin-color pixels in the set of regions of interest for each of one or more color channels, with the average intensity of skin-color pixels generating a single datapoint for each video frame, the single datapoint including
  a time and a scalar intensity value for one color-intensity signal and associated color channel, or
  a time and a vector of intensity values for two or more color-intensity signals and associated color channels, and
analyzes the one or more color-intensity signals extracted from each set of regions of interest corresponding to each human subject to determine the heart-beat rate for each human subject at one or more time points within the recorded video frames by
  detrending one of the color-intensity signals,
  filtering the detrended color-intensity signal,
  determining a first set of heartbeat rates by spectral analysis of the filtered, detrended color-intensity signal,
  determining a second set of heartbeat rates by peak-finding analysis of the filtered, detrended color-intensity signal by
    for each of multiple successive windows of datapoints extracted from the filtered, detrended color-intensity signal
    generating a scales matrix with rows corresponding to different scales for the window, starting from the bottom row of the scales matrix at scale 1 and ascending upward to a top row at a lowest considered scale, each row including a first Boolean value in each element corresponding to a peak found at that point in a version of the window scaled according to the scale associated with the row and including a second Boolean value in all other elements,
    selecting a cutoff scale as the scale associated with a row of the scales matric containing a maximum number of elements containing the first Boolean value,
    selecting, as peaks in the filtered, detrended color-intensity signal, the times associated with datapoints at which a column of elements containing the first Boolean value extend from the bottom row upward to the row associated with the cutoff value, and
    computing one or more heartbeat rates based on the intervals between the times associated with peaks selected from the scales matrix,
  using the first set of heartbeat rates and second set of heartbeat rates to determine a final set of heartbeat rates for the window, and
  outputting the determined final set of heartbeat rates.

7. A heartbeat-rate video monitoring system comprising:
a video-recording device that records a video of one or more human subjects; and
a video-recording analysis component, implemented within a computer system having one or more processors, one or more memories, and one or more mass-storage devices that
  receives recorded video frames from the video-recording device,
  determines, for each human subject imaged in the recorded video frames, an adaptive region of interest ("AROI"),
  extracts one or more color-intensity signals from a set of regions of interest ("ROIs") within the recorded video frames corresponding to each determined AROI as the average intensities of skin-color pixels in the set of regions of interest for each of one or more color channels, with the average intensity of skin-color pixels generating a single datapoint for each video frame, the single datapoint including
    a time and a scalar intensity value for one color-intensity signal and associated color channel, or
    a time and a vector of intensity values for two or more color-intensity signals and associated color channels, and
  analyzes the one or more color-intensity signals extracted from each set of regions of interest corresponding to each human subject to determine the heart-beat rate for each human subject at one or more time points within the recorded video frames by
    detrending one of the color-intensity signals,
    filtering the detrended color-intensity signal,
    determining a first set of heartbeat rates by spectral analysis of the filtered, detrended color-intensity signal,
    determining a second set of heartbeat rates by peak-finding analysis of the filtered, detrended color-intensity signal,
    using the first set of heartbeat rates and second set of heartbeat rates to determine a final set of heartbeat rates for the window by
      for each heartbeat rate in the final set of heartbeat rates,
        selecting the corresponding heartbeat rate from the first set of heartbeat rates when the selected heartbeat rate is associated with a confidence interval of less than a threshold length,
        when the corresponding heartbeat rate from the first set of heartbeat rates is not selected, selecting the corresponding heartbeat rate from the second set of heartbeat rates when the selected heartbeat rate is associated with a confidence value interval of less than a threshold magnitude, and
        otherwise selecting a null value, and
  outputting the determined final set of heartbeat rates.

* * * * *